US006449013B1

(12) United States Patent
Suzuki et al.

(10) Patent No.: US 6,449,013 B1
(45) Date of Patent: *Sep. 10, 2002

(54) IMAGE PICKUP APPARATUS CAPABLE OF TAKING COLOR NATURAL IMAGES AND HIGH-RESOLUTION IMAGES OF A MONOCHROME OBJECT

(75) Inventors: Masao Suzuki, Tokyo; Saburo Nakazato, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,431

(22) Filed: Oct. 6, 1997

Related U.S. Application Data

(63) Continuation of application No. 08/325,160, filed on Oct. 21, 1994, now abandoned.

(30) Foreign Application Priority Data

Oct. 27, 1993 (JP) ............................................. 5-269012
Dec. 28, 1993 (JP) ............................................. 5-334364

(51) Int. Cl.⁷ .......................... H04N 5/335; H04N 9/04; H04N 5/225; H04N 5/232

(52) U.S. Cl. ...................... 348/279; 348/272; 348/342; 348/345; 348/360

(58) Field of Search ................................ 348/360, 342, 348/345, 349, 236, 172, 266, 283, 625, 279, 335, 336, 272; 358/515, 520, 500, 79, 80, 512, 513, 514, 909.1, 906; 354/406; 250/201.2; 359/498–502

(56) References Cited

U.S. PATENT DOCUMENTS

| 4,523,829 | A | * | 6/1985 | Egochi et al. | ............... | 354/406 |
| 4,626,898 | A | * | 12/1986 | Baba et al. | ................. | 348/279 |
| 4,876,591 | A | * | 10/1989 | Muramatsu | ................. | 348/236 |
| 5,072,294 | A | * | 12/1991 | Engle | .......................... | 348/172 |
| 5,087,967 | A | * | 2/1992 | Matsumoto et al. | ........ | 348/625 |
| 5,159,469 | A | * | 10/1992 | Takagi | ......................... | 358/454 |
| 5,187,570 | A | * | 2/1993 | Hibi et al. | .................... | 358/520 |
| 5,233,431 | A | * | 8/1993 | Yoshida et al. | ............ | 348/342 |
| 5,402,171 | A | * | 3/1995 | Tagami et al. | ............. | 348/279 |
| 5,477,381 | A | * | 12/1995 | Sasaki et al. | ............... | 348/342 |
| 5,581,301 | A | * | 12/1996 | Ninomiya | .................... | 348/342 |

FOREIGN PATENT DOCUMENTS

| EP | 394901 | * | 10/1990 | ............ | G02B/7/10 |
| JP | 4219061 | * | 8/1992 | ............ | H04N/1/40 |

OTHER PUBLICATIONS

PTO 99–5609; Translation of JP4–219061 (Miyoshi).*

* cited by examiner

Primary Examiner—Andrew B. Christensen
(74) Attorney, Agent, or Firm—Fitzpatrick, Cella, Harper & Scinto

(57) ABSTRACT

An image pickup apparatus which is capable of forming an image signal having a high resolution when a monotone image is photographed by a structure having a switching circuit for switching between a first photographing mode in which an electric signal transmitted from an image pickup device is used to form a color natural image signal and a second photographing mode for forming a high resolution image signal of a monochrome object to insert/remove an optical low pass filter in accordance with the switching operation, wherein the length of the optical passage is corrected by another optical system.

11 Claims, 42 Drawing Sheets

FIG. 3
PRIOR ART

| Mg | G  | Mg | G  | Mg | G  | Mg | G  | Mg |
|----|----|----|----|----|----|----|----|----|
| Y1 | Cy | Y1 | Cy | Y1 | Cy | Y1 | Cy | Y1 |
| G  | Mg | G  | Mg | G  | Mg | G  | Mg | G  |
| Y1 | Cy | Y1 | Cy | Y1 | Cy | Y1 | Cy | Y1 |
| Mg | G  | Mg | G  | Mg | G  | Mg | G  | Mg |
| Y1 | Cy | Y1 | Cy | Y1 | Cy | Y1 | Cy | Y1 |
| G  | Mg | G  | Mg | G  | Mg | G  | Mg | G  |
| Y1 | Cy | Y1 | Cy | Y1 | Cy | Y1 | Cy | Y1 |
| Mg | G  | Mg | G  | Mg | G  | Mg | G  | Mg |
| G  | Mg | G  | Mg | G  | Mg | G  | Mg | G  |
| Y1 | Cy | Y1 | Cy | Y1 | Cy | Y1 | Cy | Y1 |
| Mg | G  | Mg | G  | Mg | G  | Mg | G  | Mg |

ODD / EVEN

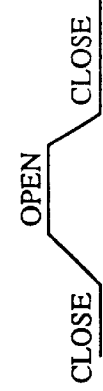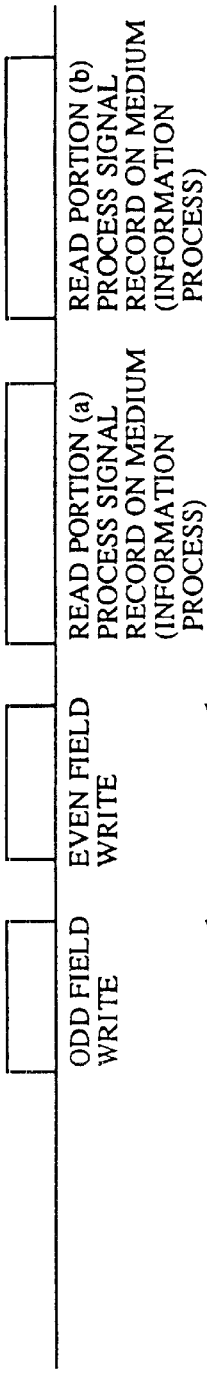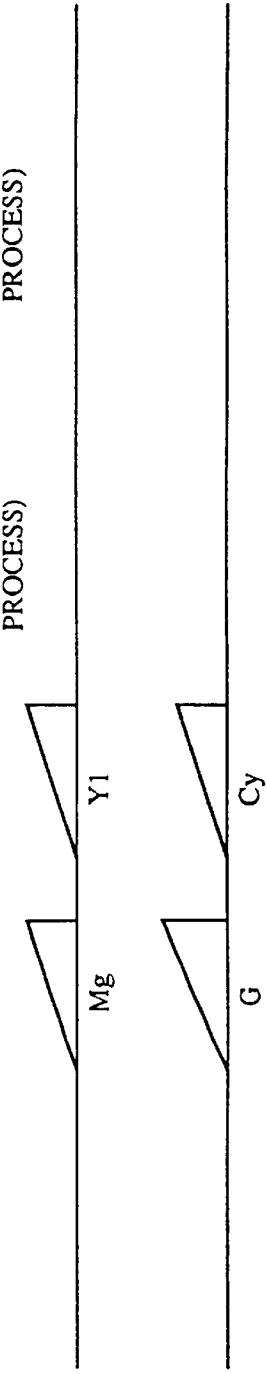

FIG. 10(1)

| Mg | G  | Mg | G  | Mg | G  | · · · · · · · · · · · · |
|----|----|----|----|----|----|----|
|    |    |    |    |    |    |    |
| G  | Mg | G  | Mg | G  | Mg | · · · · · · · · · · · · |
|    |    |    |    |    |    |    |
| Mg | G  | Mg | G  | Mg | G  | · · · · · · · · · · · · |
|    |    |    |    |    |    |    |
| G  | Mg | G  | Mg | G  | Mg | · · · · · · · · · · · · |
|    |    |    |    |    |    |    |
| Mg | G  | Mg | G  | Mg | G  | · · · · · · · · · · · · |
|    |    |    |    |    |    |    |
| G  | Mg | G  | Mg | G  | Mg | · · · · · · · · · · · · |
|    |    |    |    |    |    |    |
| ·  | ·  | ·  | ·  | ·  | ·  | · · · · · · · · · · · · |

| Mg | G  | Mg | G  | Mg | G  | · · · · · · · · · · · · |
|----|----|----|----|----|----|----|
| Y1 | Cy | Y1 | Cy | Y1 | Cy | · · · · · · · · · · · · |
| G  | Mg | G  | Mg | G  | Mg | · · · · · · · · · · · · |
| Y1 | Cy | Y1 | Cy | Y1 | Cy | · · · · · · · · · · · · |
| ·  | ·  | ·  | ·  | ·  | ·  | · · · · · · · · · · · · |
| Y1 | Cy | Y1 | Cy | Y1 | Cy | · · · · · · · · · · · · |

(b)

| Mg | G  | Mg | G  | Mg | G  | · · · · · · · · · · · · |
|----|----|----|----|----|----|----|
| Y1 | Cy | Y1 | Cy | Y1 | Cy | · · · · · · · · · · · · |
| G  | Mg | G  | Mg | G  | Mg | · · · · · · · · · · · · |
| Y1 | Cy | Y1 | Cy | Y1 | Cy | · · · · · · · · · · · · |
| Mg | G  | Mg | G  | Mg | G  | · · · · · · · · · · · · |
| ·  | ·  | ·  | ·  | ·  | ·  | · · · · · · · · · · · · |
| Y1 | Cy | Y1 | Cy | Y1 | Cy | · · · · · · · · · · · · |

FIG. 12(iii)
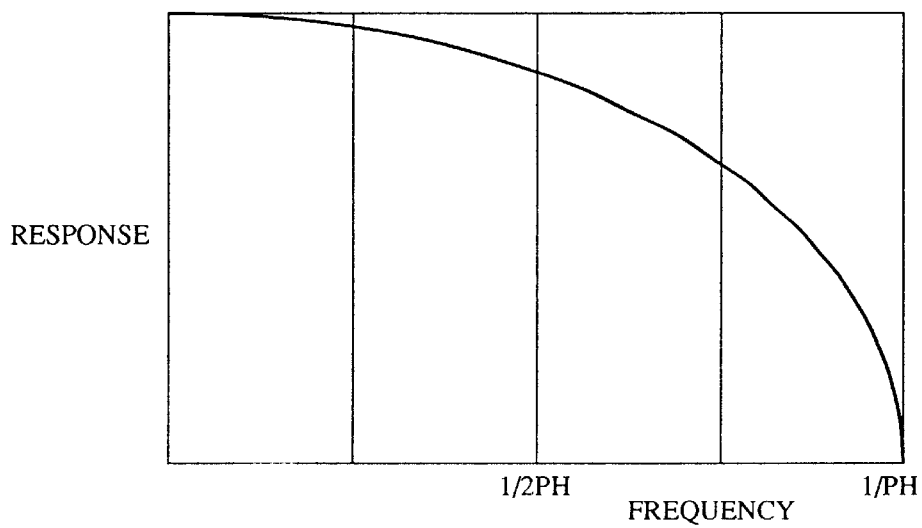

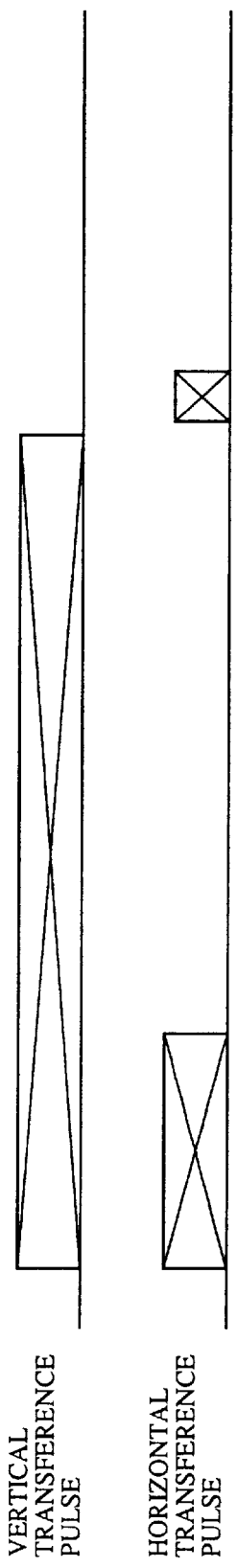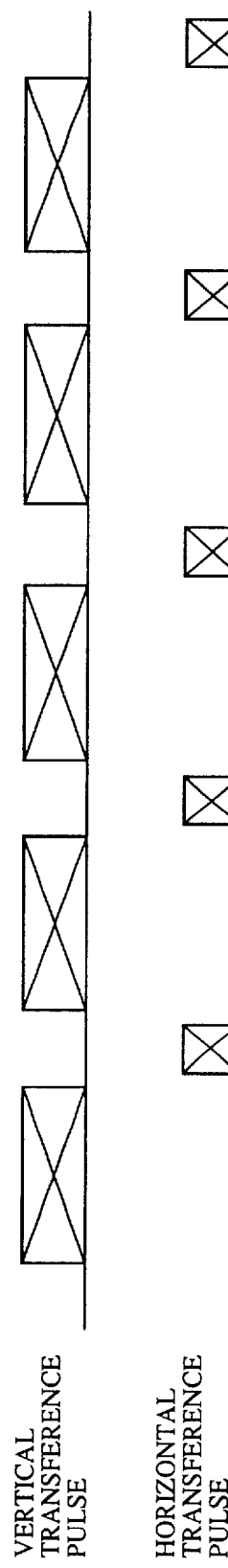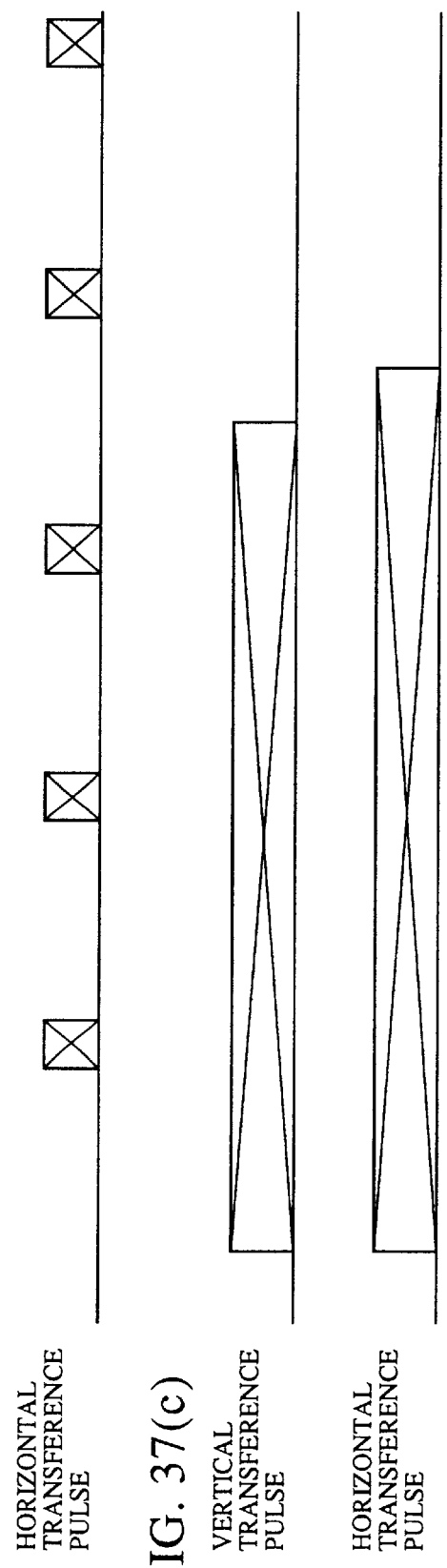
FIG. 37(a) VERTICAL TRANSFERENCE PULSE
HORIZONTAL TRANSFERENCE PULSE
FIG. 37(b) VERTICAL TRANSFERENCE PULSE
HORIZONTAL TRANSFERENCE PULSE
FIG. 37(c) VERTICAL TRANSFERENCE PULSE
HORIZONTAL TRANSFERENCE PULSE

IMAGE PICKUP APPARATUS CAPABLE OF TAKING COLOR NATURAL IMAGES AND HIGH-RESOLUTION IMAGES OF A MONOCHROME OBJECT

This application is a continuation of application Ser. No. 08/325,160, filed Oct. 21, 1994, now abandoned.

BACKGROUND OF THE INVENTION

1. Field of the Invention

The present invention relates to an image pickup apparatus.

2. Related Background Art

FIG. 1 is a block diagram which illustrates a digital electronic camera.

Referring to FIG. 1, reference numeral 200 represents a digital electronic camera, and 201 represents a recording medium, such as a memory card. In the digital electronic camera 200, reference numeral 1 represents a shutter 1 also serving as a diaphragm, 2 represents an optical low pass filter, and 3 represents a drive circuit for each mechanical portion. Reference numeral 4 represents an image pickup device for converting light reflected by an object into an electric signal, 6 represents a timing signal generating circuit (hereinafter called a "TG"), 5 represents an image pickup device drive circuit for amplifying a signal transmitted by the timing signal generating circuit to a level which permits the image pickup device to be driven, 7 represents a preprocessing circuit comprising a CDS circuit for eliminating noise included in the output from the image pickup device 4 and a circuit for non-linearly amplifying the output before the output is A/D converted, 8 represents an A/D converter, 11 represents an image pickup signal processing circuit, 12 represents a signal process controlling CPU for controlling the image pickup signal processing circuit, 13 represents a CPU for controlling the mechanical portion and a control portion, 14 represents a control display portion for indicating displays for aiding operations of a user and states of the camera, and 15 represents a control portion for controlling the camera from outside. Reference numeral 18 represents a recording medium I/F (interface) for establishing the connection between the digital electronic camera 200 and the recording medium 201.

FIG. 2 is a diagram which illustrates the image pickup signal processing circuit 11. Reference numeral 101 represents a color separating circuit for separating the output signal from the image pickup device into color signals, 102 represents a color matrix circuit for deducing R, G and B signals from the color-separated signals, 103 represents a WB correction circuit for correcting the levels of the R, G and B signals in accordance with the color of a light source of light that irradiates the object, 104 represents a color difference signal deducing circuit for deducing color difference signal R-Y and B-Y from the corrected R, G and B signals, 105 represents a low-frequency brightness signal correction value deducing circuit for deducing a signal for correcting the color component ratio of the brightness signal from the corrected R, G and B signals, 106 represents a color-modulated-portion trapping circuit for removing a color modulation signal that overlaps the image pickup signal, 107 represents a horizontal aperture circuit for highlighting the horizontal outline, 108 represents a vertical aperture circuit for highlighting the vertical outline, 109 represents an adder for adding the signals, and 110 represents a subtractor.

FIG. 3 is a diagram which illustrates the configuration of color filters of the image pickup device 4. FIG. 4 is a diagram which illustrates the operation timing of the image pickup device 4 and output signals from the image pickup device 4.

Referring to FIGS. 1 and 2, the conventional digital electronic camera will now be described.

When a photographer controls the control portion 15, the camera starts the photographing operation. In accordance with an intention of the photographer, a lens system (not shown) is controlled by the mechanical portion controlling CPU 13 and the mechanical system drive circuit 3. At this time, photographing conditions and so forth are displayed on the control portion 15 so that the state of the camera is provided to the photographer. Furthermore, a light measuring circuit (not shown) measures the brightness of the object. In addition, the diaphragm value and the shutter speed of the shutter 1 also serving as a diaphragm are deduced by the mechanical portion controlling CPU 13. In accordance with the control value deduced by the mechanical portion controlling CPU 13, the shutter 1 also serving as a diaphragm is operated by the mechanical system drive circuit 3. Thus, the image of the object is exposed to light and light reflected by the object is made incident upon the image pickup device 4 through a photographing lens (not shown) and the shutter 1. The shutter 1, at this time, limits the quantity of light incident on the image pickup device 4. In a case where an interlace reading CCD is employed as the image pickup device, the shutter 1 prevents an adverse influence of incident light on the signal charge. The image pickup device 4 is operated in response to a drive signal obtained by amplifying the output from the timing signal generating circuit 6 by the image pickup device drive circuit 5. The timing signal generating circuit 6 is controlled by the signal process controlling CPU 12. The output from the image pickup device 4 thus operated is supplied to the pre-processing circuit 7. The pre-processing circuit 7 performs a CDS (Correlated Double Sampling) process and a process for forming the picked up image into a non-linear shape for the purpose of effectively using the dynamic range of the A/D converter. The output denoting the pickup image is converted into a digital signal by the A/D converter 8, the digital signal being then supplied to the image pickup signal processing circuit 11. The image pickup signal processing circuit 11 performs a predetermined brightness signal process and a color signal process to be described later. Then, a process for converting the processed signal into a predetermined format (not shown) is performed, and the processed signal is recorded on the recording medium 20 through the I/F 18 for the recording medium.

The image pickup signal processing circuit 11 receives the output signal transmitted from the image pickup device thus A/D converted. The image pickup device has a color filter configuration as shown in FIG. 3 in which Mg (magenta), G (green), Y1 (yellow) and Cy (cyan) are disposed on each pixel. For example, field 1 is made to be an ODD field and field 2 is made to be an EVEN field. The two fields are read while interlacing one line and two lines are simultaneously read. Thus, the output from the image pickup device is formed into a signal obtained by linear-sequentially forming dot sequential signals (Mg+Y1) and (G+Cy) and dot sequential signals (G+Y1) and (Mg+Cy). The foregoing state is shown in FIG. 4. Referring to FIG. 4, (1) shows a vertical synchronizing signal, (3) shows a transference pulse for transferring each pixel signal to the vertical shift register in a case where the interline CCD is used and (4) shows the output signal from the CCD. In the image pickup signal processing circuit 11, the image signal is, by the color separating circuit 101, is separated into color signals c1 (a line sequential signal of (Mg+Y1) and (G+Y1)) and c2 (a line sequential signal (G+Cy) and (Mg+Cy)). The separated signals are linearly coincided by the color matrix circuit 102 and are converted into pure color signals R0, G0 and B0 by matrix calculations before they are supplied to the WB correction circuit 103. In the WB correction circuit 103, the color temperature of light source light that irradiates the object is corrected in response to a WB control signal supplied from the signal process controlling CPU 12. The corrected RGB signals are used to cause the color difference signal deducing circuit 104 to deduce the color difference signals R-Y and B-Y. The low-frequency brightness signal correction value deducing circuit 105 deduces correction signal YL in accordance with the RGB signals, the correction signal YL being used to correct the ratio of color components that constitute the brightness signal in order to improve the reproducibility of the brightness of the colors.

The image signal transmitted from the A/D converter is also supplied to the color-modulated portion trapping circuit 106 to decay the modulated color signals overlapped on the brightness signal. From the output from the color-modulated portion trapping circuit 106, highlighted aperture signals are deduced by the horizontal aperture circuit 107 and the vertical aperture circuit 108, the deduced aperture signals being added with a through brightness signal by the adder 109. The subtractor 110 subtracts a correction portion YL from added and deduced signal Y0 so that corrected brightness signal Y is obtained.

However, the conventional digital electronic camera involves the following problems.

(1) Since the digital electronic camera is designed to take a picture of a color and natural image, satisfactory performance cannot be obtained to take a picture of an object, such as characters, an illustration or a figure, the picture of which must be taken with a high resolution.
(2) Since photographed characters involve indentations and/ or discontinuous portions, erroneous recognition cannot be prevented if bit map data of the characters are recognized by a recognizing software.
(3) In a case where an information apparatus, such as a computer, is used to make a deformed image, such as an illustration, from a natural image, a supplied natural image can easily have color and brightness irregularity. Therefore, heavy load is required to remove the irregularity on the information apparatus.

SUMMARY OF THE INVENTION

Accordingly, an object of the present invention is to provide an image pickup apparatus which is capable of overcoming the foregoing problems.

In the present invention, the following structures are employed:

(1) A mode for photographing a natural image and a monochrome and high resolution mode for photographing monochrome characters or an illustration are provided and the two modes can be switched.
(2) The monochrome and high resolution mode is performed by using at least any one of the following arrangements.
(1) An optical low pass filter is retracted from the optical passage or the characteristics of the optical low pass filter are changed.
(2) The color level of each pixel of the image pickup device with respect to the color of the object is obtained and the level is corrected for each color component to align the signal levels.
(3) An image pickup device of a non-interlace type of a combination of an interlace type image pickup device and a mechanical shutter is used to read information of all pixels exposed to light in the same time.

As a result of the foregoing structure (1), if the monochrome mode is selected, the retraction of the optical filter or the change of the characteristics of the same as shown in (1) prevents trapping of video information near the Nyquist frequency in a spatial sampling due to pixels that can be lost in the natural image photographing mode. Thus, a high resolution image can be obtained.

Since the portion modulated by the color components of the output signal from the image pickup device can be erased due to the color level correction (2), the necessity of disposing a band limiting filter, such as a trapping circuit, for removing the color modulated portion in the high frequency brightness signal processing system can be eliminated. Thus, video information in the high frequency range can be maintained and used as high resolution brightness information.

As a result of the structure (3), information of all pixels of the image pickup device which is free from time lag can be obtained. Therefore, high resolution video information can be obtained without an influence of camera shake and the movement of the object.

According to one aspect of the present invention, there is provided an image pickup apparatus comprising: image pickup means for converting an optical image into an electric signal; lens position changing means for changing the optical axial directional position of a focusing lens with respect to the image pickup means; and focal point evaluating value detection means for deducing a focal point evaluating value, which is made to be a maximum value in a focused state, in accordance with an output from the image pickup means, wherein two or more lens movement quantities by the lens position changing means can be set.

According to another aspect of the present invention, there is provided an image pickup apparatus comprising: image pickup means; switching means capable of switching between a first photographing mode in which an electric signal transmitted from the image pickup means is used to form a color natural image signal and a second photographing mode in which the electric signal transmitted from the image pickup means is used to form a white and black high resolution image signal; and focusing control means for precisely performing focal point adjustment in the second photographing mode as compared with the first photographing mode in accordance with the photographing mode switching operation performed by the switching means.

According to another aspect of the present invention, there is provided an image pickup apparatus comprising: an image pickup means; switching means capable of switching between a first photographing mode in which an electric signal transmitted from the image pickup means is used to form a color natural image signal and a second photographing mode in which the electric signal transmitted from the image pickup means is used to form a white and black high resolution image signal; focal point detection means for detecting state of focusing in accordance with the electric signal transmitted from the image pickup means; and focal point control means for controlling the focal point adjustment lens in accordance with an output from the focal point detection means and as well as controlling the focal point adjustment lens in accordance with an output from the switching means to reduce the quantity of movement of the focal point adjustment lens in the second photographing mode as compared with a quantity in the first photographing mode.

According to another aspect of the present invention, there is provided an image pickup apparatus comprising:

mode switching means capable of switching between a first photographing mode in which an electric signal transmitted from image pickup means is used to form a color natural image signal and a second photographing mode in which the electric signal transmitted from the image pickup means is used to form a white and black high resolution image signal; detection means for detecting whether or not focal point adjustment has been completed in accordance with a quantity of movement of a focal point adjustment lens in a predetermined time; lens control means for fixing the focal point adjustment lens in accordance with a result of detection performed by the detection means; and control means for controlling the detection means in accordance with an operation of the mode switching means in such a manner that a lens movement quantity in a predetermined time in the second photographing mode is smaller than that in the first photographing mode.

According to another aspect of the present invention, there is provided an image pickup apparatus comprising: photographing optical means; image pickup means for converting an optical image into an electric signal; lens position changing means for changing an optical axial directional position of a focal point adjustment lens with respect to the image pickup means; focal point evaluating value detection means for deducing, from an output from the image pickup means, a focal point evaluating value which is made to be a maximum value in a focused state; focal point control means which is capable of switching a lens movement quantity by the lens position changing means; photographing preparation processing means that operates at least the focal point evaluating value detection means to prepare a photographing operation; and photographing control means for performing main exposure under a condition set by the photographing preparation processing means to cause the image pickup means to photograph an object and making conditions for the image pickup means and the photographing optical means in the photographing preparation period caused by the photographing preparation processing means to be different from conditions set in the main exposure.

According to another aspect of the present invention, there is provided an image pickup apparatus comprising: mode switching means capable of switching between a first photographing mode in which an electric signal transmitted from image pickup means is used to form an image signal and a second photographing mode in which the electric signal transmitted from the image pickup means is used to form an image signal having a resolution higher than that of the image signal formed in the first photographing mode; focal point adjustment means that detects a state of focusing from an output from the image pickup means to adjust a focal point; and control means for controlling an operation of the focal point adjustment means in accordance with the mode switching means in such a manner that a unit movement of the focal point adjustment means in the second photographing mode is smaller than that in the first photographing mode.

As a result, the time required to reach the final focusing position can be shortened and thus the time taken to complete the focusing operation can be shortened.

By adequately switching the photographing mode in which the lens is moved considerably and the photographing release time lag is short and the photographing mode in which the lens is not moved considerably and precise focal point adjustment can be performed, the object can be photographed satisfactorily regardless of the state of the object.

Furthermore, an optimum focal point adjustment operation can be performed in both the color photographing mode and the precise white and black image photographing mode.

Other and further objects, features and advantages of the invention will be appear more fully from the following description.

BRIEF DESCRIPTION OF THE DRAWINGS

FIG. 3 is a diagram which illustrates the configuration of color filters of an image pickup device for explaining the conventional structure;

FIG. 8 is a timing chart for illustrating the operation of the first embodiment;

FIG. 10 is a schematic view which illustrates the data configuration stored in a memory according to the first embodiment of the present invention;

FIG. 37 is a timing chart which illustrates the reading operation of the image pickup device according to the thirteenth embodiment of the present invention;

DESCRIPTION OF THE PREFERRED EMBODIMENTS

First Embodiment

Figure 5:
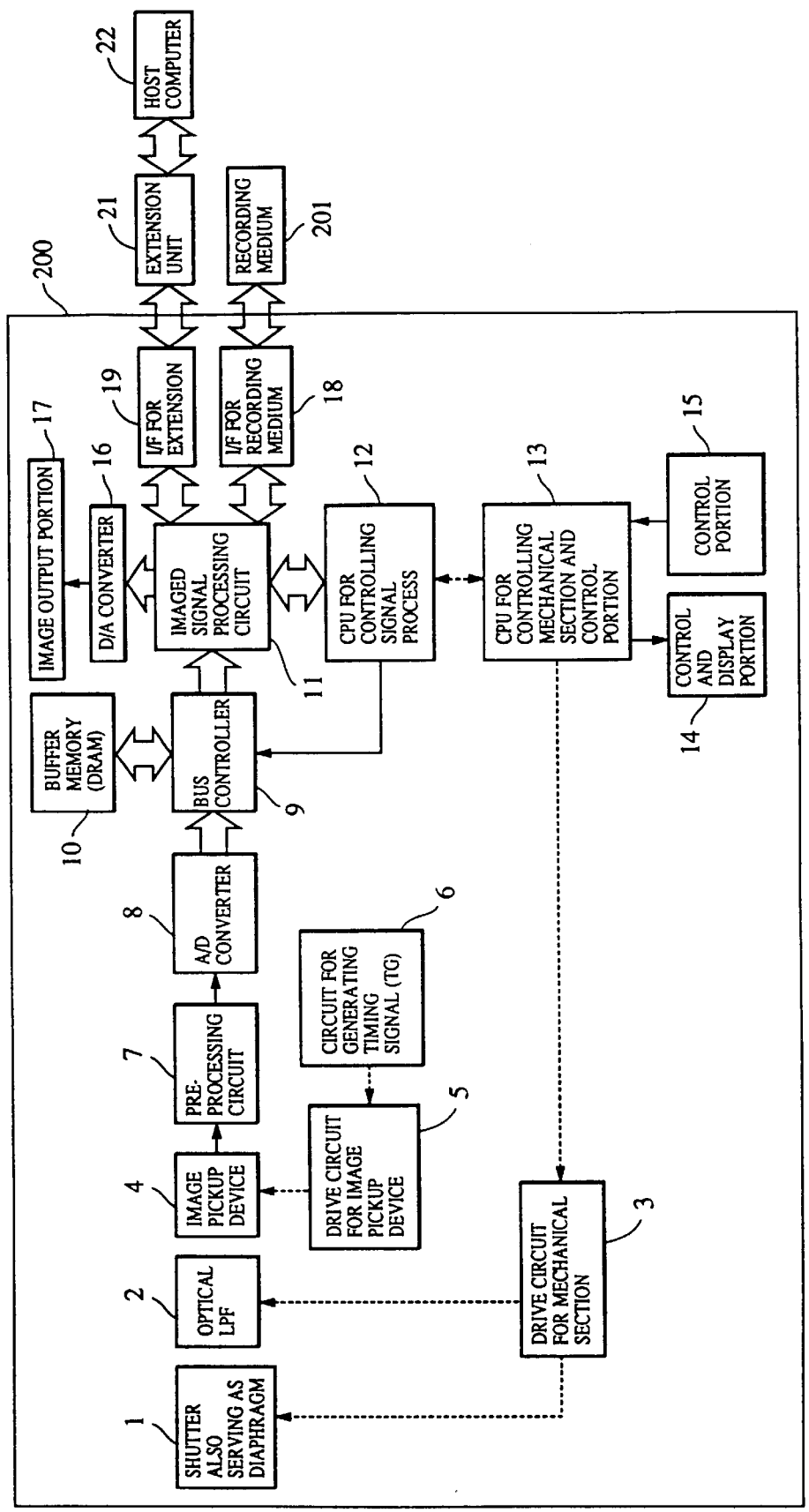
FIG. 5 is a block diagram which illustrates the structure of a first embodiment of the present invention.
Figure 6:
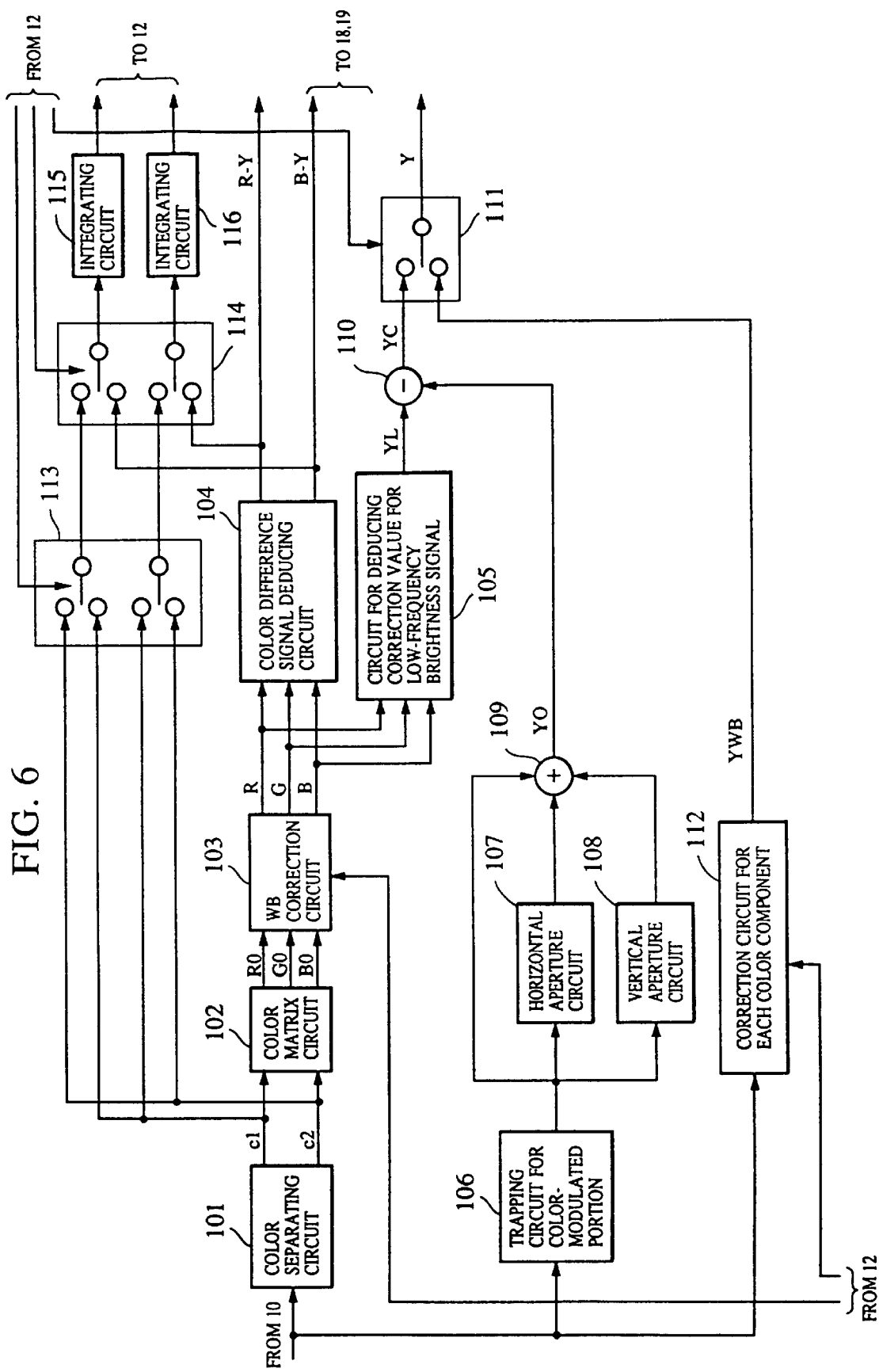
FIG. 6 is a block diagram which illustrates a portion of the structure shown in FIG. 5.
Figure 7:
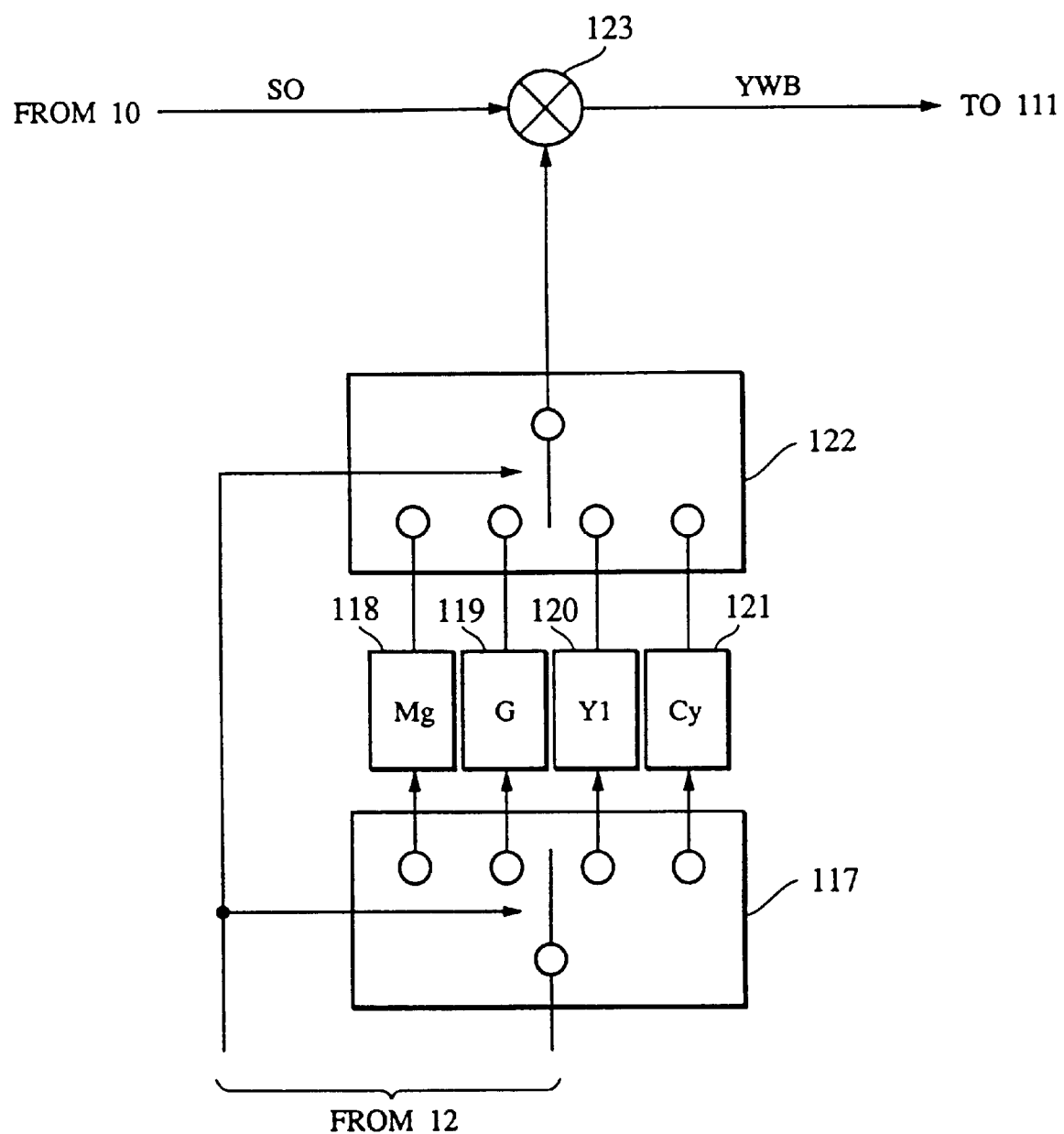
FIG. 7 is a block diagram which illustrates a portion of the structure shown in FIG. 6.

An example the system block of a digital electronic camera according to the present invention is shown in FIG. 5. FIG. 6 is a diagram which illustrates an example of the structure of a circuit 11. FIG. 7 is a diagram which illustrates an example of the structure of a circuit 112.

Figure 1:
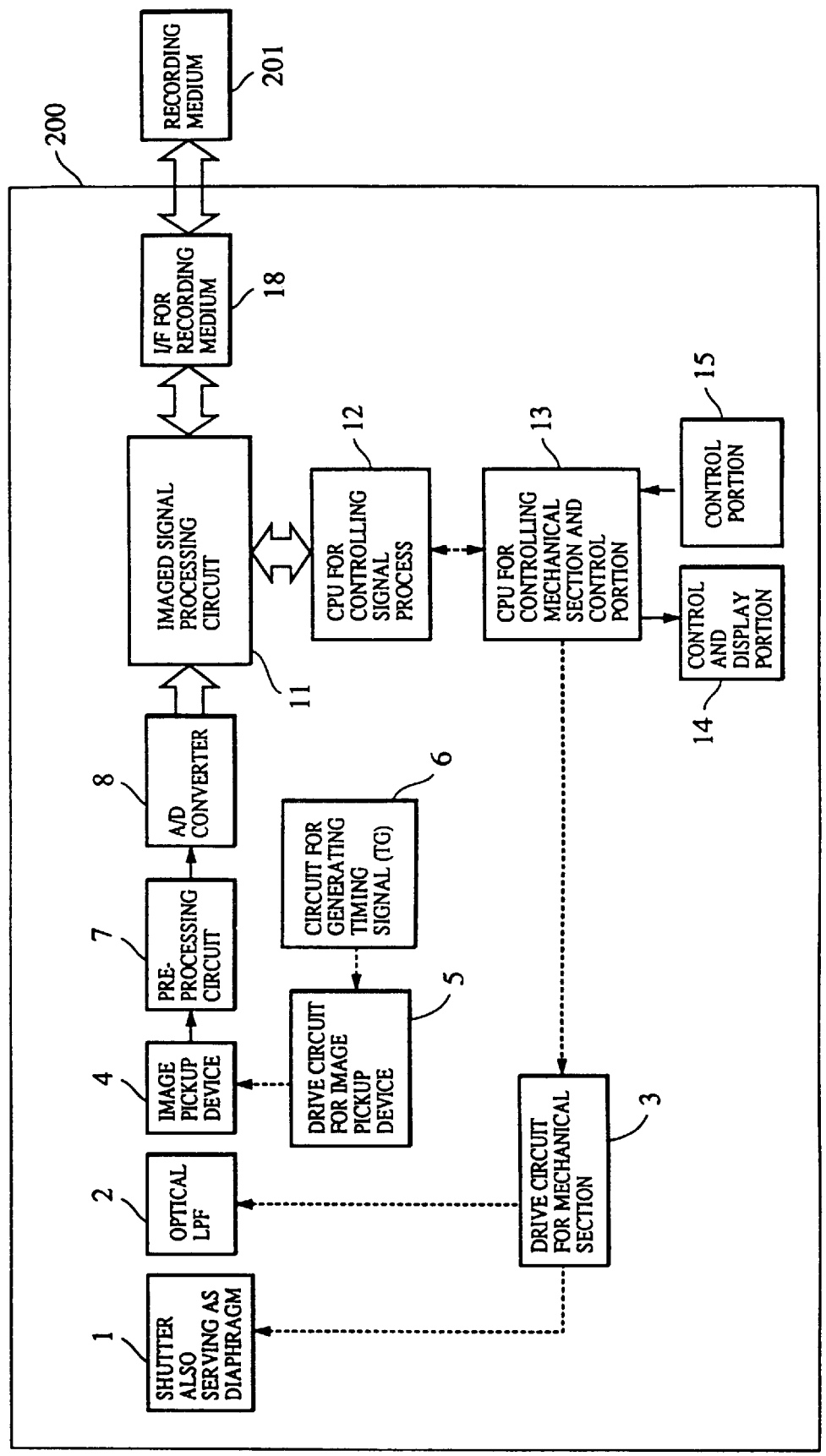
FIG. 1 is a block diagram which illustrates a conventional structure.
Figure 2:
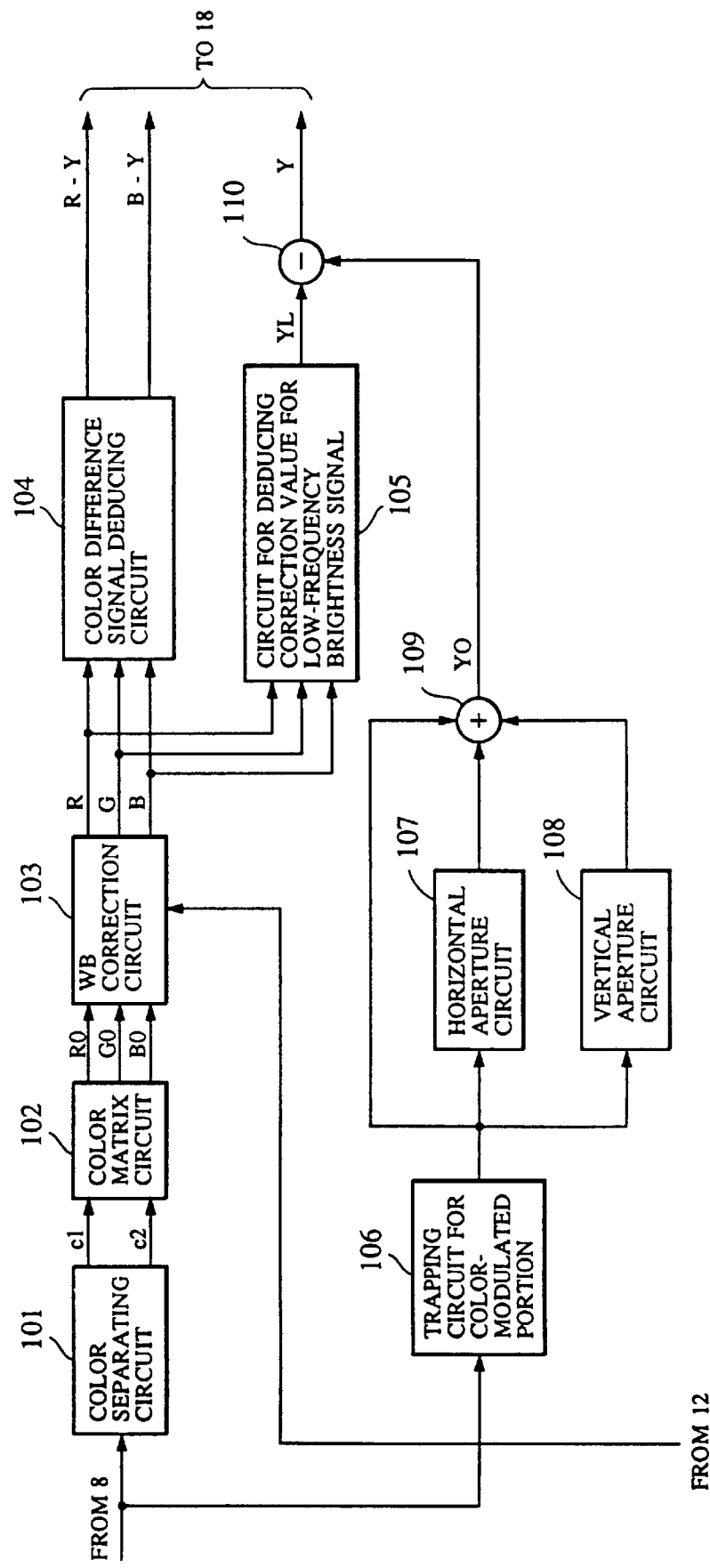
FIG. 2 is a block diagram which illustrates a portion of the conventional structure.

The same elements shown in FIGS. 5 and 6 as those shown in FIGS. 1 and 2 are given the same reference numerals.

Reference numeral 201 represents a recording medium, such as a PCMCIA memory card or a hard disk. Reference numeral 9 represents as bus controller that is controlled by the signal process controlling CPU 12 to control the bus line for an A/D converted signal. Reference numeral 10 represents a buffer memory for temporarily storing the digital signal, 19 represents an extension I/F (interface) for establishing the connection between an extension unit 21 and the camera, and 21 represents the extension unit connected to the camera to realize another function and enables communication with a host computer. Reference numeral 22 represents the host computer, such as a personal computer or a work station.

Referring to FIG. 6, reference numeral 111 represents a multiplexor for selecting one output from two inputs, 112 represents a color component correction circuit for correcting the level of the A/D converted output from the image pickup device for each pixel, 113 and 114 represent 2-channel and 2-input multiplexors, and 115 and 116 represent integrating circuits for deducing the average values of the signals.

Referring to FIG. 7, reference numeral 117 represents a demultiplexor for distributing data supplied from the signal process controlling CPU 12. Reference numerals 118, 119, 120 and 121 represent circuits, such as shift registers, for temporarily storing correction quantities for the color components, 122 represents a multiplexor for selecting one output from among four inputs, and 123 represents a multiplier.

Figure 9:
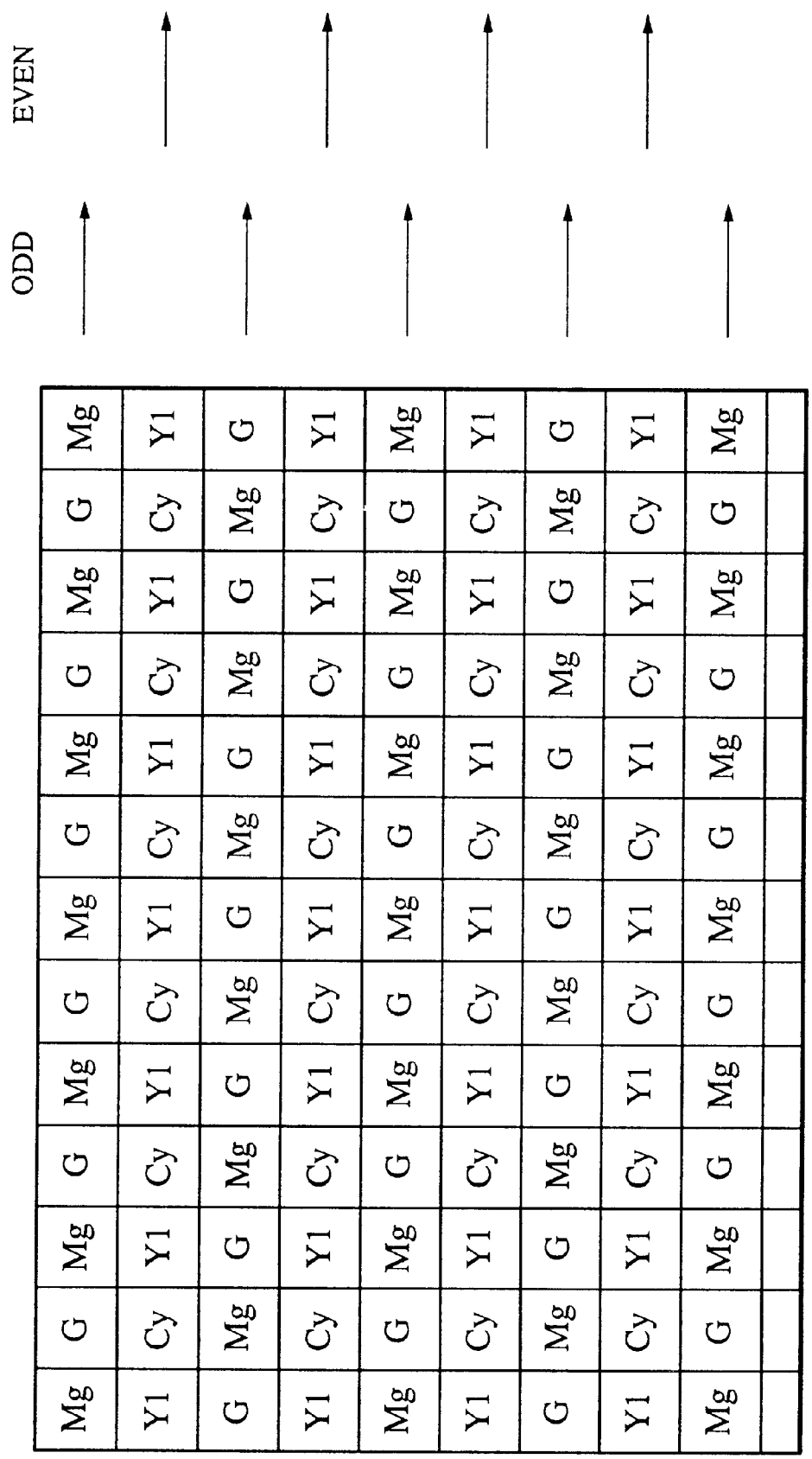
FIG. 9 is a diagram which illustrates the configuration of color filters of the image pickup device.
Figure 11:
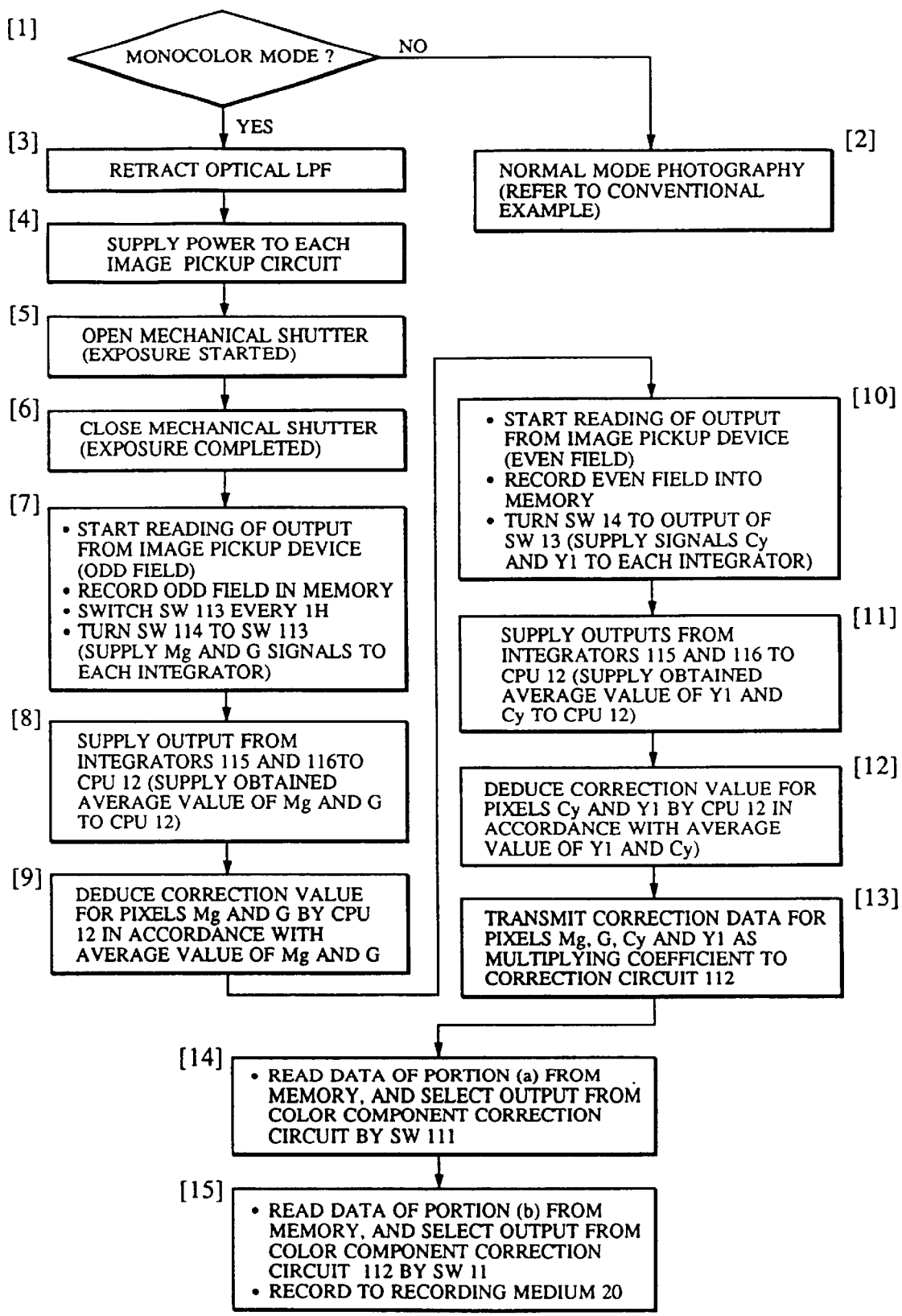
FIG. 11 is a flow chart which illustrates the first embodiment.

FIG. 8 is a timing chart for illustrating the present invention. FIG. 9 is a diagram which illustrates the configuration of color filters in the image pickup device according to this embodiment where color filters are disposed on the pixels. FIG. 10 is a schematic view which illustrates memory region on which color components of the image signal are written. FIG. 11 is a flow chart of the operations of the CPUs 12 and 13.

The first embodiment of the present invention will now be described with reference to FIGS. 5 to 11.

Initially, a photographer selects normal photographing of a natural image or high resolution photography of a monochrome object (hereinafter expressed as "monochrome object") which is the characteristic of the present invention by operating the control portion 15 while looking the display on the control display portion 14 (see FIG. 11). If the normal photography is selected, the natural image photographing operation as described in the prior art is performed ([2]).

If the monochrome mode is selected, the mechanical portion controlling CPU 13 is operated to actuate the mechanical system drive circuit 3 to retract the optical LPF 2 ([3]), and power is supplied to each image pickup circuit ([4]). Then, the mechanical shutter 1 also serving as, for example, a diaphragm is opened to start exposing the image pickup device to light ([5]). The mechanical shutter 1 also serving as a diaphragm is opened for an exposure time determined in accordance with the output from a light measuring means (not shown) and then it is closed ([6]). The operation is performed in field 1 shown in FIG. 8. After the mechanical shutter 1 also serving as a diaphragm has been closed completely, the output from the image pickup device 4 is read. The output is read in such a manner that the ODD field lines are sequentially read as shown in FIG. 9, and then the EVEN field lines are sequentially read. Thus-read signals from the ODD fields are dot sequential Mg and G signals, the sequential order of which is alternated every 1H (see FIG. 9).

The signals read from the image pickup device 4 as described above are allowed to pass through the pre-processing circuit 7 and the A/D converter 8 like the conventional structure and supplied to the bus controller 9. The bus controller 9 transfers the output representing the picked up image to the buffer memory 10. The bus controller 9 employs a concept as shown in FIG. 10 (1) to store data in a skipped manner such that data is stored for 1H and next address region of 1H is skipped and next data is stored for 1H in the ensuing address.

As described above, the signals from the image pickup device 4 are stored in the memory map and are also supplied to the image signal processing circuit 11 in which the signals are separated into C1 and C2 signals in the color separating circuit 101. In the ODD field, the signal C1 is in the form of a line sequential signal consisting of Mg signals and G signals. On the other hand, the signal C2 is in the form of a line sequential signal consisting of G signals and Mg signals. The C1 and C2 signals are received by the SW 113 and switched every 1 H by the signal process controlling CPU 12 so as to be made coincide into Mg signals and G signals. The coincided Mg and G signals are, by the signal process controlling CPU 12, supplied to the integrating circuits 115 and 116 through the SW 114 that has selected the output side of 113 ([7]). The integrating circuits 115 and 116 average the color signals for one screen or a portion of the region (see field 2 shown in FIG. 8) and supply the output thereof to the signal process controlling CPU 12 ([8] shown in FIG. 11). The signal process controlling CPU 12, from integration information of Mg and G, deduces correction values that are required for the levels of the Mg and G signals to coincide with a predetermined level (a signal level corresponding to, for example, 50% if the maximum level is 100%). If the level of the integrated signal G is 25% of the maximum level, a correction value of 6 dB is deduced ([9]).

Then, EVEN field signals are read which are in the form of a dot sequential signal consisting of Cy and Y1 signals (see FIG. 9).

The signal read from the image pickup device 4 is, similar to the dot sequential signals of Mg and G signals, supplied to the bus controller 9 through the preprocessing circuit 7 and the A/D converter 8. The bus controller 9 transfers the output from the image pickup device 4 to the buffer memory 10 in which data is stored on the memory map for each 1 H of the blank address region in accordance with the concept shown in FIG. 10 (2).

As described above, the image device signal is stored on the memory map and it is also supplied to the image signal processing circuit 11 in which the image device signal is divided into monochrome signals C1 and C2 in the color separating circuit 101. In the EVEN field, the signal C1 is formed into Y1 signals and the signal C2 is formed into Cy signal. Although the signals C1 and C2 are received by the SW 113, the signals C1 and C2 do not switch the SW 113 because the signals C1 and C2 are not formed into the line sequential signal in the EVEN field. Then, the color signals are, by the signal process controlling CPU 12, supplied to the integrating circuits 115 and 116 through the SW 114 that has selected the output of the SW 113 ([10] shown in FIG. 11). The integrating circuits 115 and 116 average the color signals for one screen or a portion of the region (see field 3 shown in FIG. 8) and supply the output thereof to the signal process controlling CPU 12 ([11]). The signal process controlling CPU 12, from integration information of Y1 and Cy, deduces correction values that are required for the levels of the Cy and Y1 signals to coincide with a predetermined level (a signal level corresponding to, for example, 50% if the maximum level is 100%). If the level of the integrated signal Cy is 25% of the maximum level, a correction value of 6 dB is deduced ([12]).

The thus-deduced correction data items are supplied to color component correction circuits 112 of the image signal processing circuit 11. In the correction circuits 112, the SW 117 controlled by the CPU 12 stores color signal correction data items in predetermined registers 118 to 121.

After the correction data items have been registered in the registers 118 to 121, the bus controller 9 reads data from the address region in the memory (a) and supplies it to the image signal processing circuit 11 (field 4 shown in FIG. 8). In the image signal processing circuit 11, the image signals are supplied to the color component correction circuits 112. In the color component correction circuits 112, the signals are supplied to the multiplier 123. The multiplying coefficients at this time are assigned correction data items previously stored in the registers corresponding to the color signals by the SW 122 controlled by the CPU 12. As a result, the color components of the image signal S0 are corrected with respect to the color average signals deduced by the integrating circuits 115 and 116. If the subject to be photographed is a monocolor object, the signal levels of all pixels coincide with one another.

The thus-corrected YWB signals are selected by the SW 111 so as to be recorded in the recording medium 20 as Y signal through the I/F 18 for the recording medium or transferred to the extension unit 21 or the host computer 22 through the extension I/F 19 so as to be subjected to an information process, such as filing of video information or recognition of character information. The structure is arranged in such a manner that the rate of reading data from the memory to be adaptable to the processing rate or the transference rate of the recording medium or the extension unit and the processing rate of the image signal processing circuit 11 are lowered so that a further requirement of a buffer memory is eliminated (see field 4 shown in FIG. 8 and [14] shown in FIG. 11).

Then, image data is read from portion (b) of the memory 10 so as to be processed similar to the portion (a). That is, data is, by the bus controller 9, read from the address region in the portion (b) of the memory to be supplied to the image signal processing circuit 11 (see field 5 shown in FIG. 8). Then, it is corrected by the correction circuit 112.

The thus-corrected YWB signals are selected by the SW 111 so as to be recorded in the recording medium 20 as Y signal through the I/F 18 for the recording medium or transferred to the extension unit 21 or the host computer 22 through the extension I/F 19 so as to be subjected to an information process, such as filing of video information or recognition of character information (see field 5 shown in FIG. 8 and [15] shown in FIG. 11).

As described above, the monochrome mode is set, and if the mode is selected the crystal LPF is retracted to use the signal that has corrected the color components of the pixels as the brightness signal. Thus, a high resolution signal can be obtained and thus high quality image information can be obtained in a case where characters or figures are photographed.

Since the signals interlace-read from the image pickup device can be formed into non-interlace signals to be sequentially transmitted to an information apparatus starting at the upper portion of the screen without a necessity of providing an additional circuit, a satisfactory advantage can be realized when a process, in which the information apparatus simultaneously requires high resolution information, such as character recognition, is performed.

The color signal process may be performed similarly to the conventional structure so as to be recorded in the recording medium or supplied to an information apparatus through an extension card. However, false colors are generated at edges of the brightness signal in the foregoing case, and the signals in this portion are not used. Only integrated signal information of the color signal may be recorded in place of full recording of the color signal. Only color signals in the regions appointed by the control portion 15 may be recorded. In the foregoing case, a great advantage can be realized in a case where a black and white image is colored in accordance with the color information by using a paint software in the ensuing information process. Also the required recording capacity can be reduced significantly.

Second Embodiment

Although the foregoing embodiment has the structure that the optical LPF is retracted, the characteristics of the same may be changed in place of the retraction.

Figure 12I:
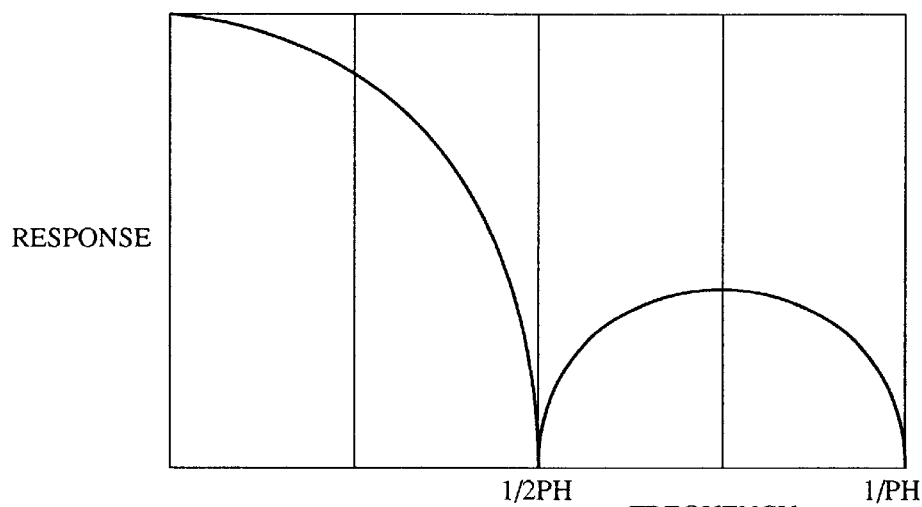
FIG. 12 is a graph showing the characteristics of an optical LPF according to a second embodiment.
Figure 12:
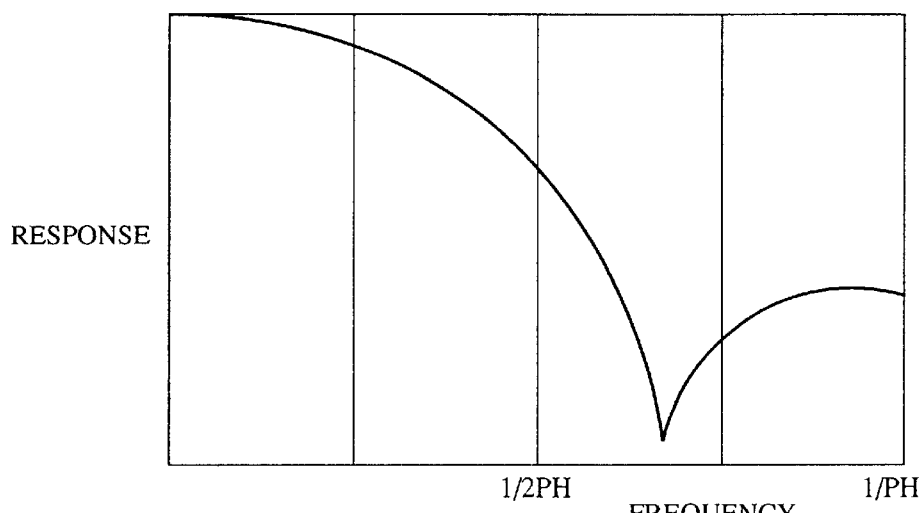

FIG. 12 is a graph showing the frequency response of the optical LPF where (i) shows the characteristics of the optical LPF in the normal mode, (ii) shows the characteristics of the same in the monochrome mode having the trapping point shifted toward the high frequency portion and thus causing the signal component to include high frequency information in a larger quantity, and (iii) shows the characteristics having the trapping pint at 1/PH, thus causing the frequency for generating the carrier of the brightness to be trapped but causing the carrier generating frequency of the color not to be trapped.

The characteristics of the optical LPF are, under control performed by the control portion 15, changed by moving and changing a plurality of LPFs by the mechanical portion controlling CPU 13 and the mechanical portion drive system.

By changing the characteristics of the optical LPF as described above, a high frequency brightness signal can be obtained in the monochrome mode and the generation of false colors can adequately be prevented. Thus, the balance between the resolution and the degree of generation of the false color can be set adequately.

Third and Fourth Embodiments

Figure 13:
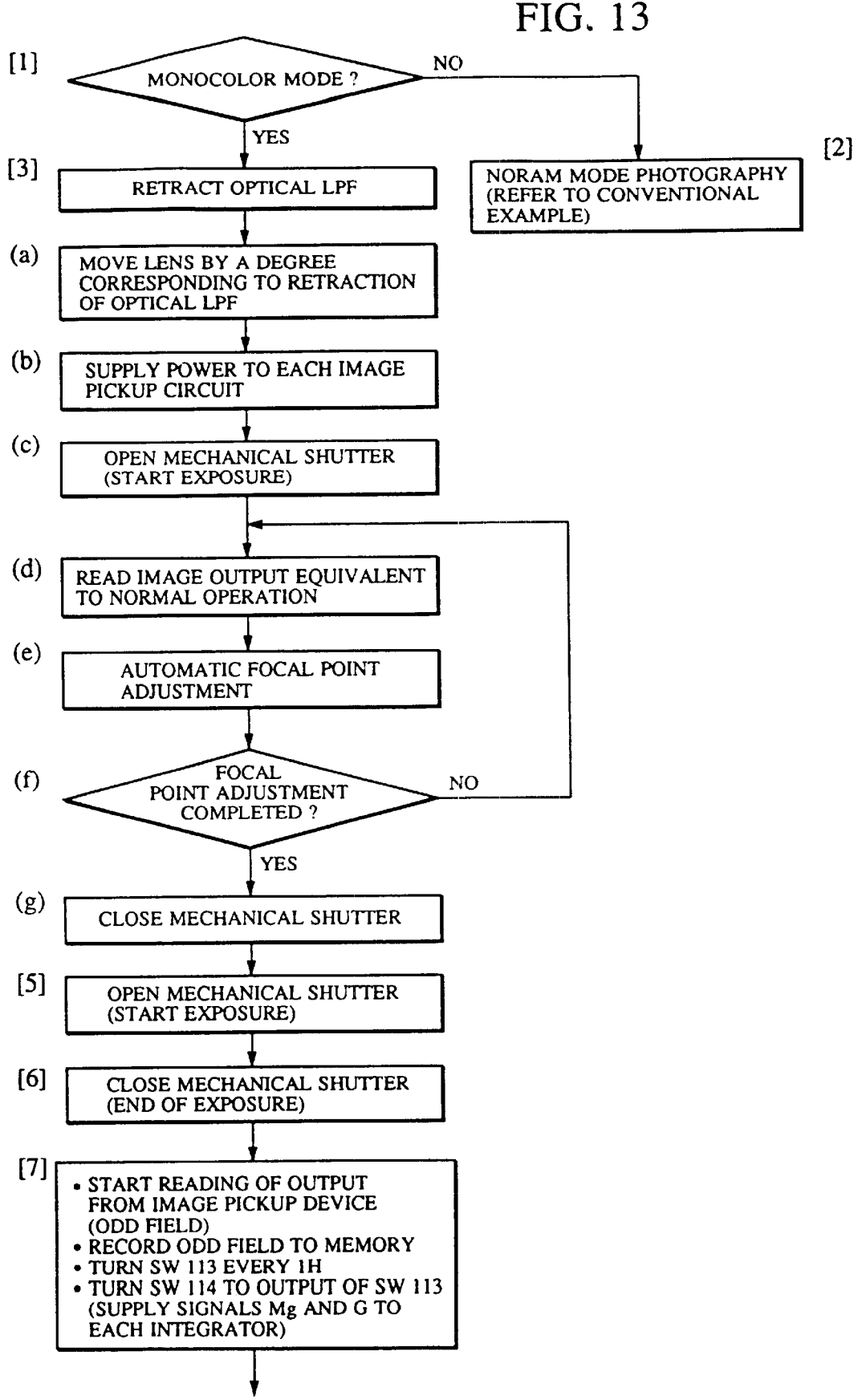
FIG. 13 is a flow chart which illustrates a third embodiment of the present invention.
Figure 14:
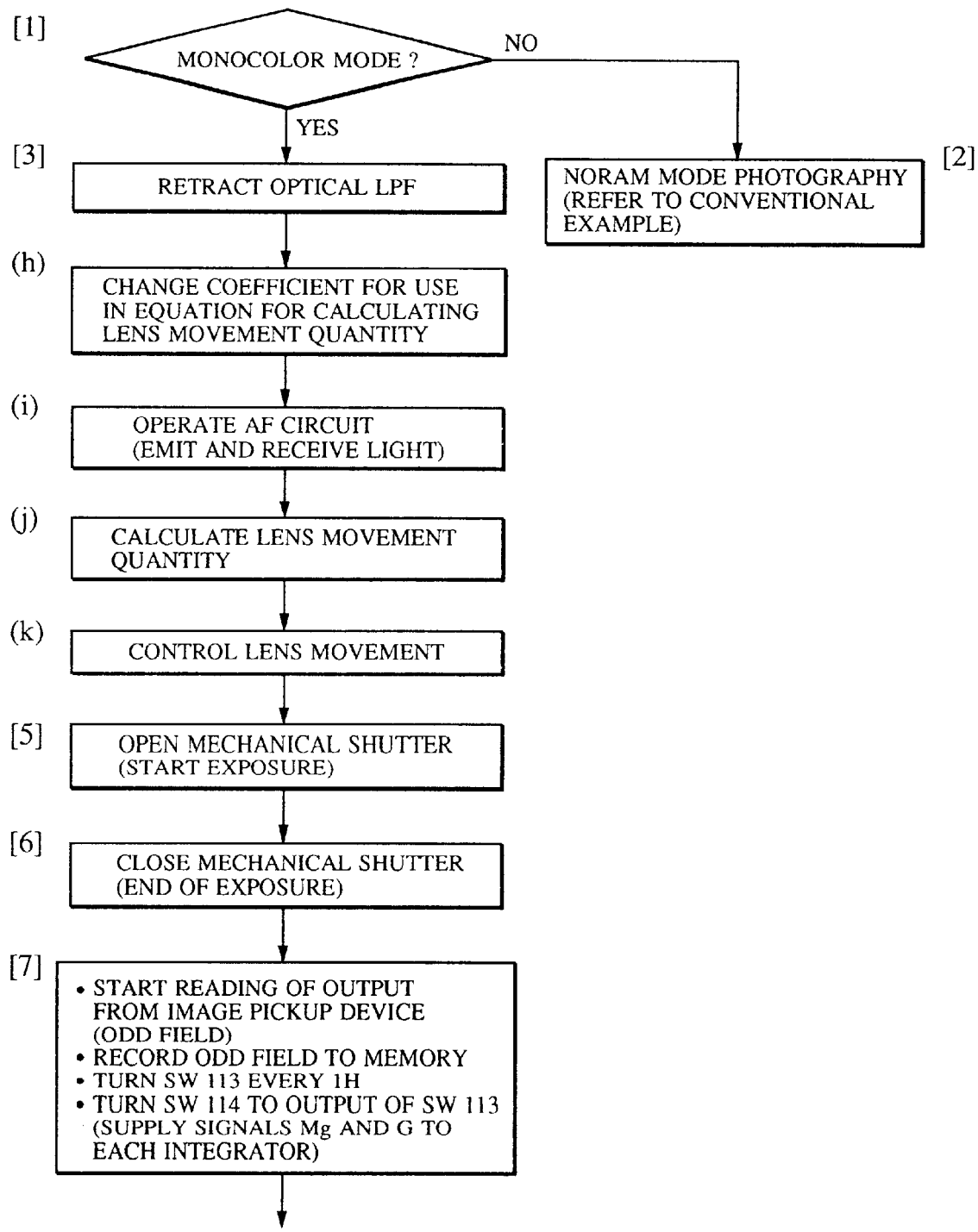
FIG. 14 is a flow chart which illustrates the third embodiment of the present invention.
Figure 15:
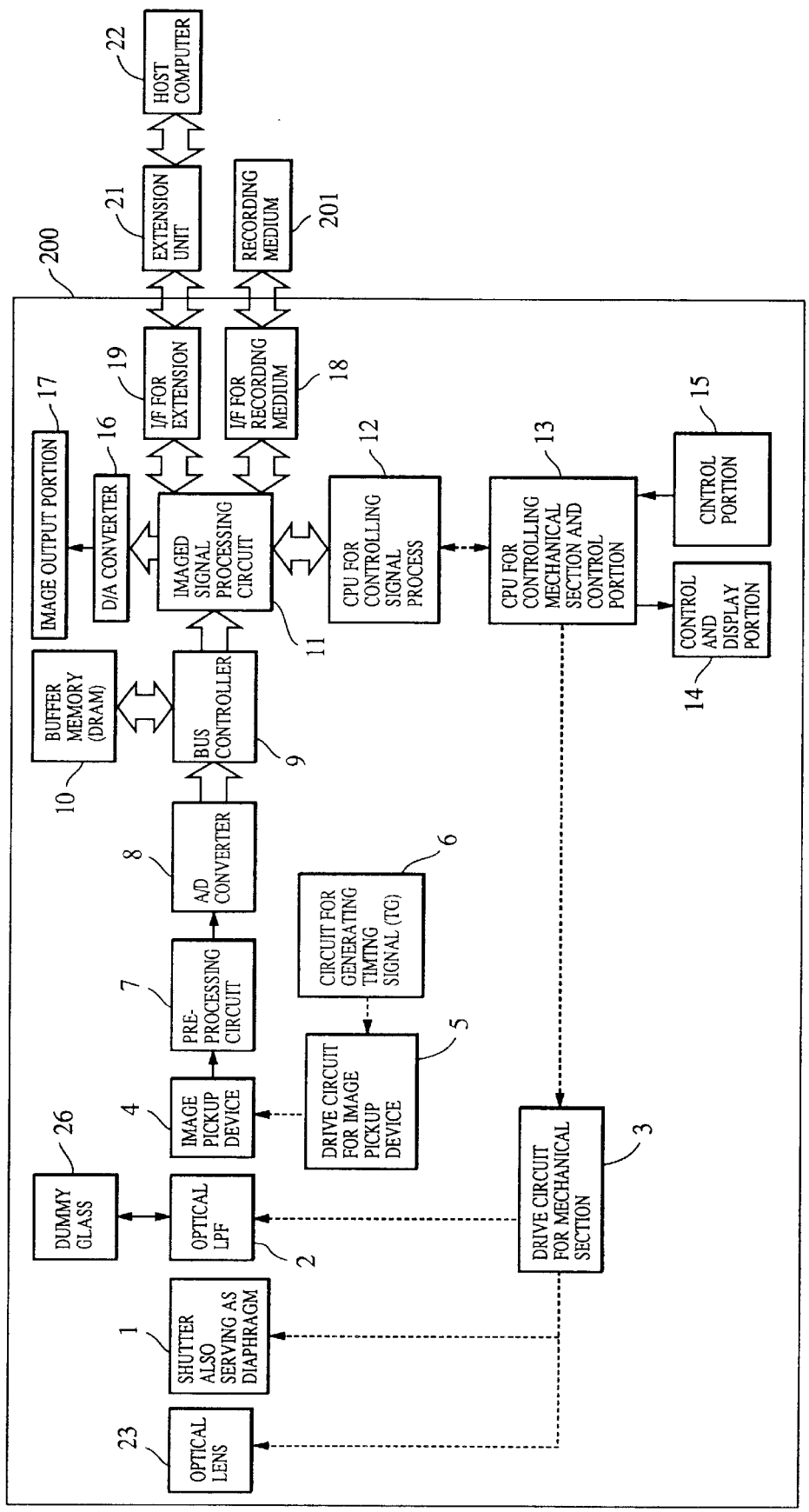
FIG. 15 is a block diagram which illustrates the third embodiment and a fourth embodiment.
Figure 16:
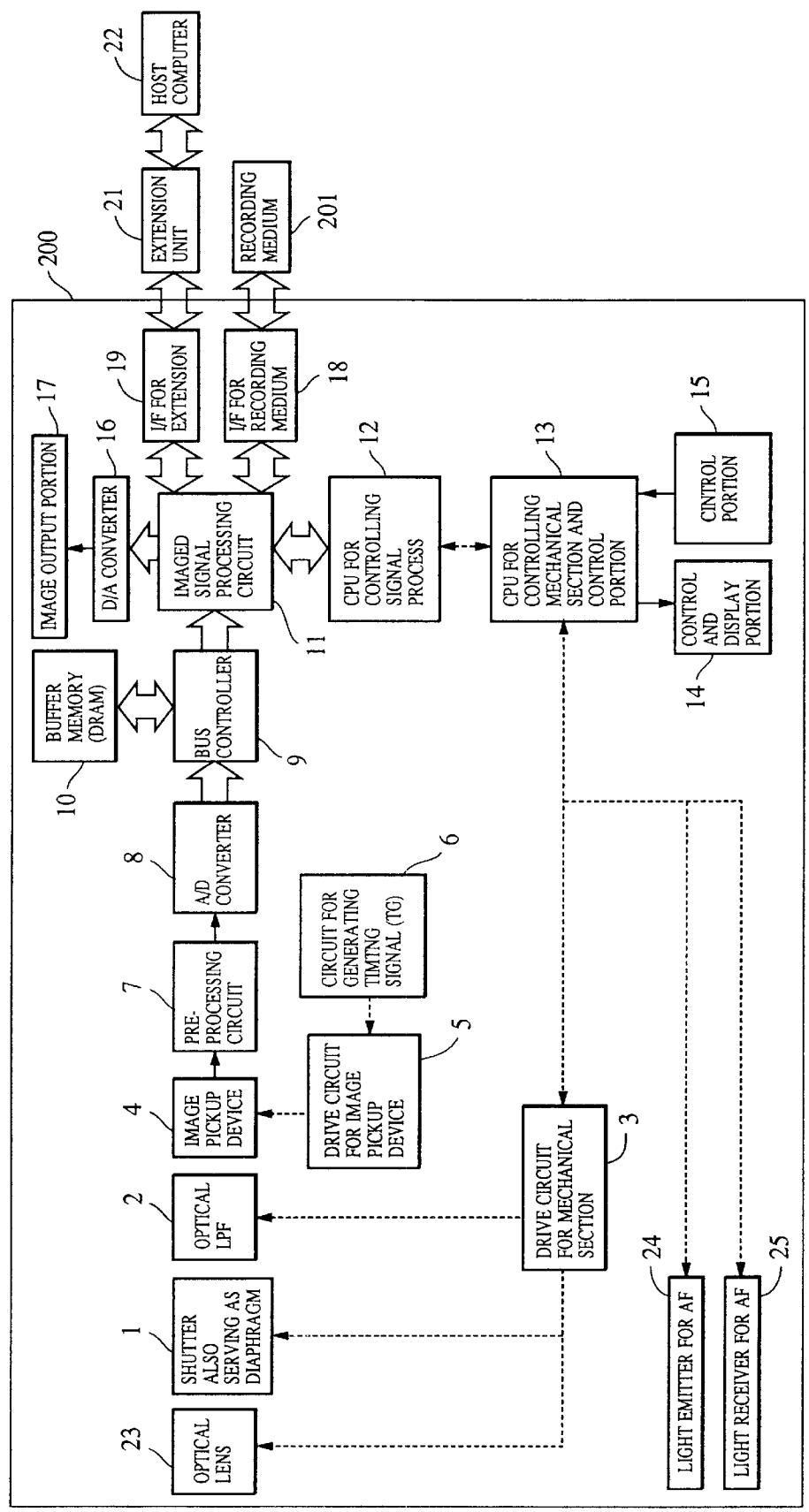
FIG. 16 is a block diagram which illustrates the third and fourth embodiments.

FIGS. 13 and 14 are flow charts which illustrate third and fourth embodiments of the present invention. FIGS. 15 and 16 are system block diagrams which illustrate the third and fourth embodiments. Referring to FIG. 15, reference numeral 23 represents an optical imaging lens. Referring to FIG. 16, reference numeral 24 represents an AF light emitter, and 25 represents an AF light receiver.

Referring to FIGS. 13 and 15, an automatic focusing operation to be performed in accordance with an output from the image pickup device will now be described. Referring to FIG. 13, [1] to [3] and [5] to [7] show the same operations as those according to the first embodiment shown in FIG. 11. In this embodiment, the optical LPF is retracted in step [3], and then the optical lens 23 is moved by the mechanical system drive circuit for a distance corresponding to the previously calculated quantity of deviation of the focal point to be corrected, which has been stored in the mechanical portion controlling CPU 13 and caused from the retraction of the optical LPF (step (a) shown in FIG. 13). Then, power is supplied to each imaging circuit (b), and the mechanical shutter is opened to start exposing operation (c). Then, the output from the image pickup device is read similarly to the normal operation (d), and the automatic focusing operation is performed in response to the read signal (e). Whether or not the focusing operation has been completed is checked in (f). If the operation has not been completed, the operation returns to (d) to read the output from the image pickup device and continue the automatic focusing operation. If the operation has been completed, the mechanical shutter is temporarily closed (g), and the high-resolution imaging operation is performed similarly to the first embodiment at [5].

Then, an active automatic focusing method will now be described with reference to FIGS. 14 and 16.

The optical LPF is retracted in [3] shown in FIG. 14, and the coefficient of the lens movement quantity calculating equation for an AF lens stored in the mechanical portion controlling CPU is changed to a coefficient determined to be adaptable to the length of the optical passage of the optical system in a case where the optical LPF has been retracted. Then, the light emitter 24 and the light receiver 25 shown in FIG. 16 are operated to detect the distance from the object to the camera (i). In accordance with information of the detected distance, the mechanical portion controlling CPU 13 calculates the lens movement quantity (j) to cause the mechanical portion drive circuit to control the lens movement (k). Then, the mechanical shutter is opened to start the exposing operation similarly to the first embodiment [5] to perform the high-resolution photographing operation.

By performing the focusing operation after the optical LPF has been retracted in the monochrome mode as described above, the high-resolution photographing operation can be performed in an optimum focusing state.

After the optical LPF has been retracted, a member that does not considerably deteriorate the resolution and the transmissivity may be inserted while making the length of the optical path to be the same. By adjusting the focal point in the state where the member has been inserted, the range, in which the focusing lens is moved, can be made to be the equivalent range.

Although the description has been made about the case where the optical LPF is retracted, a similar effect can be obtained if the characteristics of the optical LPF are changed without a necessity of changing the structure.

Fifth Embodiment

Figure 17:
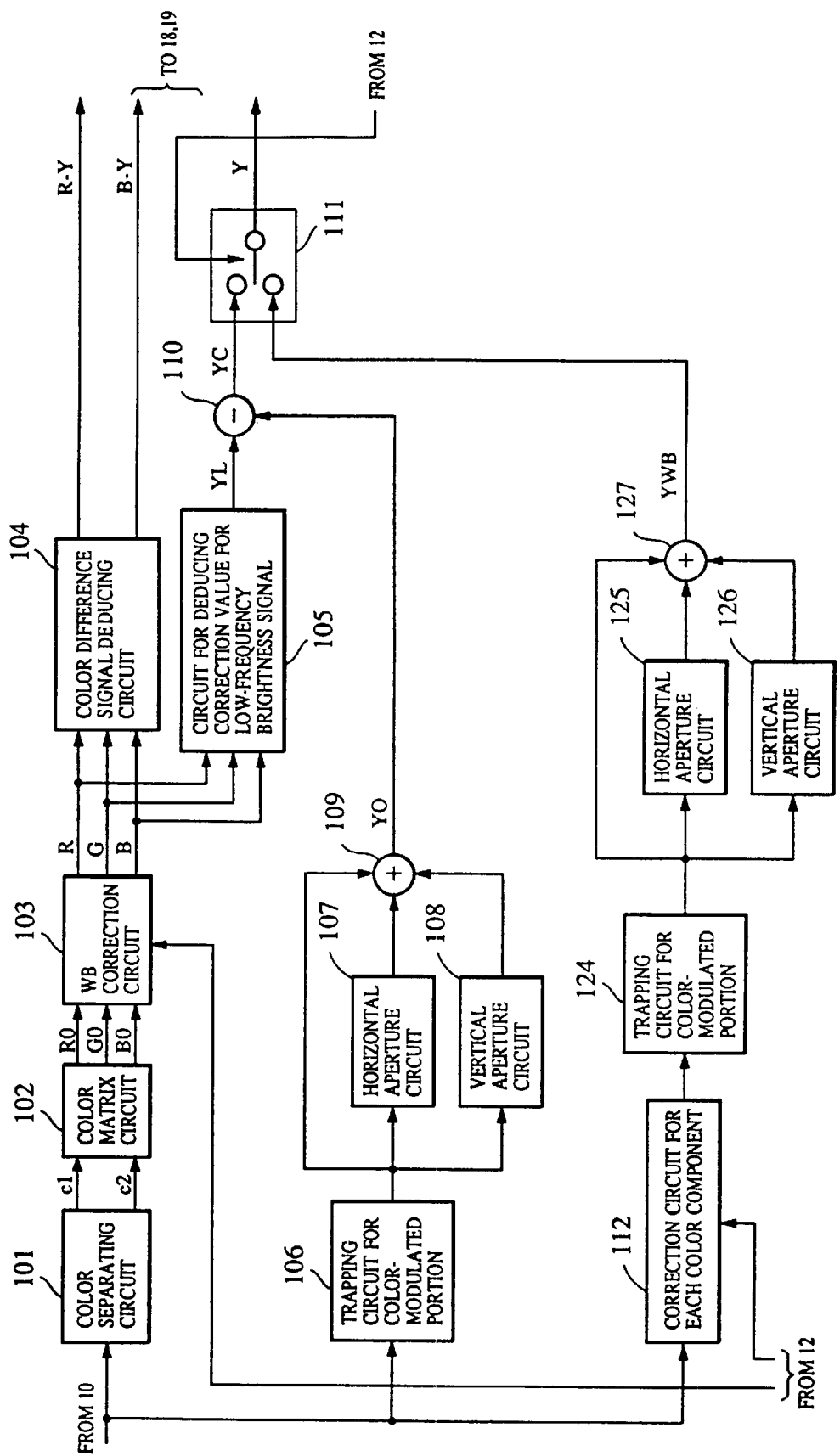
FIG. 17 is a block diagram which illustrates a fifth embodiment of the present invention.
Figure 18I:
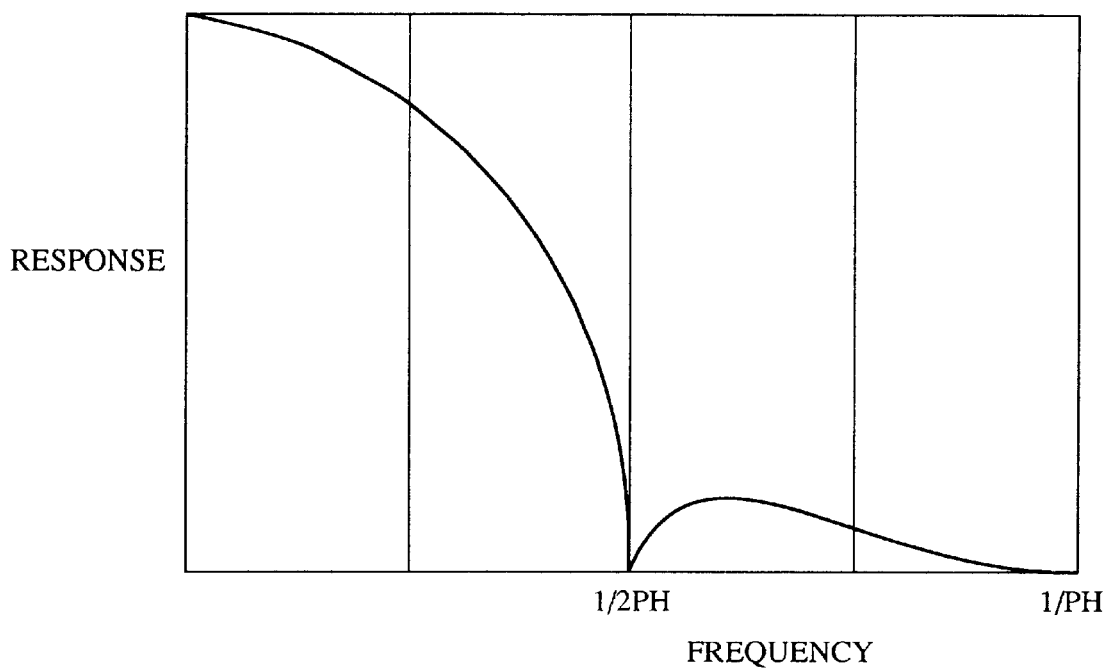
FIG. 18 is a graph showing each filter circuit according to the fifth embodiment.
Figure 18:
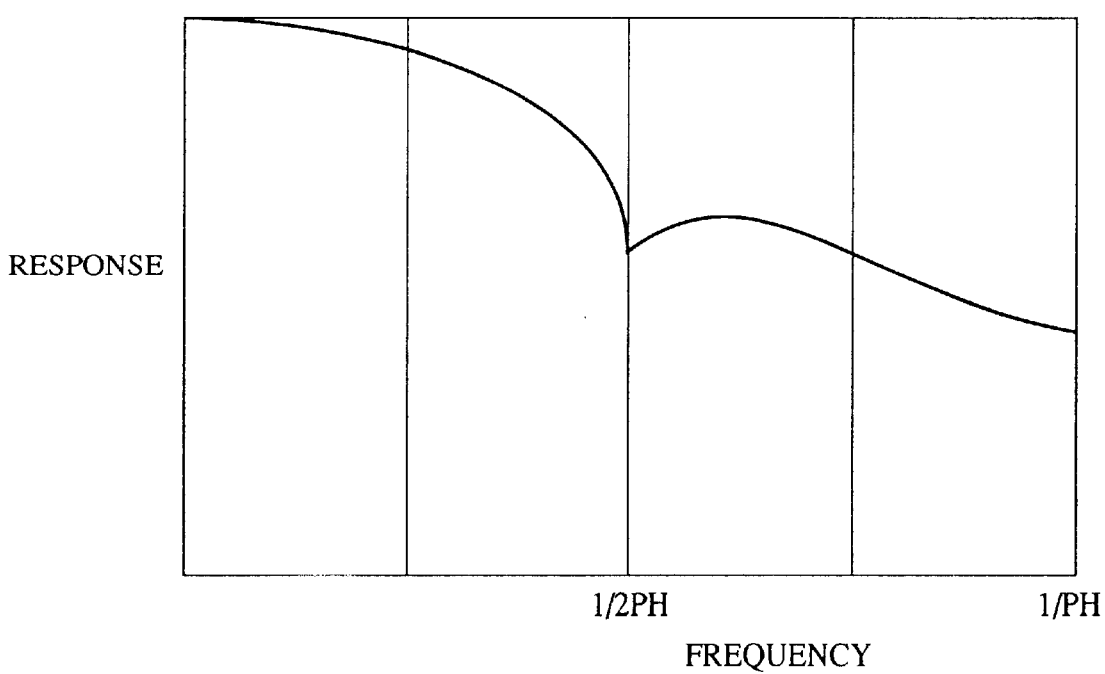
Figure 19:
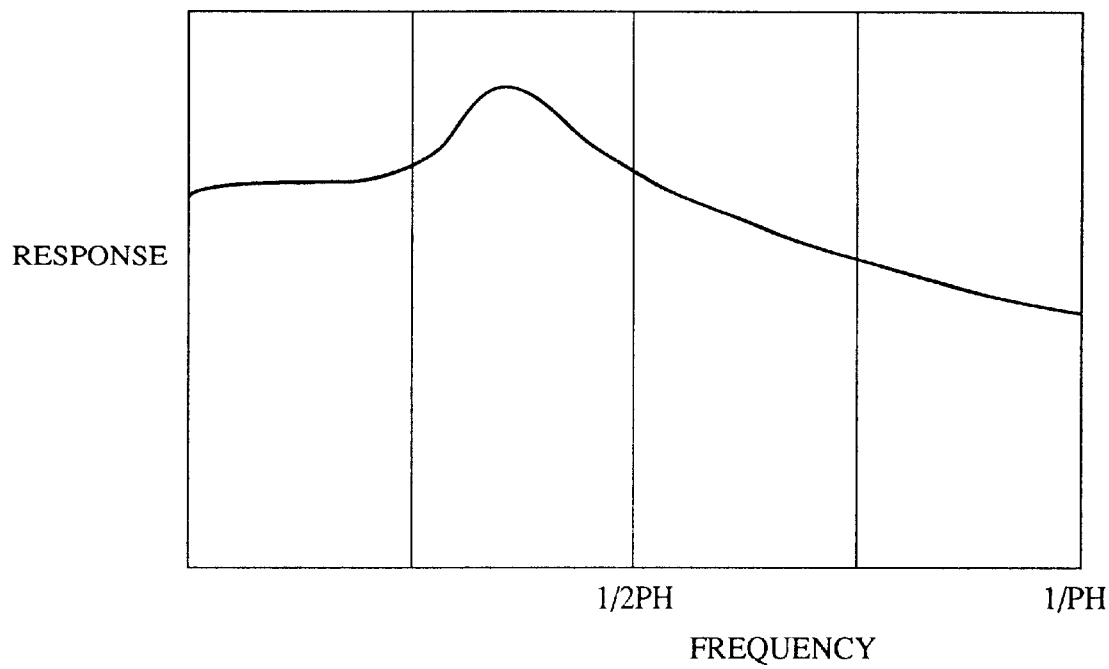
FIG. 19 is a graph showing each filter circuit according to the fifth embodiment.
Figure 19:
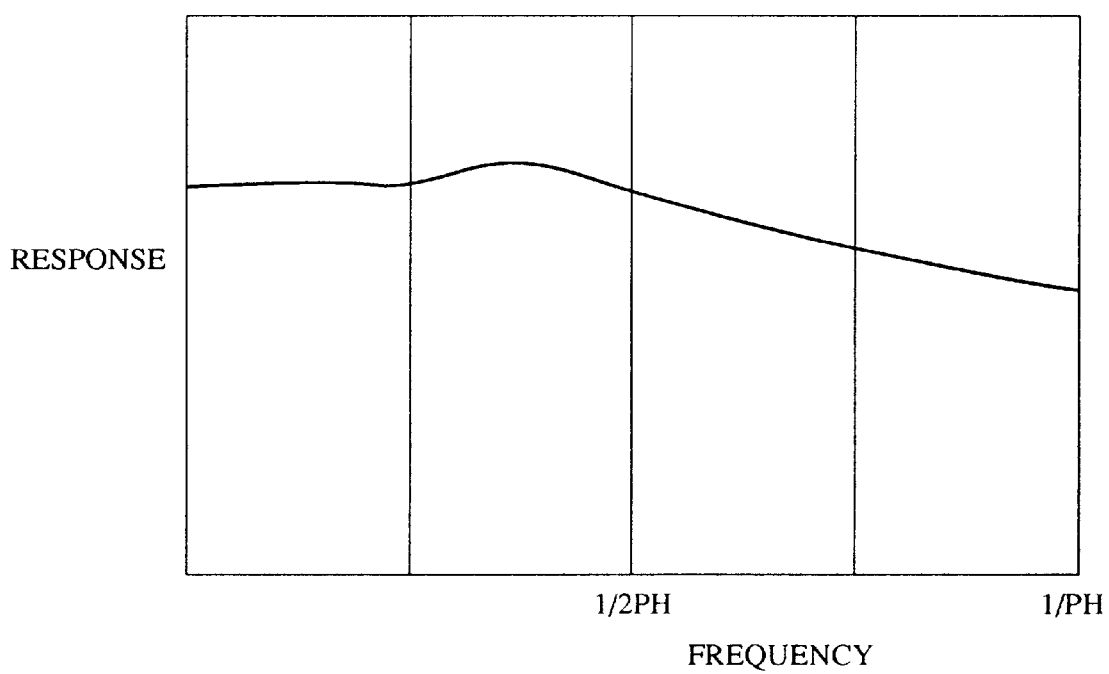

FIG. 17 illustrates a fifth embodiment of the present invention in which a portion of an image signal processing circuit is illustrated. Referring to FIG. 17, reference numeral 124 represents a color modulated portion trapping circuit for removing the color modulated portion overlapping on the image signal, 125 represents a horizontal aperture circuit, 126 represents a vertical aperture circuit and 127 represents an adder. FIGS. 18 and 19 are graphs showing the characteristics of the filter circuit according to this embodiment.

The operation of the color component correction circuits 112 in the monochrome mode is the same as that according to the first embodiment. As an alternative to the color component correction circuits 112 according to the first embodiment that comprises the multipliers serving as the main component, another structure may be employed in which data items obtained by shifting the input by 1−n bit are, in place of using the multipliers, added while combined in a predetermined manner by the control performed by the CPU 12. In this case, the accuracy of the multiplication deteriorates as compared with the case where usual multipliers are used if n is a small value.

The output is, by the color-modulated portion trapping circuit 124 similarly to the brightness signal in the normal mode, subjected to a process for removing the color modulated portions that could not be corrected by the correction circuit 112. Then, the outline components are highlighted by the horizontal aperture circuit 125 and the vertical aperture circuit 126, and are added to each other. However, the frequency characteristics of the circuits are made to be different from those in the normal mode.

As compared with the normal mode (i) in which a large quantity is trapped at frequency ½ PH, the monochrome mode (image pickup device 4) according to this embodiment is able to reduce the quantity trapped. As a result, the color modulated portions that could not be corrected by the color component correction circuits 112 can be removed by the color modulated portion trapping circuit 124. Furthermore, the setting that the reduced quantity trapped enables a high resolution signal to be obtained without considerable deterioration in the resolution.

FIG. 19 is a graph showing the characteristics of the horizontal aperture circuit 125. As can be understood from FIG. 19, also the horizontal aperture signal has characteristics that the highlighted quantity in the monochrome mode (ii) can be reduced as compared with that in the normal mode (i). The reason for this is that the removal of the optical LPF causes the deterioration in the frequency characteristics to be prevented and thus the necessity of considerably highlighting the outline can be eliminated. Furthermore, excessive highlighting is omitted which results in deterioration in the image quality, such as the phase shift of the signal and ringing. Also the vertical aperture is arranged such that the quantity of the aperture is reduced as compared with that in the normal mode.

In a case where there is a desire for highlighting the outline of an output of a photographed image, such as characters or illustrations, a method may be employed in which the degree of aperture is intensified in the monochrome mode on the contrary so that an image, which can be discriminated further easily and which has a high resolution, is sometimes obtained. In particular, a digital FIR filter is used to perform the signal process while maintaining the linear phase so that a high grade and high resolution image can be obtained without deterioration in terms of the image quality, such as the phase deviation. By switching the emphasizing frequency band and the central frequency between the first and second modes, higher grade images can be obtained in both modes.

Sixth Embodiment

Figure 20:
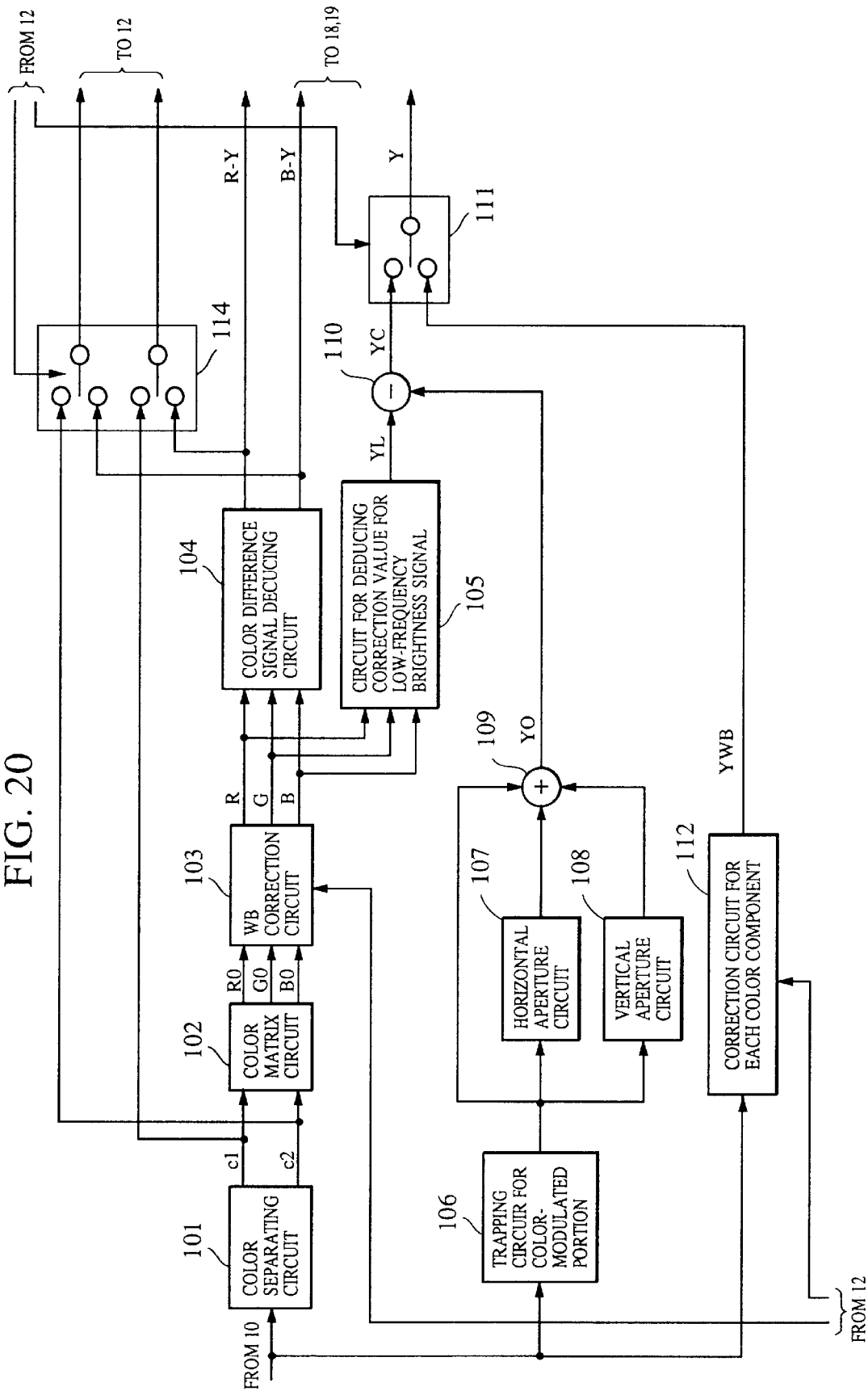
FIG. 20 is a block diagram which illustrates a sixth embodiment of the present invention.

Although the foregoing embodiments have the arrangement that the image signal processing circuit 11 constitutes the integrators for detecting the color component correction signals, the integrating circuits 115 and 116 and their SW 113 according to the first embodiment are omitted as shown in FIG. 20 to transfer the color-separated signals c1 and c2 to the CPU 12. The signal process controlling CPU 12 calculates the average of addition of the supplied color-separated signals to integrate the signals. Since Mg and G signals are alternately transmitted every 1 H in the ODD field at the foregoing time, all color signals are sampled every 2 H in the CPU 12 to add the signals. That is, Mg is always calculated as the c1 signal and G is always calculated as the c2 signal in the ODD field. In the EVEN field, Y1 is calculated as the c1 signal and Cy is calculated as the c2 signal.

As a result, the necessity of changing the order of the sampling signals in the calculation to be performed by the CPU 12 can be eliminated. Thus, the program can be simplified.

Seventh Embodiment

Figure 21:
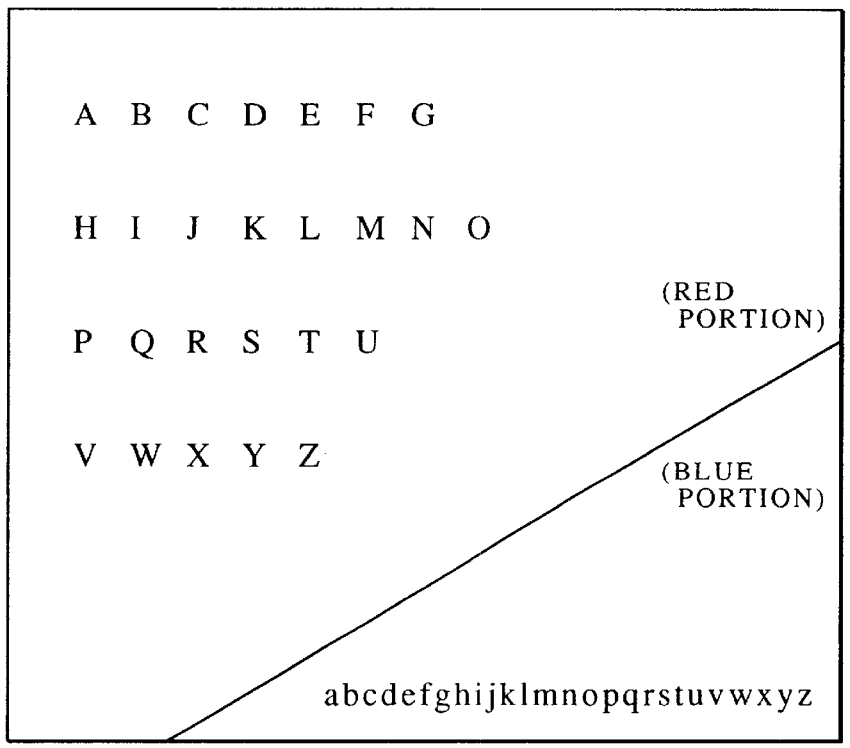
FIG. 21 is a diagram which illustrates a display according to a seventh embodiment of the present invention.
Figure 21:
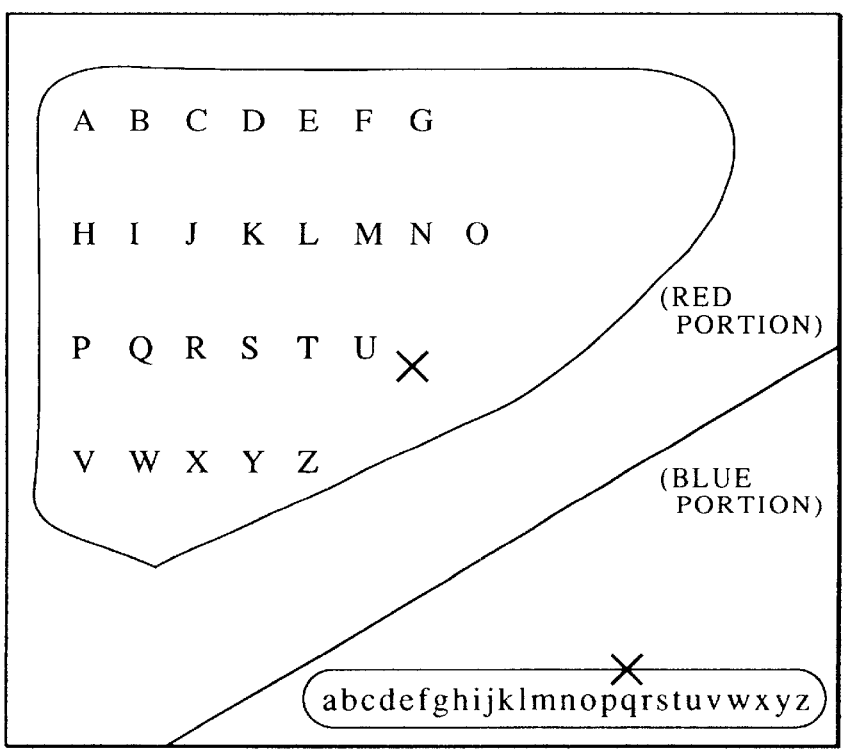
Figure 22:
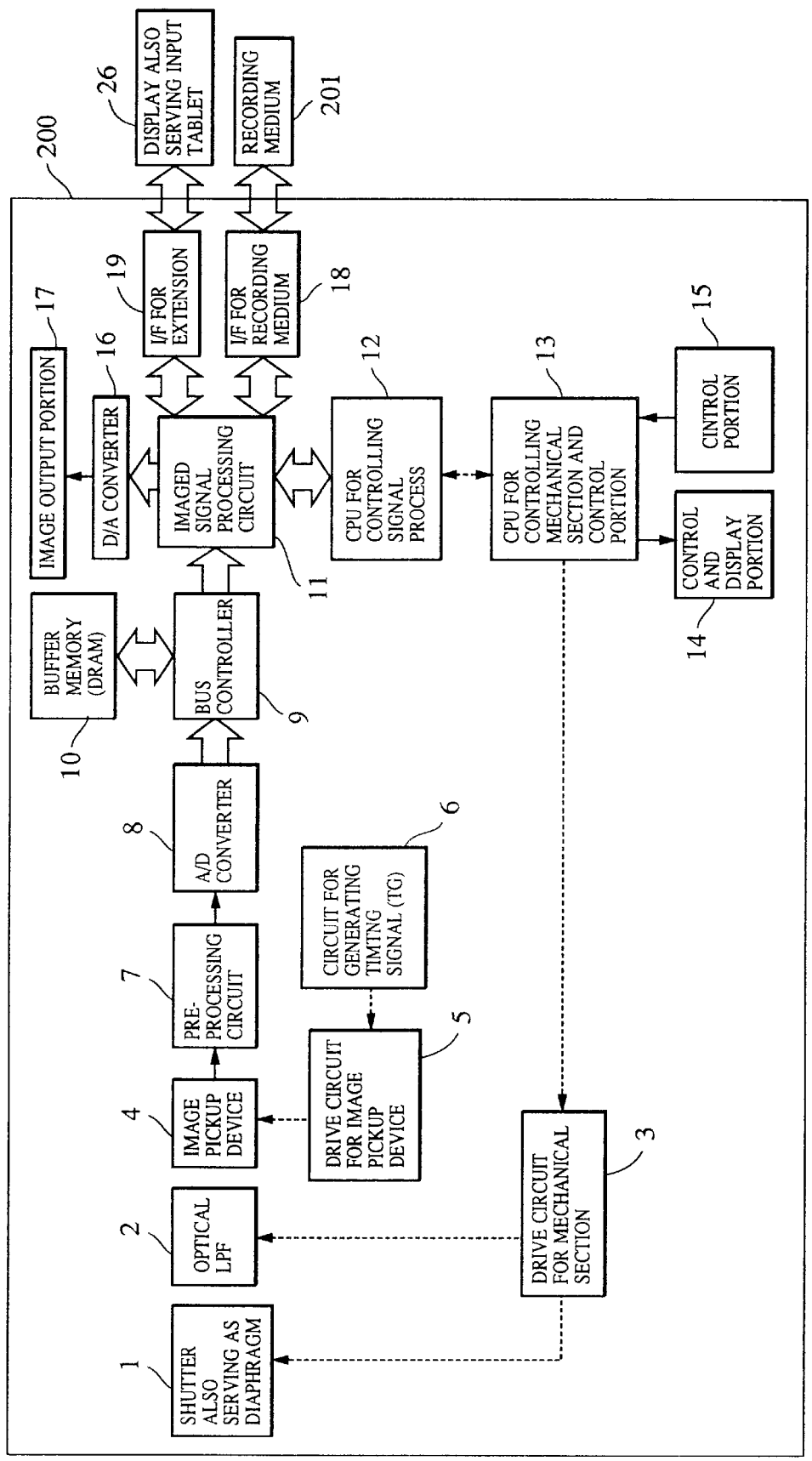
FIG. 22 is a block diagram which illustrates the seventh embodiment of the present invention.

FIGS. 21 and 22 are diagrams which illustrate a seventh embodiment of the present invention. Referring to FIG. 22, reference numeral 26 represents a display unit also serving as an input means of a pen input type or the like. FIG. 21 is a diagram which illustrates a display made on the display 26 also serving as the input means.

In this embodiment, an object is photographed in a normal kinetic mode prior to performing the high-resolution photographing operation and the image is displayed on the display 26 also serving as the input means. The image is photographed similarly to the conventional structure, and thus the picked up image is supplied to the display 26 also serving as the input means through the extension I/F 19.

The photographer instructs, with the input means, such as a pen, a portion among the image displayed on the display 26 also serving as the input means intended to be photographed in the monocolor mode as shown in FIG. 17 (2). Referring to FIG. 17, (1) shows a screen displayed on the display unit in a normal photography mode, in which the upper left portion indicates a red portion and the lower right portion indicates a blue portion. If the photographer intends to photograph a picture at a high resolution in the monochrome mode, the portion is supplied with the pen input unit while surrounding the portion as shown in (2). When an instructed range is supplied, the photographing operation is switched to the monochrome mode, the output representing the picked up image is stored in the memory, and an output obtained by processing data stored in the memory is displayed. The address of the instructed range with respect to the image signal thus frozen in the memory is supplied from the display 26 also serving as the input means to the image signal processing circuit 11 and the signal process controlling CPU 12 through the extension I/F 19. In accordance with supplied address information, the CPU 12 sequentially reads only data in the foregoing range from the buffer memory 10. In the case of FIG. 21 (2), the red surrounded portion is first read and the operation according to the first embodiment is performed in the foregoing range so that the high-resolution photographing operation in the foregoing range is enabled. Then, the blue surrounded portion shown in FIG. 21 (2) is read and the signals in this portion are subjected to the operation similar to that according to the first embodiment.

As a result of the structure thus made, an object of two or more colors can be photographed with a high resolution in such a manner that a photographer appoints the monochrome portion is appointed by a photographer and the portions are independently subjected to the operations similar to those of the first embodiment.

In the foregoing embodiment, mark X is, by a pen or the like, drawn in an arbitrary portion on the display as shown in FIG. 21 (2) to supply the address of the intersection to the CPU 12 through the extension I/F, and only color information of the foregoing portion is obtained by a signal process to be supplied to a recording medium or the display 26 also serving as the input means so that recording and display are enabled while making color information to be adaptable to the high resolution information. In the foregoing case, the capacity of the color information can be reduced. Therefore, an advantage can be realized in recording and communication. In addition, information of color irregularity and false colors are erased in this case. Therefore, the necessity of correction can be eliminated in the information process to be performed afterwards. Thus, the information can be treated easily.

Eighth Embodiment

Figure 23:
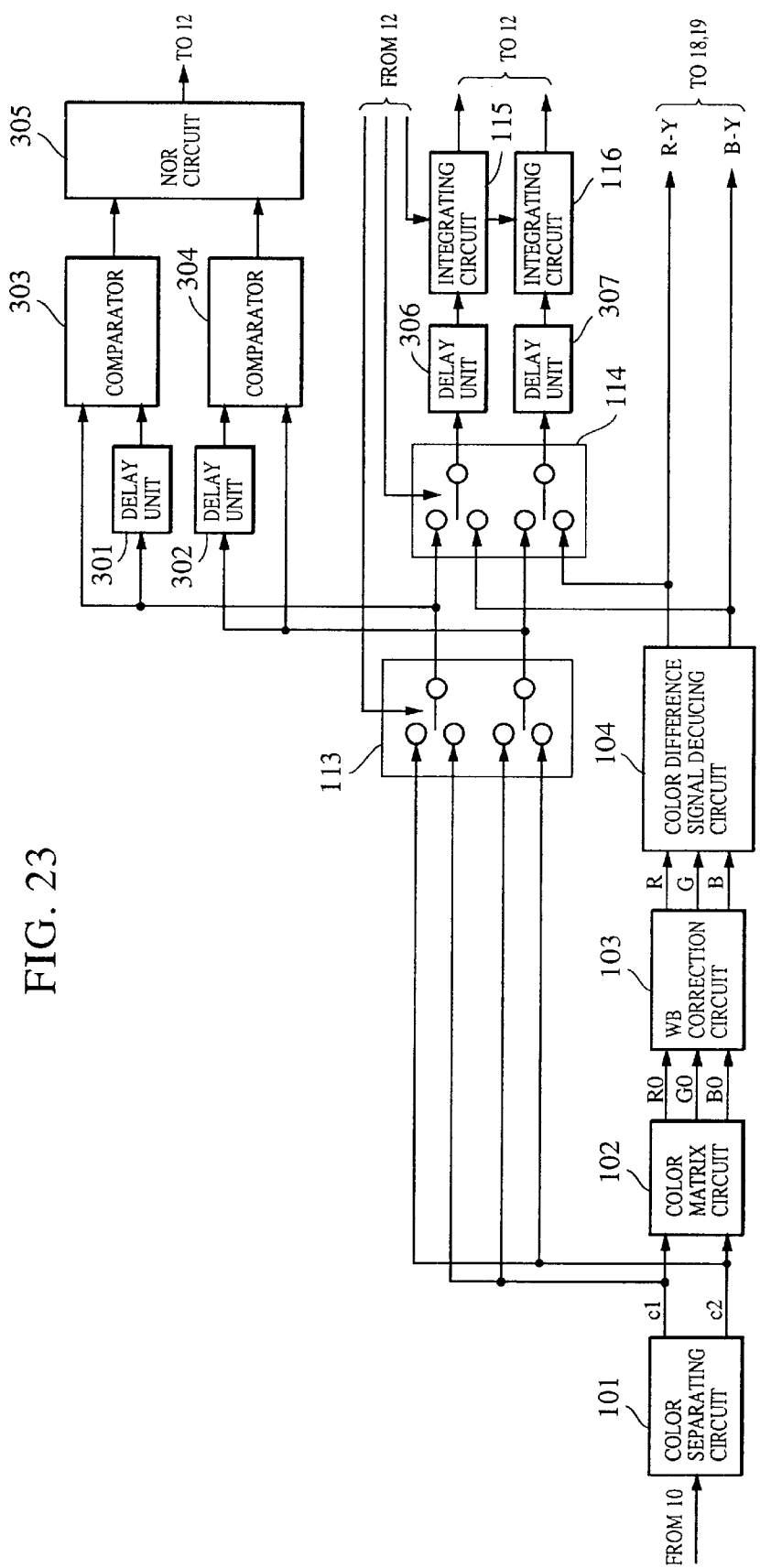
FIG. 23 is a block diagram which illustrates an eighth embodiment of the present invention.

FIG. 23 is a diagram which illustrates a portion of the block structure of the image signal processing circuit 11 according to an eighth embodiment of the present invention. Reference numerals 301 and 302 represent delay units for delaying color separated signals by one clock, 303 and 304 represents comparators for comparing the two input levels, 305 represents an NOR circuit for obtaining the NOR of the outputs from the comparators 303 and 304, and 306 and 307 represent delay units for delaying the color separated signals.

Referring to FIG. 23, this embodiment will now be described.

The outputs c1 and c2 representing the separated colors are, in the monochrome mode, supplied to the delay units 301 and 302, the comparators 303 and 304 and the delay units 306 and 307 when the operation shown in [7] shown in FIG. 11 is performed. The color signals are delayed by one clock in the delay units 301 and 302 and transmitted from the same. The same signals are supplied to the comparators 303 and 304, that is, the color separated signals and pixel signals in the same color and positioned forward by one are supplied to the comparators 303 and 304. The comparators 303 and 304 compare the levels of two input signals, the delay signal and the non-delay signal. If the difference between the two signals is within a predetermined range, the comparators 303 and 304 transmit high-level signals. The NOR circuit 305 detects whether or not either of the signals from the comparators 303 and 304 has high level. If either signal has a high level, the NOR circuit 305 supplies a detection signal to the CPU 12.

The CPU 12 stores the address of the pixel corresponding to the moment the detection signal has been transmitted, detects and stores the outputs from the integrating circuits 115 and 116, and resets and restarts the integrating circuits 115 and 116 to perform the integrating operations. At this time, the outputs from the delay units 306 and 307 have been supplied to the integrating circuits 115 and 116 and information before the color information is changed is integrated.

As a result of the foregoing operation, the CPU 12 stores color division points of the object and integrated values of data of the color pixels.

When signals of the pixels are read from the memory at [14] shown in FIG. 11, the color correction circuit 112 performs the correction in accordance with data integrated before the change point until the correction operation reaches the address of the color change point stored in the CPU 12. From the change point, the color correction circuit 112 performs the correction in accordance with the integrated data from the change point to the next change point.

As a result, the color division points of an object that are divided into a plurality of color regions can automatically be detected and an optimum correction for the colors can be performed. Thus, color portions of such an object can be received with a high resolution.

By extracting the color of an arbitrary point between the division points to record or supply to the extension unit, color information for each divided region can efficiently be collected.

If the color division points are positioned nearly, the portions are usually segments of characters or drawings, in particular, they are usually black characters or black lines. In the foregoing case, the regions may be omitted from the divided region and they may be processed with the same value as the correction value for the previous for following region. In the foregoing case, the color separated signals may be compared with predetermined signal levels, and if they are lower than a predetermined level they may be determined to be black characters or black lines to inhibit the color correction.

Ninth Embodiment

Figure 24:
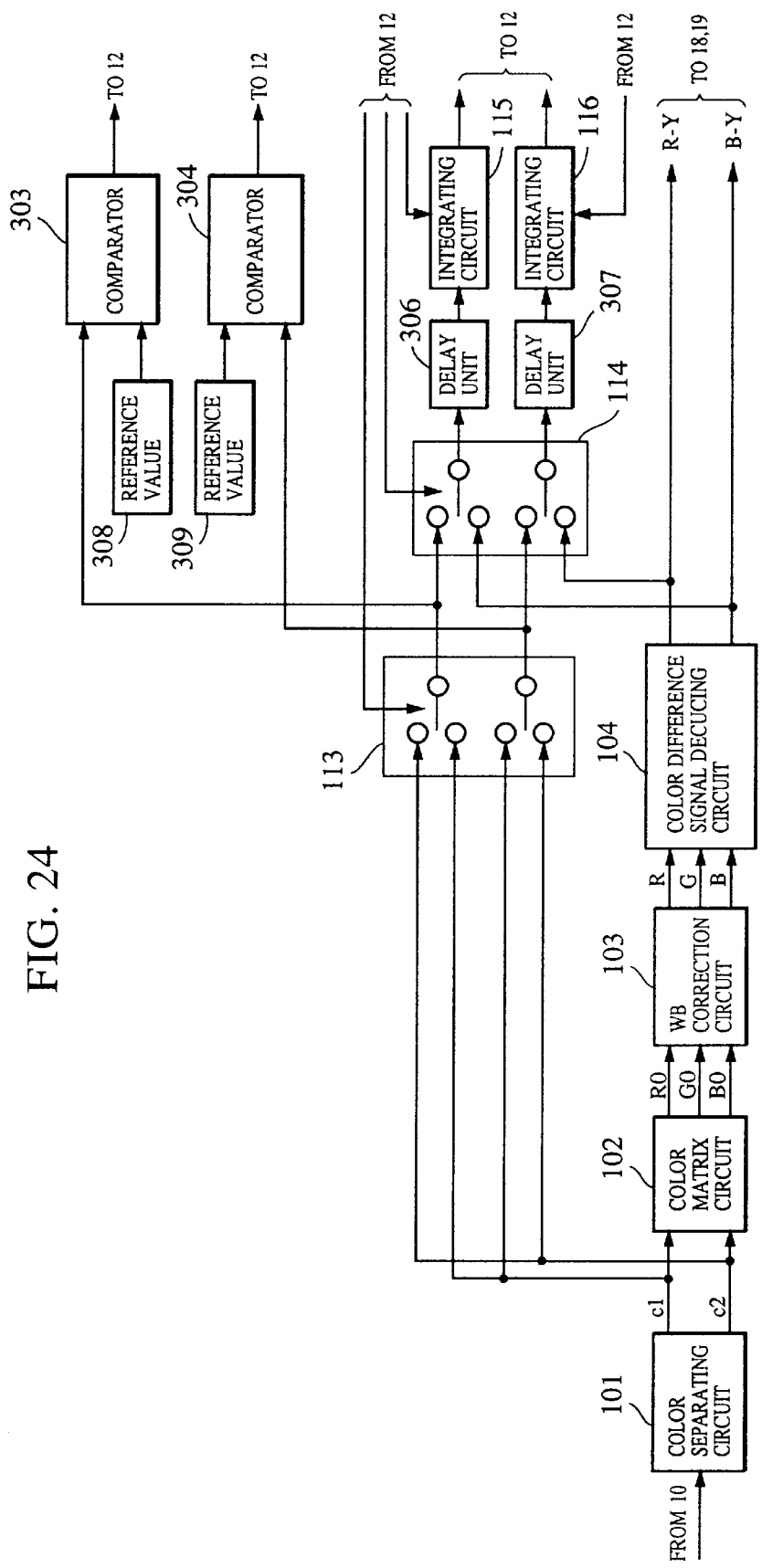
FIG. 24 is a block diagram which illustrates a ninth embodiment of the present invention.

FIG. 24 is a diagram which illustrates a ninth embodiment of the present invention. Reference numerals 308 and 309 represent circuits for generating a reference value corresponding to a predetermined signal level.

Although the foregoing embodiments have the arrangement that all image signals in the range are integrated, this embodiment has an arrangement that the levels of the outputs from reference value circuits 308 and 309 and those of the color signals are compared. If a signal having a level lower than a predetermined level, a detection signal is supplied to the CPU 12. The average of addition of only the detected signal portions is obtained in an integrating circuit 15. In this case, the integration period for the integrating circuits 115 and 116 is controlled by the CPU 12.

Tenth Embodiment

Figure 25:
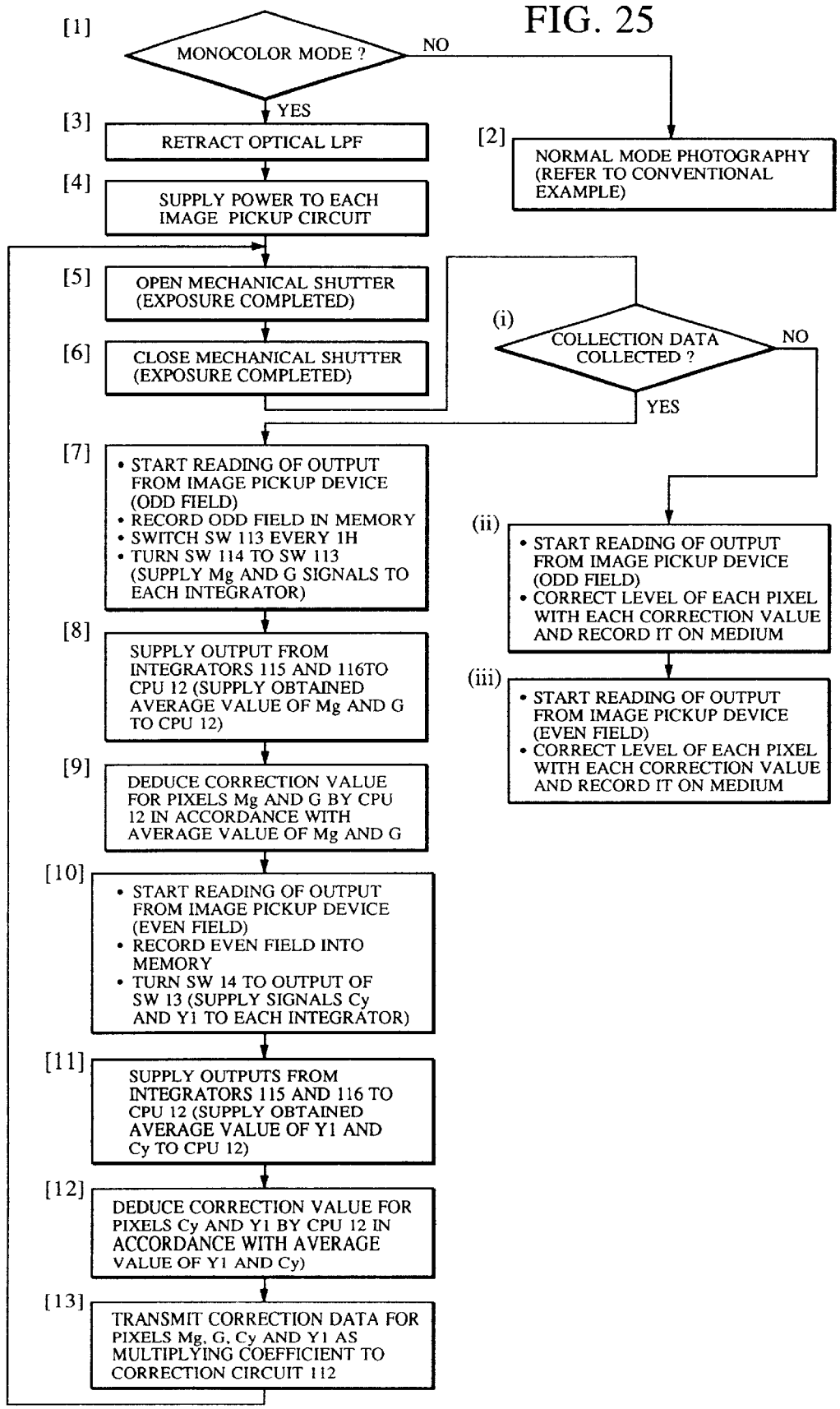
FIG. 25 is a flow chart which illustrates a tenth embodiment of the present invention.

FIG. 25 is a flow chart which illustrates a tenth embodiment of the present invention.

As shown in FIG. 25, the operations [1] to [14] according to this embodiment are the same as those according to the first embodiment. At step [6] the mechanical shutter is closed and thus the exposing operation is completed, and then whether or not the mode is the data collection mode for color correction is confirmed (i). If the mode is the data collection mode for color correction, operations [7] to [13] are performed and the operation returns to [3]. If the mode is the data collection mode for color correction but correction data has been deduced, the signals are again read from the image pickup device in the order of ODD and EVEN and each pixel data is corrected in accordance with the deduced correction data to record the corrected data on the medium (ii) and (iii).

By performing calculations in response to the image pickup signals to temporarily deduce the correction values before performing the photographing operation, an object serving as a reference can be photographed previously (for example, white paper is photographed or a white margin portion of the document sheet is previously photographed while being zoomed up). Therefore, precise correction can be performed and thus high resolution and monochrome mode photography can be performed regardless of the type of the object.

By previously photographing white paper and by storing data of the white paper as reference data by the foregoing operation routine, influence of shading and fixed noise can be eliminated.

Eleventh Embodiment

Figure 26:
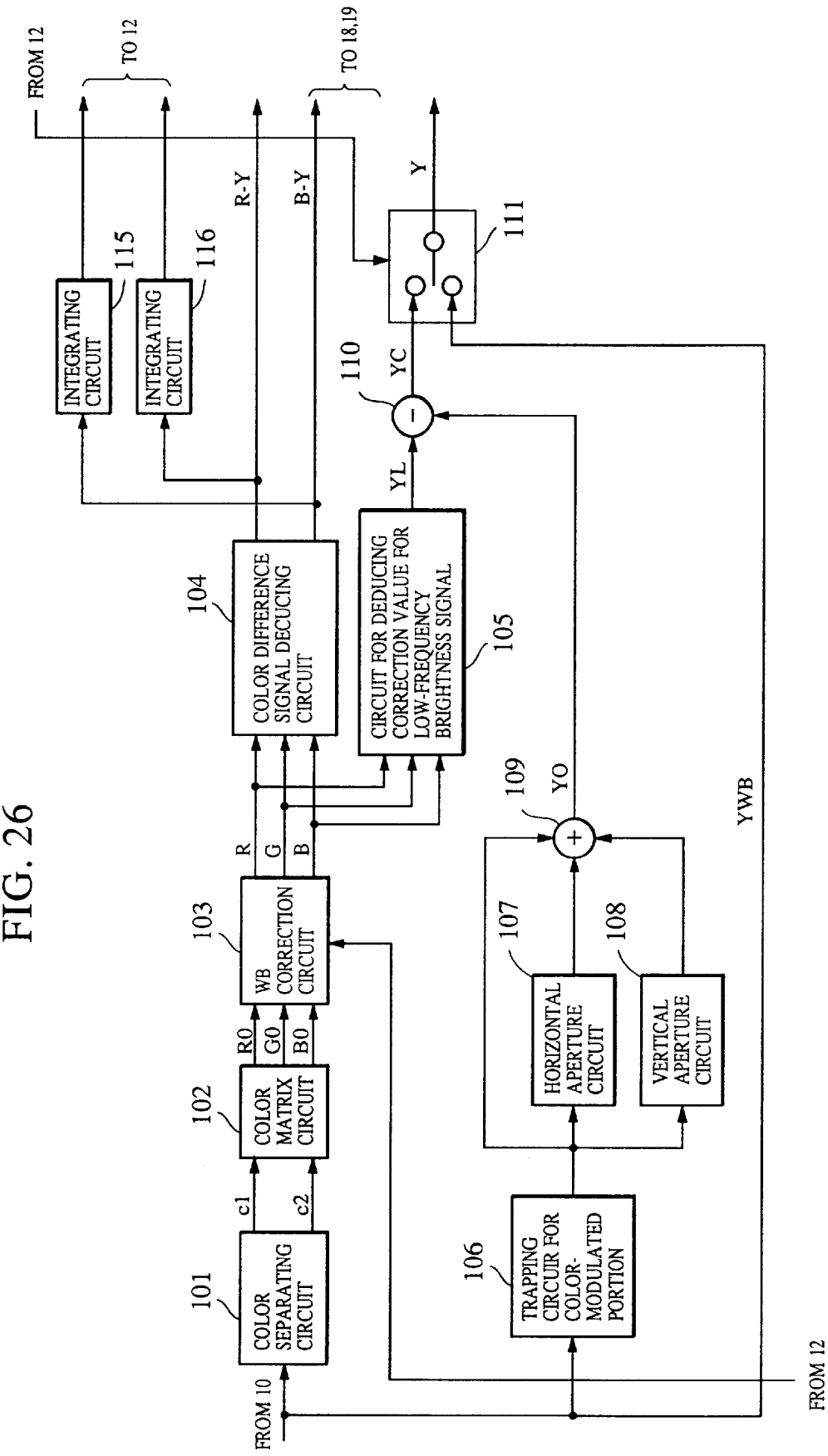
FIG. 26 is a block diagram which illustrates an eleventh embodiment of the present invention.

FIG. 26 is a block diagram which illustrates the image signal processing circuit 11 according to an eleventh embodiment.

In this embodiment, digital data output from the image pickup device is not processed and supplied to the recording portion or the extension unit through the SW 111 in the monocolor mode.

In this embodiment, the processes according to the foregoing embodiments are performed by the host computer or the extension unit. Therefore, the output from the image pickup device is, as required data, supplied through the recording portion or the extension unit.

Twelfth Embodiment

Figure 27:
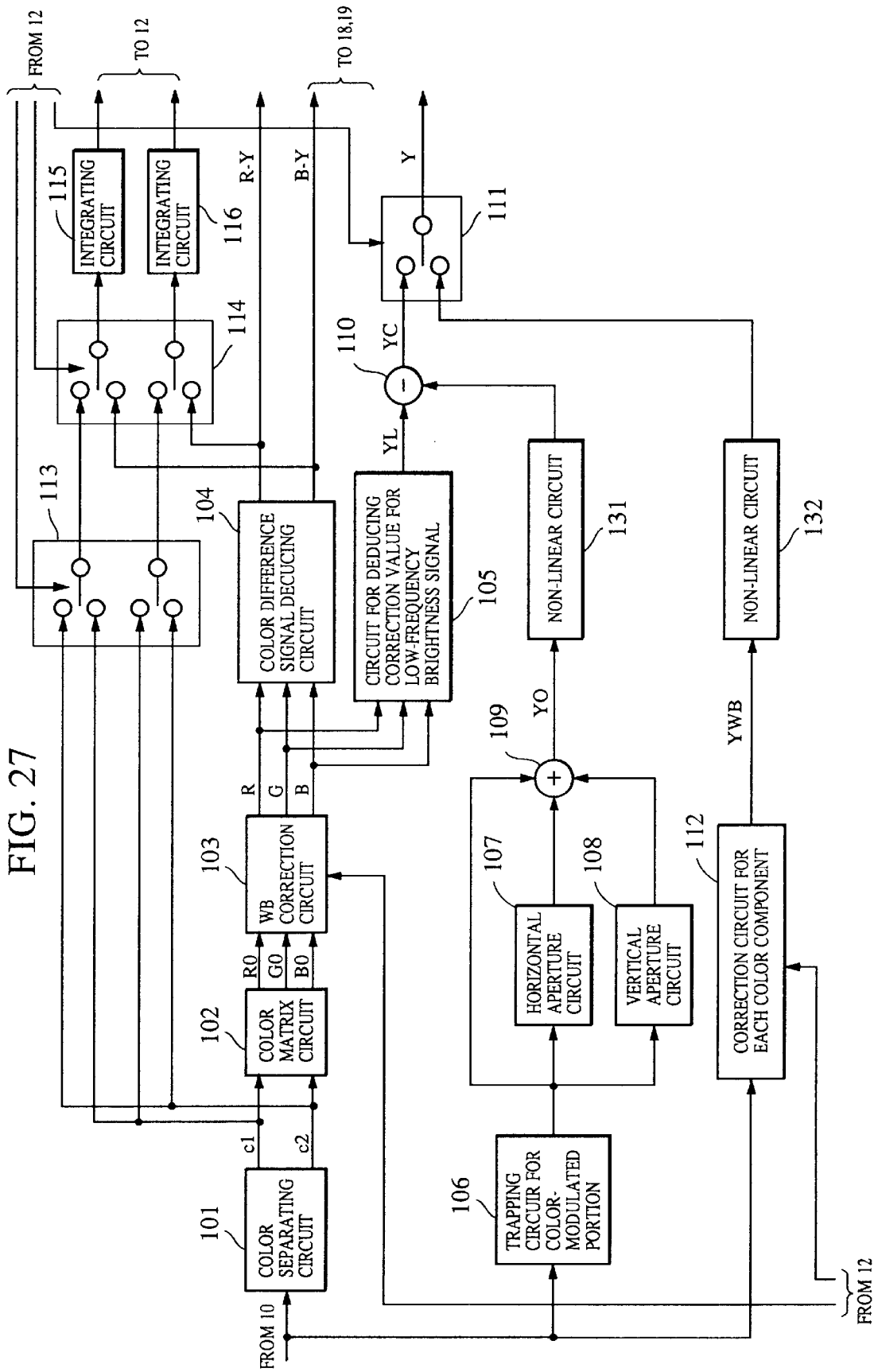
FIG. 27 is a block diagram which illustrates a twelfth embodiment of the present invention.

FIG. 27 is a block diagram which illustrates the image signal processing circuit 11 according to a twelfth embodiment. Reference numerals 131 and 132 represent non-linear circuits.

Although the brightness signal system for the normal mode and the non-linear circuit (for performing a γ-process and a knee process) for processing the correction image pickup signal are omitted from illustration, the non-linear circuit 131 is disposed in the rear of the adder 109 in the normal mode as shown in FIG. 27.

The signal processing circuit system in the monocolor mode comprises the non-linear circuit in the rear of the color component correction circuits 112.

By disposing the non-linear circuits at the foregoing positions, the correction gain can be determined without dependency on the level of the pixel. If the non-linear circuit is disposed in front of the correction circuit 112 for example, the influence of the non-linear circuit raises a necessity of setting the correction value for the correction value for each level of the pixels. In this case, the circuit cannot be simplified and the size of the same cannot be reduced.

The characteristics of the non-linear circuit 132 can be made to be non-linear characteristics adaptable to the monocolor mode by making the characteristics of the non-linear circuit 132 to be different from those of the non-linear circuit 131 of the circuit system in the normal mode.

By setting the gamma of the non-linear circuit 132 to be larger than 1, further high contrast signal can be transmitted and an advantage can be realized when characters or drawings are photographed.

As described above, the natural image photographing mode and the high resolution monochrome mode are provided, the optical LPF is changed and the color correction for each pixel signal or non-interlace process is performed, so that high resolution photography of a specific object, such as characters or drawings, that must have a high resolution, can be performed. As a result, characters photographed can be recognized to make the results of the photography as character information. Furthermore, the information can be filed or used in an information process such as translation.

Thirteenth Embodiment

The system block according to the thirteenth embodiment is the same as that shown in FIG. 16. FIGS. 28 to 35 are flow charts showing the operations of CPUs for controlling the digital camera according to the present invention, in which the control of the operations of the optical system, image pickup device and CPUs are shown.

Figure 35:
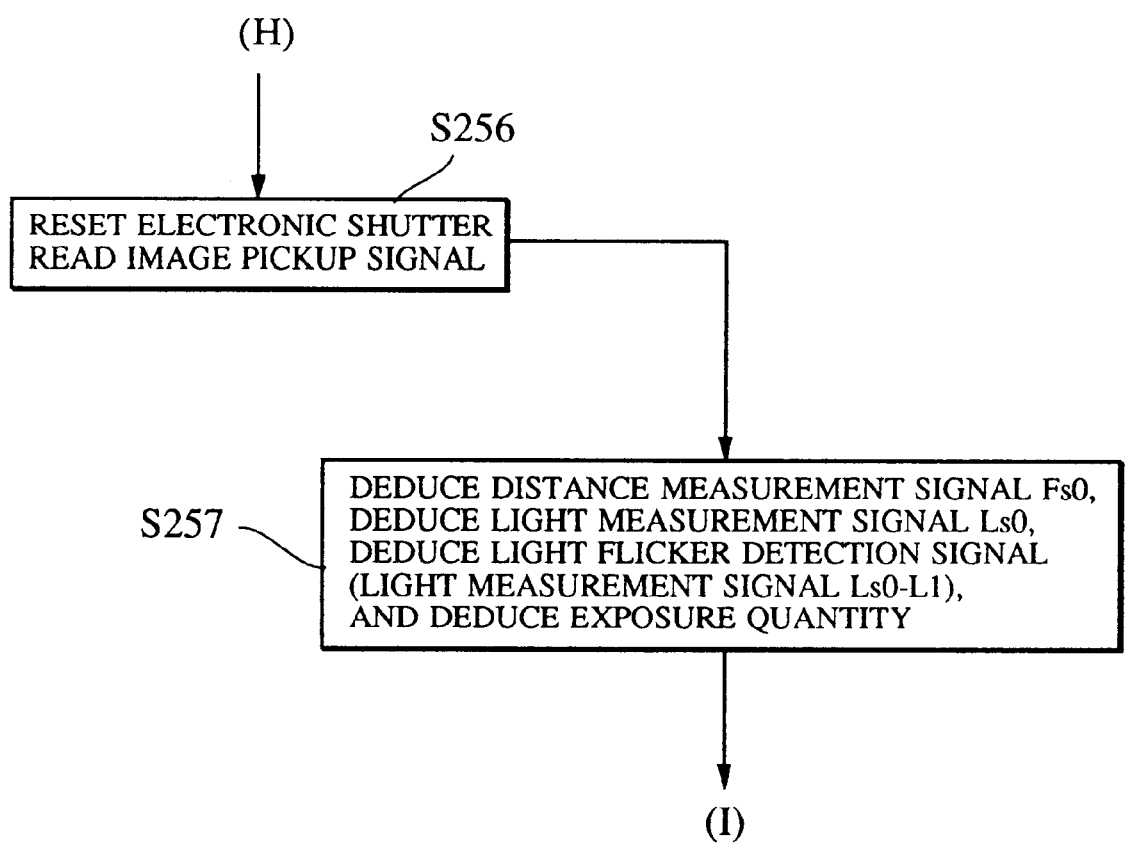
FIG. 35 is a flow chart which illustrates the final exposure adjustment operation (H) in the flow chart shown in FIG. 28.
Figure 36:
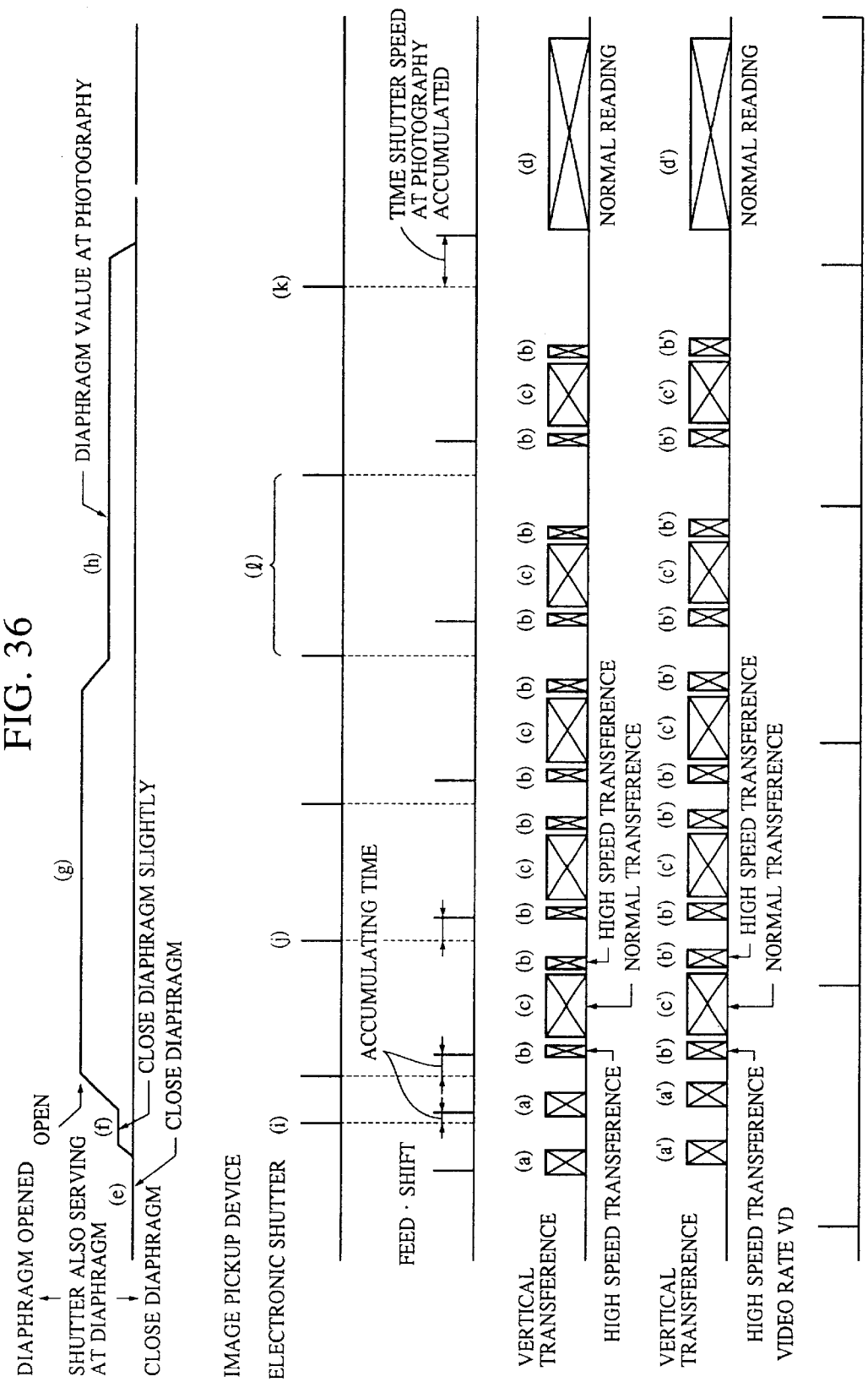
FIG. 36 is a timing chart which illustrates the photographing operation according to a thirteenth embodiment of the present invention.
Figure 38A:
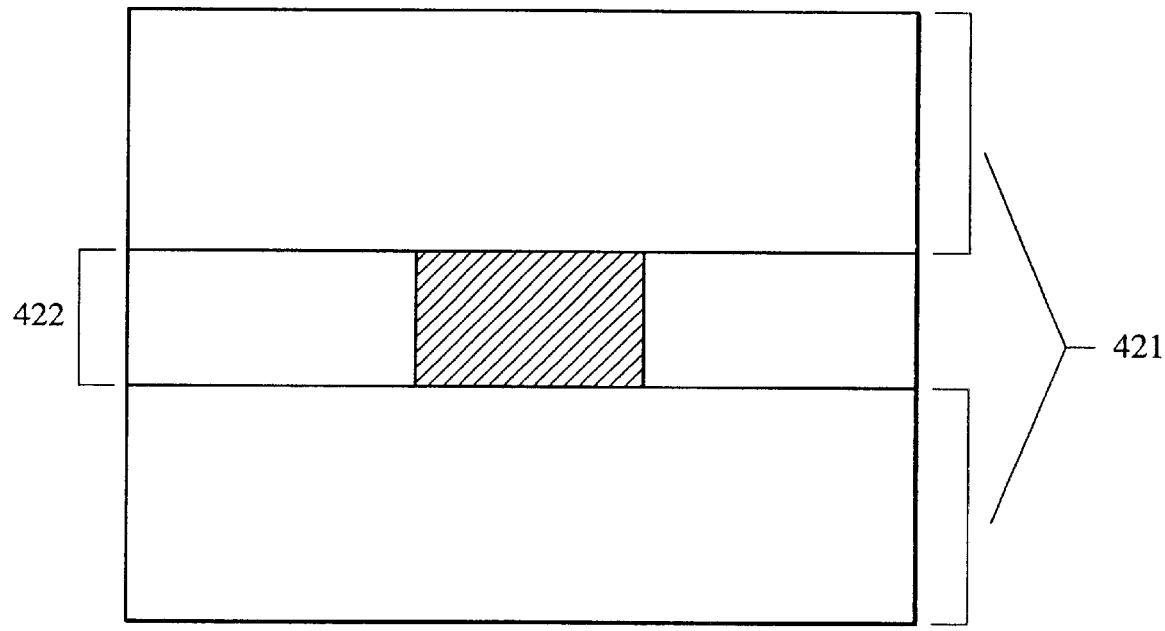
FIG. 38 is a timing chart which illustrates the operation of controlling the reading position in the photographing surface of the image pickup device according to the thirteenth embodiment of the present invention.
Figure 38B:
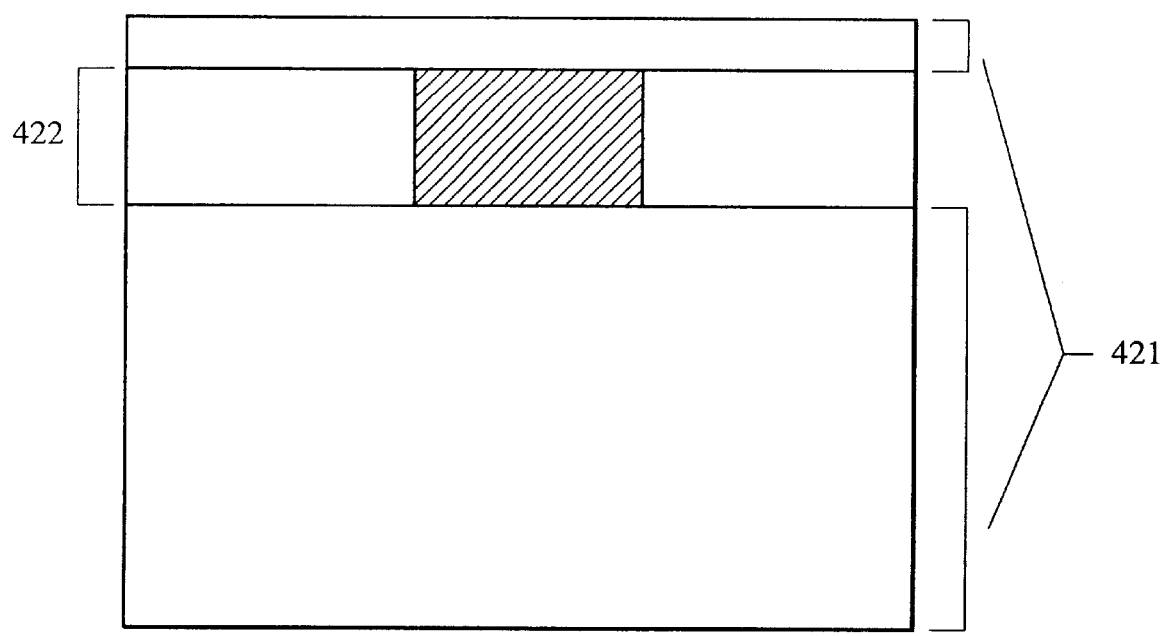
Figure 39:
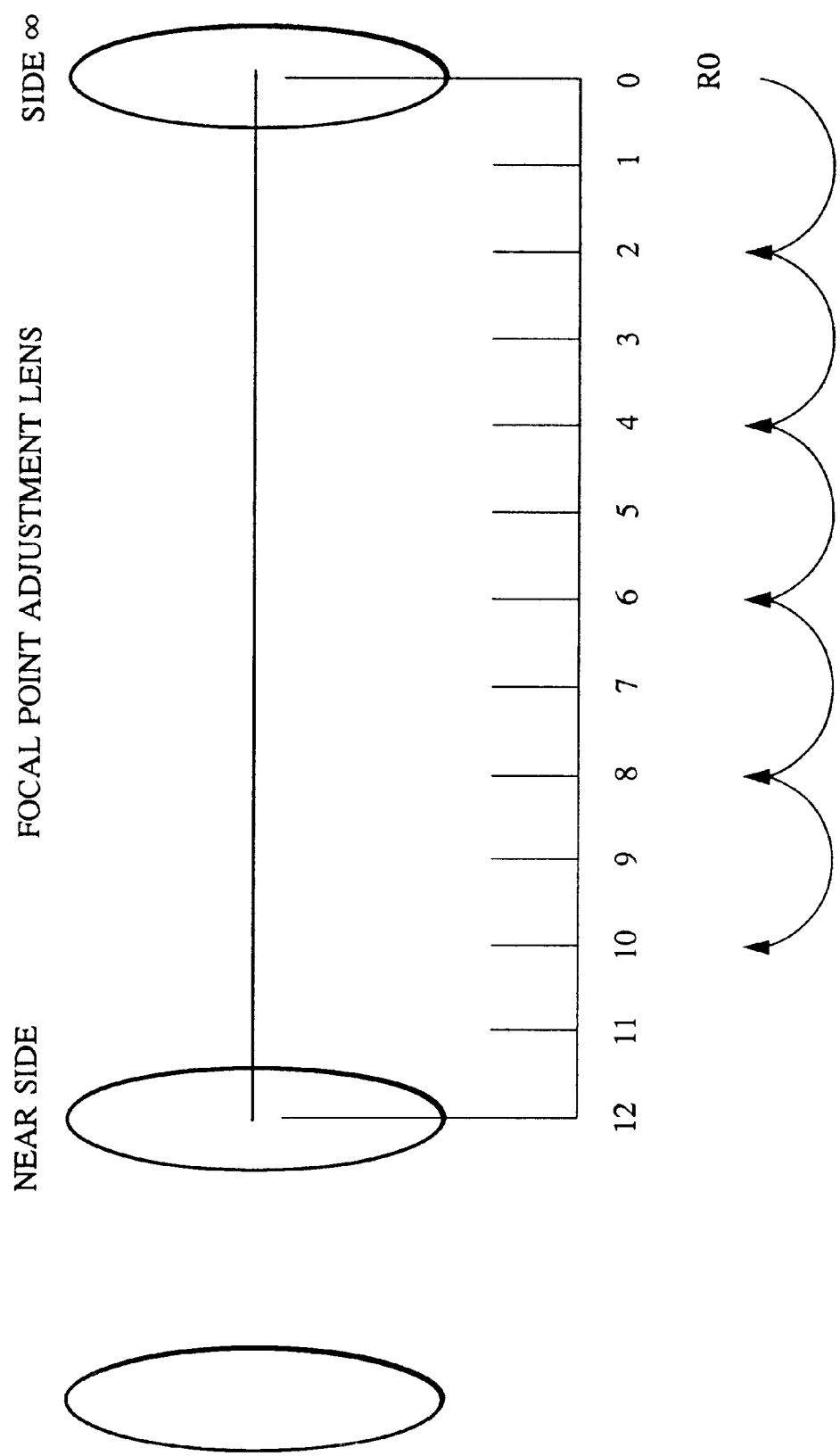
FIG. 39 is a diagram which illustrates a method of moving the lens according to the thirteenth embodiment of the present invention.

FIG. 36 is a timing chart which illustrates the operation sequence of the camera that is performed when the processes shown in FIGS. 28 to 35 are performed. FIG. 37 is a diagram which illustrates a plurality of high speed transference methods. FIG. 38 is a schematic view which illustrates a photoelectric conversion portion of the image pickup device to describe the reading region of the image pickup device. FIG. 39 is a diagram which illustrates the position of the lens to describe the control of the focusing lens. The flow charts shown in FIGS. 28 to 35 illustrate the process to be performed by the optical system in the left portion, that to be performed by the image pickup device in the central portion and the process relating to the system control and the signal process in the right portion.

Referring to FIGS. 28 to 39, the operation of the thirteenth embodiment will now be described.

Figure 28:
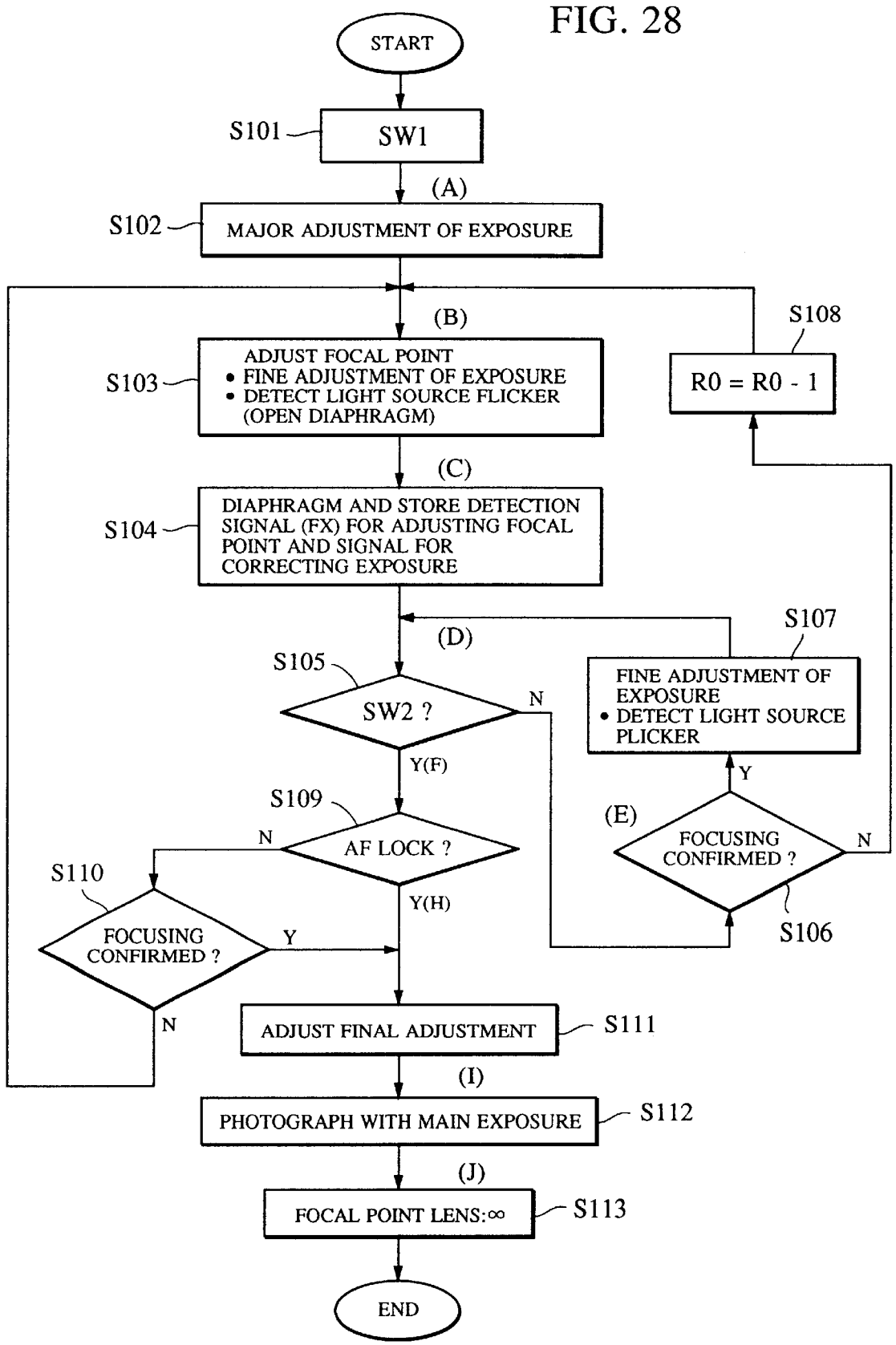
FIG. 28 is a flow chart which illustrates the overall photographing operation according to a thirteenth embodiment of the present invention.

As shown in the flow chart shown in FIG. 28, the first step of the release switch of the control portion 15 is depressed and thus the switch SW 1 is switched on so that the photographing operation starts (S101). Then, the process (A) of step S102 is performed to start major adjustment of the exposure.

Figure 29:
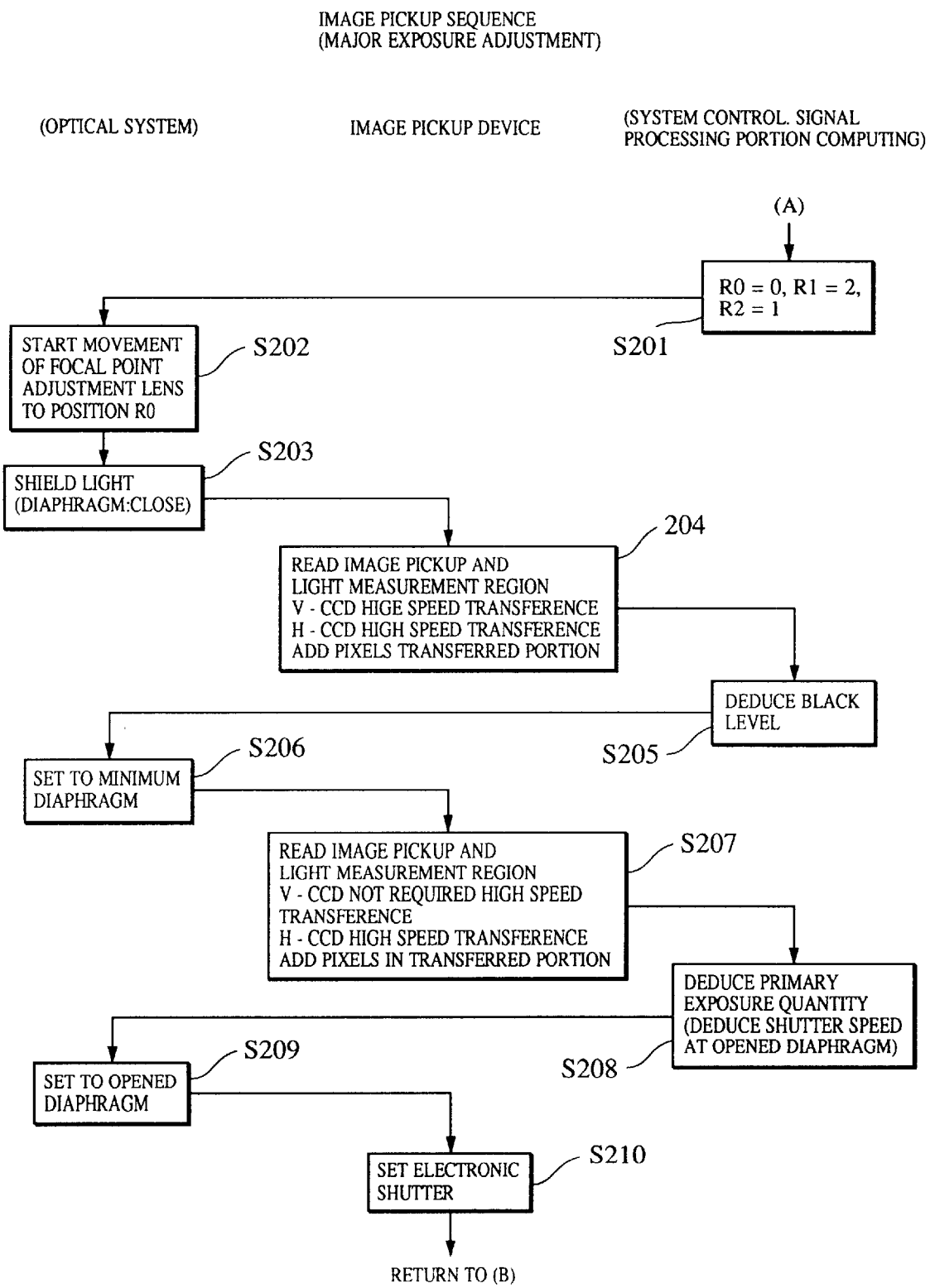
FIG. 29 is a flow chart which illustrates a major exposure adjustment (A) in the flow chart shown in FIG. 28.

FIG. 29 is a flow chart which illustrates the major exposure adjustment operation shown in (A) of step S102. In step S201, initial values (R0=0, R1=2, R2=1) for instructing the lens position are set as the process to be performed by the system control CPU and the signal processing portion. The lens positions 0, 1, 2, 3, . . . , are positions for the focusing lens shown in FIG. 39 in which 0 is the infinite (∞) position and 12 is the nearest (N) position.

Then, the control of the optical system is performed such that the operation proceeds to step S202 in which the focusing lens is moved to R0 (R0=0 that is the infinite position ∞).

Then, the diaphragm is closed to realize light-shielded state ((e) of FIG. 36) in step S203. In step S204, a reference value for light measurement is obtained by reading the output from the image pickup device in the light shielded state. In order to quickly read the output, the vertical and horizontal transferring portions are operated at the speed higher than that at the normal receipt of a video signal ((i) shown in FIG. 36). In a case where an interline type CCD is used as the image pickup device acting at vertical transference rate of about 15 KHz and horizontal transference rate of about 14 MHz in a normal mode and having about 440,000 effective pixels, the vertical transference is performed at 1 MHz and the horizontal transference is performed at 28 MHz. Thus, all pixels of the image pickup device can be read within 1 ms. In accordance with the thus-read signal, the value of the black level is deduced (S205).

A variety of combinations of the vertical transference and the horizontal transference as shown in (a) to (c) of FIG. 37 can be employed to control the reading operation at the high speed transference. In each figure, the relationship is shown between the vertical transference pulses with which the vertical shift register vertically transfers accumulated charges and the horizontal transference pulses with which the charges transferred to the horizontal shift register are transferred horizontally.

Referring to the pattern shown in (a) of FIG. 37, the operation will now be described. The frequency of the vertical transference pulse is set to 1 MHz and data for all vertical lines is read to accumulate the charges of the all pixels in the horizontal transference register. After the charges have been transferred, the horizontal transference pulses are used to transfer the charge of the horizontal transference register to transmit the charge through an output amplifier.

Although the signal charges of the pixels are mixed by the horizontal transference register in this case, no problem rises because all pixel signals must be integrated finally due to a fact that the purpose of the major adjustment is to set the exposure quantity for the image pickup device to a level with which focusing can be adjusted. The signals thus transmitted after horizontally transferred are supplied to the image signal processing circuit 11 through the preprocessing circuit 7 and the A/D converter 8 in which the output signals are integrated for the horizontal transference period. Thus, the signals are, as detected black levels for realizing the major adjustment of the exposure, supplied to the signal process controlling CPU 12.

Similarly, the vertical transference operation is divided into five sections in the case of (b) and the signals accumulated in the horizontal register after transferred vertically are transferred horizontally and transmitted. In the foregoing case, the quantity of the charges accumulated in the horizontal register is ⅕ of that in the case of (a). Therefore, a risk of overflow in the horizontal register can be prevented adequately.

In the case of (c) of FIG. 37, vertical transference of all vertical pixels at 1 MHz is continuously performed and the horizontal transference is performed at 28 MHz. In order to completely read the final pixel, the horizontal transference pulse has a longer length by one horizontal transference operation. Although the foregoing drive method involves mixture of the pixels in the horizontal direction as well as the vertical mixture of the pixels, no problem rises in terms of the purpose of this operation.

The thus-read image pickup signals for all pixels are integrated in the image signal processing circuit 11 through the preprocessing circuit 7 and the A/D converter 8. The gain of the preprocessing circuit 7 is, as described above in the prior art, set at the time of the manufacturing process while depending upon the sensitivity of the image pickup device.

FIG. 36 shows, from an upper position, the operation timing of the shutter also serving as diaphragm, the operation timing of the electronic shutter of the image pickup device, a field shift pulse for transferring charges accumulated in the photoelectric conversion pixel of the image pickup device to the vertical shift register, a vertical transference pulse, a horizontal transference pulse and timing of the vertical synchronizing signal of the video signal.

Referring to the timing chart shown in FIG. 36, the operation of the present invention will now be described.

Referring to the flow chart shown in FIG. 29, the black level is deduced by calculations performed in the CPU in response to the integration signal in step S206. Then, the optical system is controlled to minimize the diameter of the shutter also serving as diaphragm ((e) of FIG. 36).

With the foregoing minimum possible diaphragm, exposure is performed at the highest speed of the electronic shutter and the image pickup device is operated similarly to the operation when the black level is detected ((f) of FIG. 36).

The period from the operation of the electronic shutter to the field shift pulse is the period in which the charges are accumulated. The accumulated charges are vertically transferred in response to the vertical transference pulse and read in response to the horizontal transference pulse.

The read output representing the pickup image is, for all pixels, integrated in the image signal processing circuit 11 through the A/D converter. The gain of the preprocessing circuit 7 has been set at the time of the manufacturing operation while depending upon the sensitivity of the image pickup device.

Then, the system control CPU 12 subtracts the integrated exposure output data and the integrated black level data so that the brightness of external light is detected. Thus, the quantity of the exposure for use in focusing is determined. When the focusing operation is performed, the shutter speed with the opened diaphragm is deduced because the diaphragm is opened at the time of the exposure operation (S208). Then, the optical system is controlled to set the opened diaphragm (S209), and the electronic shutter of the image pickup device is set to the deduced adequate value (S210). Then, the operation is returned to step S103 in (B) of FIG. 28.

The foregoing state is shown in (3) of FIG. 37 in which the diaphragm is opened ((g) of FIG. 36), the time in which the electronic shutter is accumulated is set to a value corresponding to the opened diaphragm ((j) of FIG. 36) and the automatic focusing operation is performed. At the time of the automatic focusing operation, normal reading is performed in only the distance measured region shown in FIG. 38 as described below ((b) of FIG. 36). The regions except the distance measured region, high speed reading is performed ((b) of FIG. 36).

Referring back to the flow chart shown in FIG. 28, the focusing operation, fine exposure adjustment and light flicker detection are performed in step S103 shown in (B). The operation shown in (B) will now be described with reference to flow charts shown in FIGS. 30 to 33.

Initially, whether or not the movement (for example, movement to position ∞) of the focusing lens instructed in the major exposure adjustment has been completed is confirmed (S211). If it has not been completed, the completion is waited for. If it has been completed, exposure is performed for the exposure time set with the electronic shutter to read the output from the image pickup device (S212). When the output from the image pickup device is read, pixel in the central portion (422) of the image pickup surface is normally read as shown in (a) of FIG. 38. The pixels in the upper portion and the lower portion (421) are read at high speed. Any one of methods shown in (a) to (c) of FIG. 37 may be employed as the high speed reading operation.

That is, the vertical transference pulse and the horizontal transference pulse are read in the high speed transference mode (b) and the high speed transference mode (b) and the normal transference mode (c) as shown in FIG. 36. The thus-read signal is supplied to the image signal processing circuit 11 through the preprocessing circuit 7 and the A/D converter 8 so that distance measurement signal FO which is a criterion signal for discriminating the degree of focusing of the optical system and light measurement signal L0 which is a brightness level detection signal for correcting the exposure are deduced.

In a case where the distance measurement range indicated in the finder is instructed as designated by the diagonal lines in (a) of FIG. 38, the central portion (the diagonal line portion shown in FIG. 38) of the signals normally read from the portion 422 on the image pickup surface of the image pickup device is read by a line memory (not shown) in the image signal processing circuit 9. By using only the extracted signal, the focusing operation is performed so that the instructed distance measurement range and the range of the extracted signal are added to each other.

Then, the system control CPU 12 deduces the exposure quantity and the electronic shutter speed from the light measurement signal L0 (S213).

Then, whether or not the distance measurement signal F0 is larger than a predetermined value a (S214) is confirmed. If it is smaller than the predetermined value a, a discrimination is made that the signal corresponding to the edge portion of the object required to deduce the distance measurement signal is not present in the distance measurement range for the image pickup device and thus the distance measurement region to be read from the image pickup device is changed (S215).

The foregoing operation can be performed by changing the operation of the image pickup device such that the normal reading region 422 is set in the upper portion of the image pickup device and the other portion 421 is used to perform the high speed reading operation. With the foregoing method, if no edge signal is detected from the distance measurement region, the normal reading region is set in the lower portion of the image pickup device to again detect the distance measurement signal.

The order may be changed such that normal reading is initially performed by the lower portion of the image pickup device and if no edge signal has been detected from the lower portion of the image pickup device the signal is read by the upper portion of the image pickup device.

If the distance measurement signal F0 is larger than a in step S214, a discrimination is made that the focusing operation can be performed and the focusing lens is moved to R1 (S216). Since Ri has been set such that R1=2 at the initialization, the lens is moved to position 2 shown in FIG. 39.

After the focusing lens has been moved, the electronic shutter is set to the shutter speed deduced from the light measurement signal LO and the signal in the distance measurement region for picking up an image is, similarly to step S212, read (S217).

In accordance with the read signal, distance measurement signal F1 and light measurement signal L1 are deduced to determined the next exposure quantity. Furthermore, the light measurement signal L1 is subtracted from the light measurement signal L0 so that the light source flicker detection signal is calculated (S218). The light source flicker signal can be used in a process in which the light source, such as a fluorescent lamp, having flickers is detected and the color reproduction is corrected during the process of the picked up signal or used to detect change of a light source that is irradiating an object during the focusing operation.

Then, the level of the distance measurement signal F1 and the distance measurement signal F0 are compared (S219). If the level of the signal F1 is higher, a discrimination is made that the optimum focusing point is present at a near position and the operation is shifted to (i) of the flow chart shown in FIG. 31. If the level of F1 is not higher, it means that the optimum focusing point is at lens position 0 or 1. Thus, the operation is shifted to step S220 in which the focusing lens is moved to a position where R2=1. After the lens movement has been completed, the electronic shutter is again set to read the distance measurement region for picking up the image (S221).

Then, the distance measurement signal F2, the light measurement signal L2 and the light source flicker signal detection signal (L1−L2) are deduced similarly to step S218 (S228) to compare the level of the distance measurement signal F2 and that of the distance measurement signal F0 (S223). If F2>F0, a discrimination is made that the focusing operation has been completed and the operation is shifted to (C). If F2≦F0, the focusing lens is moved to a position where R0=0 (S224), and the operation is shifted to (C) in step S104 shown in FIG. 28.

Figure 30:
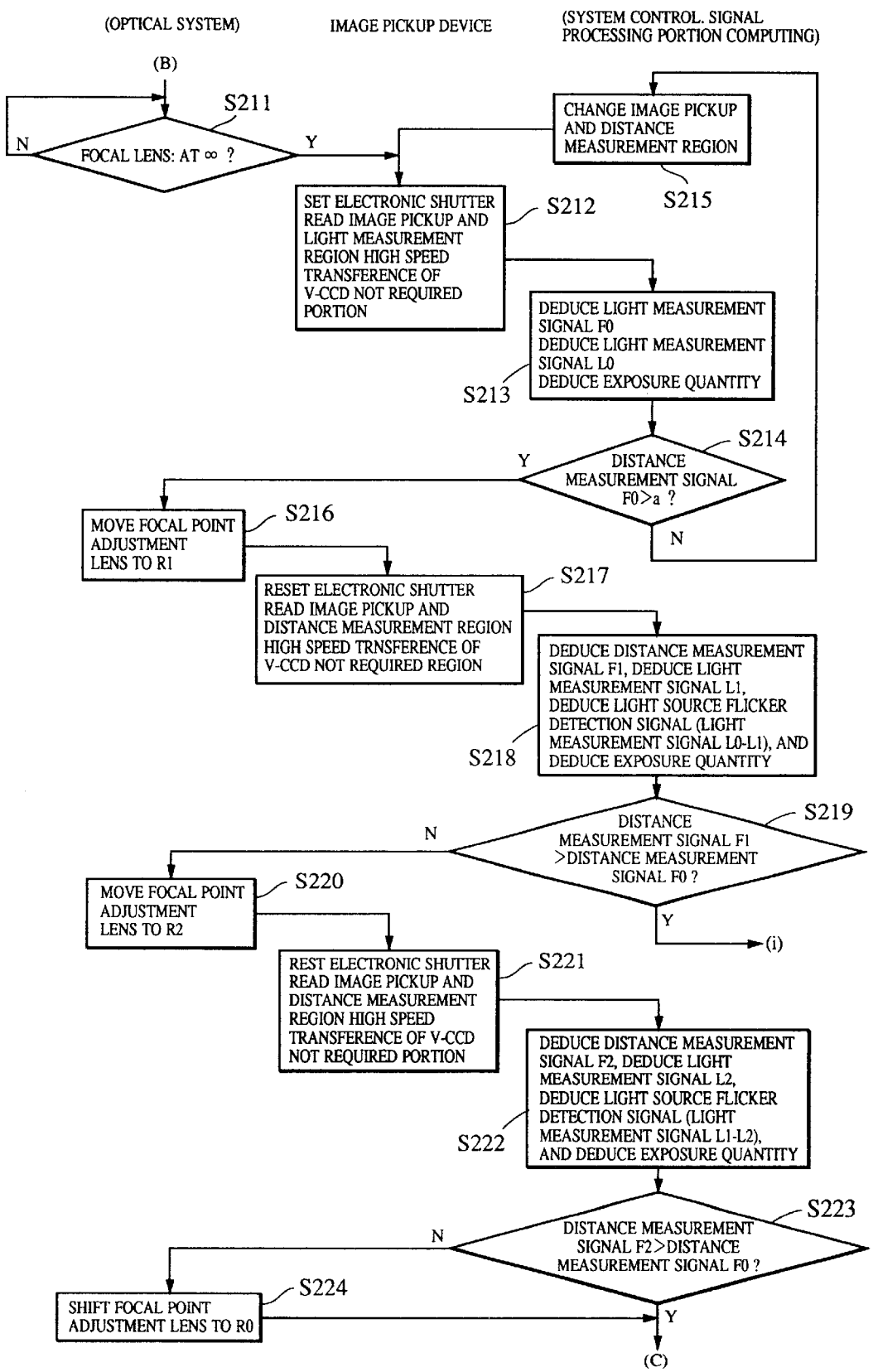
FIG. 30 is a flow chart which illustrates a focal point adjustment, fine exposure adjustment and flicker detection operation (B) in the flow chart shown in FIG. 28.
Figure 31:
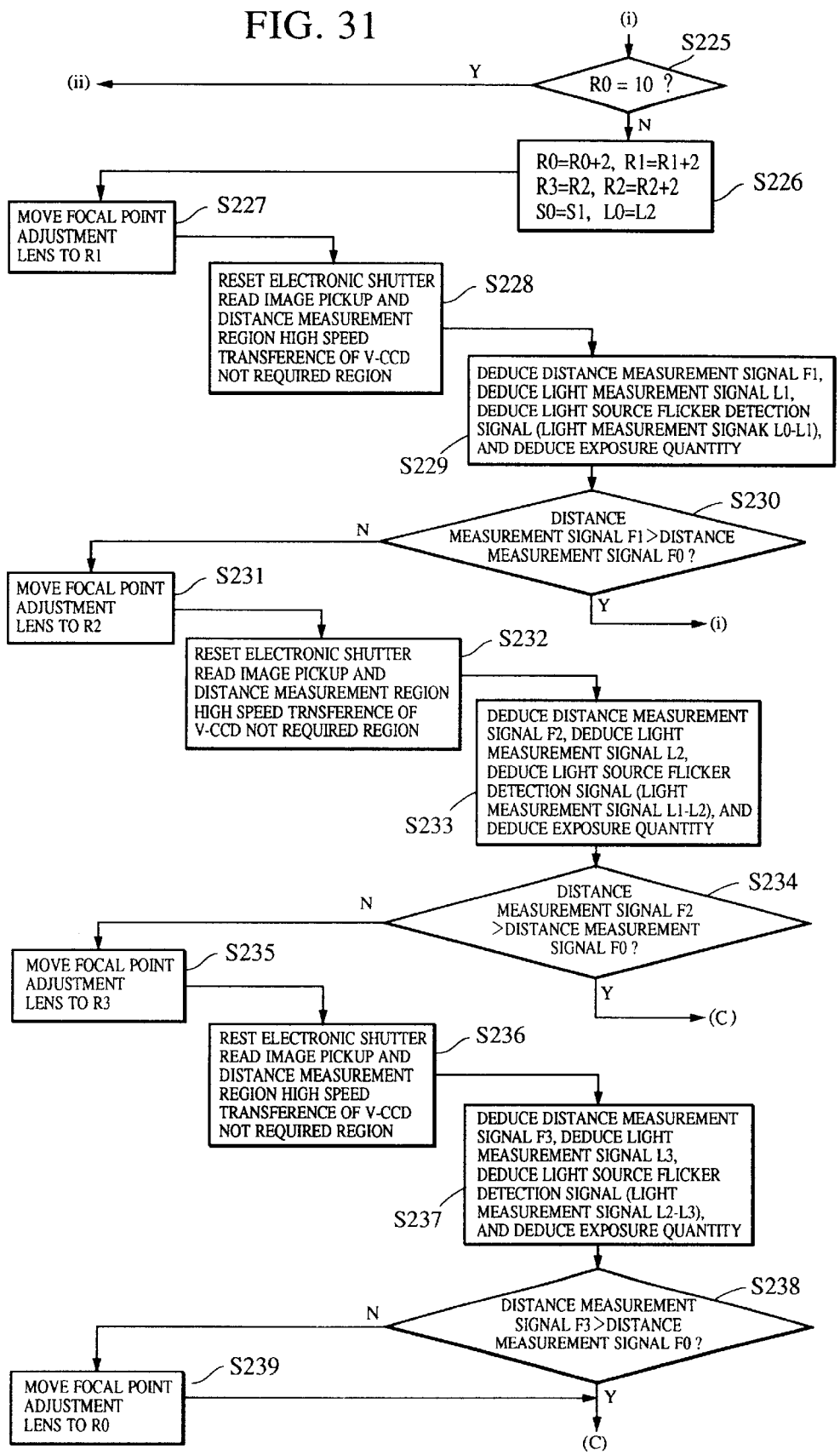
FIG. 31 is a flow chart which illustrates a process following the flow chart shown in FIG. 30.
Figure 32:
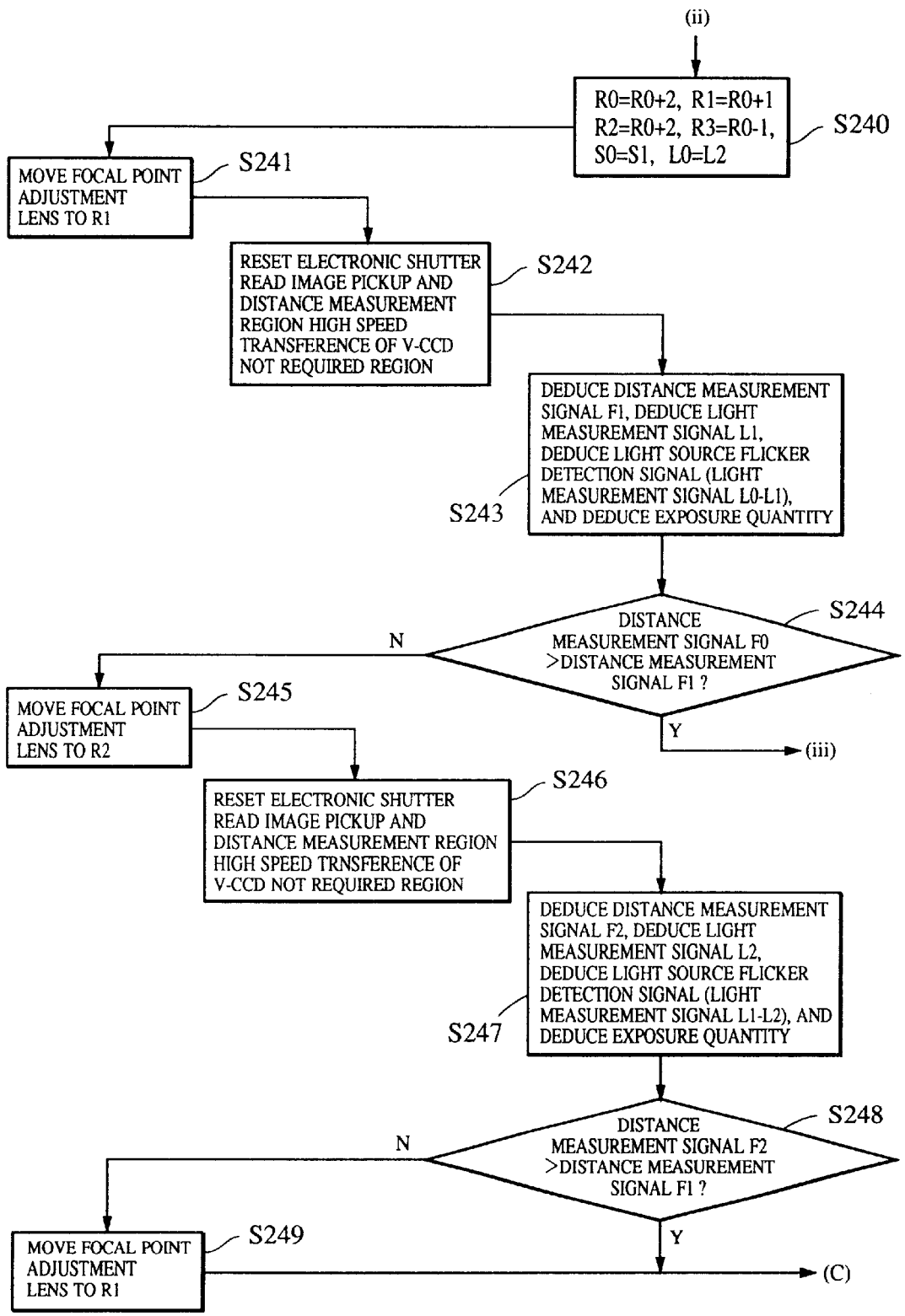
FIG. 32 is a flow chart which illustrates a process following the flow chart shown in FIG. 31.
Figure 33:
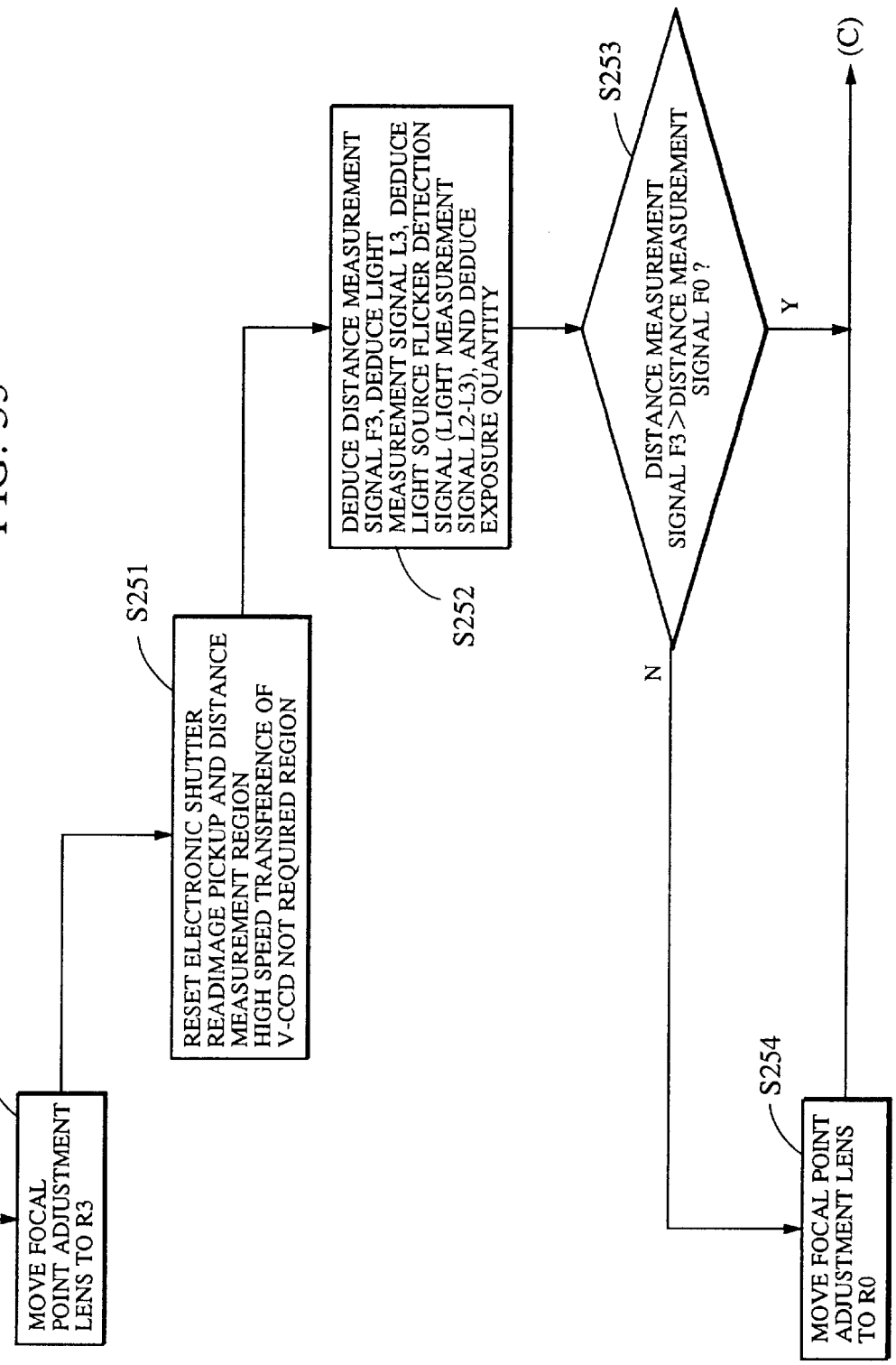
FIG. 33 is a flow chart which illustrates a process following the flow chart shown in FIG. 32.
Figure 34:
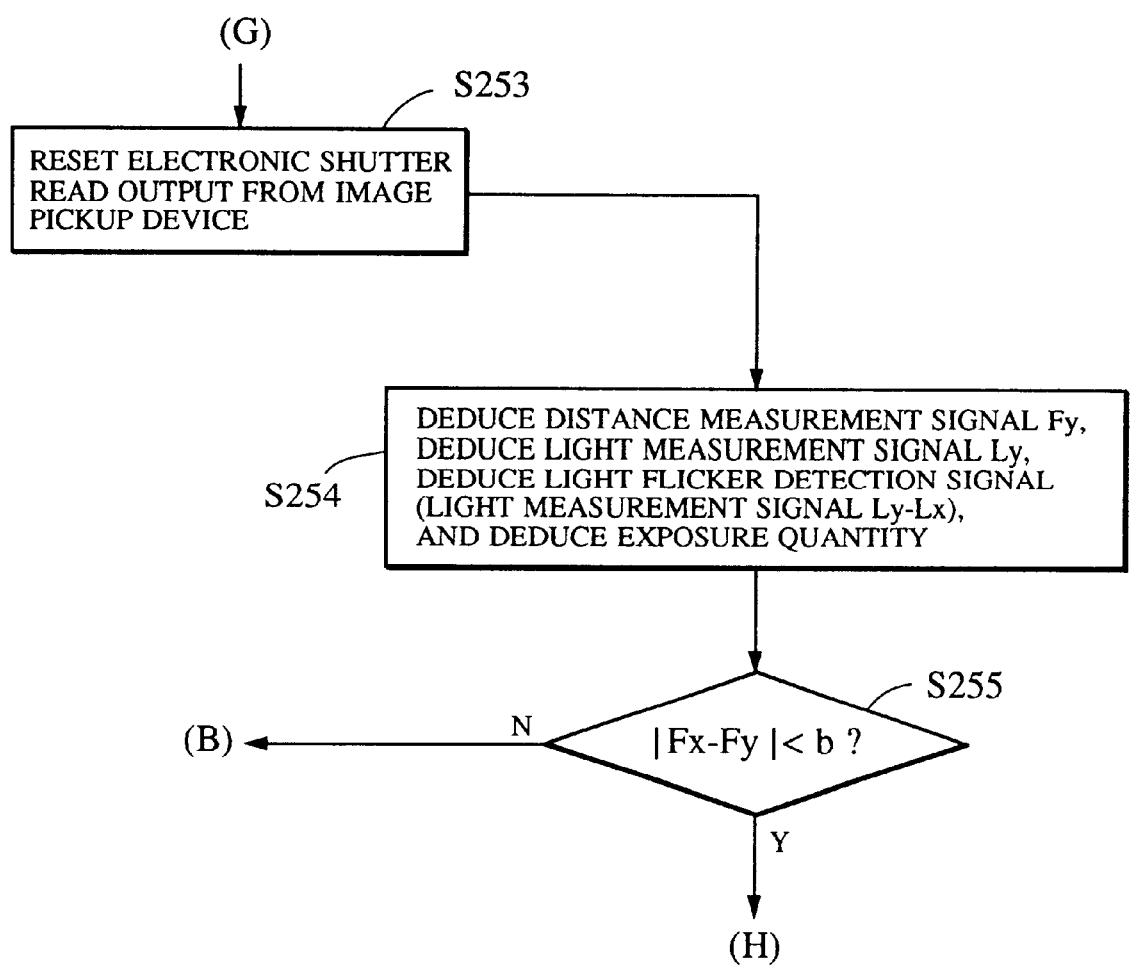
FIG. 34 is a flow chart which illustrates the focusing confirming process (G) in the flow chart shown in FIG. 28.

If F1>F0 in step S219 shown in FIG. 30, the operation is shifted to (i) shown in FIG. 31 in which whether or not R0 is 10 is confirmed (S225). Since R0=0 is held if the operation is shifted from step S225, the operation proceeds to step S226. In step S226, the variables are changed as follows:

R0=R0+2=2, R1=R1+2 =4, R2=R2+2=3, R3=R2=1, F0=F1, L0=L2.

With the thus set constants, the focusing lens is moved to R1 (S227).

After the movement has been completed, the signal in the distance measurement region exposed at the set shutter speed is read (S228). After the movement has been completed, the signal in the distance measurement region exposed at the set shutter speed is read (S229).

Then, the operations in steps S229 to S234 are performed similarly to steps S218 to S224 shown in FIG. 30.

If F2≦F0 in step S234, it means that the optimum focal point is near portion than R0. Therefore, the focusing lens is moved to a position where R3=1 (S235). After the operation has been completed, the operation proceeds to step S236. Then, the output of the picked up image is, in steps S236 and S237, read similarly to steps S232 and S233 to deduce the signals. If F3>F0 in step S238, the focusing lens is not moved and the operation is shifted to (C) in step S104 shown in FIG. 28 (if F3≦F0, the operation is shifted to step S239 in which the focusing lens is moved to R0, the focusing operation is completed and the operation is shifted to (C)).

If F1>F0 in step S230, an assumption is made that the optimum focal point is near the single focal point and the operation returns to (i) in which a similar operation is performed.

The foregoing operation is repeated five times until R0=10. At this time, the operation is shifted from step S225 to (ii).

The operations from (ii) are shown in FIG. 30. Referring to FIG. 30, the constants are set as follows in step S240:

R0=R0+2, R1=R0+1, R2=R2+2, R3=R0−1, F0=F1, L0=L2.

Then, the focusing lens is moved to R1 in step S241, that is to the lens position 11 shown in FIG. 39. The electronic shutter speed is set to make the adequate exposure quantity after the movement has been completed and the signal in the distance measurement region for picking up the image is read (S242).

The distance measurement signal F1 and the light measurement signal L1 are deduced and the light source flicker is detected and the exposure quantity is deduced (S243). In step S244, the distance measurement signals F0 and F1 are compared. If F0 is higher focusing rate and as well as F0>F1, the operation is shifted to (iii). If the relationship F0>F1 is not held, the focusing lens is moved to R2, that is, to the lens position 13 in step S245.

After the movement has been completed, the electronic shutter is set again in step S246 and the signal in the distance measurement region is read. In step S247, F2, L2, the quantity of flickers and the exposure quantity are deduced. In step S248 the distance measurement signal F2 and the distance measurement signal F1 are compared. If the relationship F2>F1 is not held, the focusing lens is moved to R1 (S249). If F2>F1, the operation is shifted to (C).

In a case where F0>F1 and the operation has been shifted to (iii) in step S244, the focusing lens is moved to R3, that is, to the focusing lens position 9 (S250) at which the signal is read and the detection signals are deduced (S251 and S252).

The distance measurement signal F3 and the distance measurement signal F0 are compared. If the relationship F3>F0 is not held, the lens is moved to R0. If F3>F0, the operation is shifted to (C) in step S104 shown in FIG. 28.

Referring back to the flow chart shown in FIG. 28, the shutter speed and the diaphragm are determined in accordance with the light measurement signal deduced from the output representing the picked up image in the previous exposure in (C) in step S104. With the determined exposure, the diaphragm and the shutter speed are set and the exposure is performed so that the signals of all picked up pixels in the distance measurement region are read ((r) and (h) shown in FIG. 36). In accordance with the read signals, detection signal (Fx) for adjusting the focal point and the exposure correction signal are deduced.

In the process (D) is step S105 whether or not the SW 2, which is switched on when the second step of the release switch for issuing a photographing command is depressed, has been depressed is detected. If the SW 2 has not been depressed, the distance measurement signal F1 at the lens position, at which the best focusing state has been realized, and Fx are compared to confirm whether or not the lens has been focused (S106) before the operation is shifted to (C) in step S104. If the difference between the two signals is smaller than a predetermined value, the lens is in the focused state and the lens position is not moved but the exposure correction signal and the light source flicker are detected (S107). Then, the operation returns to (D) in step S105. That is, the state (h) shown in FIG. 36 is continued.

If the difference between F1 and Fx is larger than the predetermined value in step S106, a discrimination that the non-focused state has been realized undesirably. Thus, the operation is shifted to step S108 in which the relationship R0=R0−2 is held in order to make the lens position for the readjustment start to be the position near the lens position at the previous focusing operation. Then, the operation is shifted to (B) in step S103 in which the focusing operation is again performed.

In steps S103 and S104 ensuing (B) similar operations such as the readjustment of the focal point and the fine adjustment of the exposure are performed and the foregoing operations are repeated until the depression of the SW 2 is detected in step S105. If the focusing position has been considerably deviated toward the ∞ point in the foregoing case, operations R0=R0−2 is repeated.

If the depression of the SW 2 has been detected in step S105, the operation is shifted to step S109 in which whether or not the AF LOCK has been actuated is confirmed.

If the AF LOCK has been actuated, the operation is shifted to step S111. If AF LOCK has not been actuated, the operation in (G) in step S110 is performed to confirm focusing. The operation in (G) in step S110 is performed similarly to (C) in step S104 (however the diaphragm has been set) in such a manner that the electronic shutter is reset to perform exposure ((k) shown in FIG. 36) for a predetermined time and the output representing the picked up image Is read (S253). In accordance with the read signal, the distance measurement signal Fy and the light measurement signal Ly are detected (S254).

If the difference between Fx and Fy is smaller than a predetermined value (smaller than b), a discrimination is made that the focused state has not been changed and the operation is shifted to (H) in step S111 shown in FIG. 28. If the difference is smaller than the predetermined value b, the operation is shifted to (B) in step S103 shown in FIG. 28.

In the operation in (H) in step S111 the final exposure adjustment is performed. That is, image signal is, as shown in FIG. 35, read which has been exposed to light under the exposure condition determined in response to the previous light measurement signal in step S256. In response to the signal, final light measurement signal Lso and flicker signal Lso–L1 are deduced (S257).

In the foregoing case, another method may be employed in which all pixels are read in place of reading a specific region of the image pickup device to enlarge the range for detecting the pixels for the light measurement, the level of the central portion of the image pickup device and the peripheral region of the same are detected to be compared so as to evaluate measured light in order to improve the accuracy in the AE adjustment.

The operation to be performed before the adjustment of the final exposure may be carried in such a manner that the reading region for the image pickup device is enlarged within a range that does not raise a problem of time shortage or measured light is evaluated. After the final exposure has been adjusted, the main exposure photography is performed in step S112 shown in FIG. 28.

In the main exposure photography, exposure is performed with the set value deduced in the final exposure adjustment, and then the output from the image pickup device is read. The read signal is subjected to a similar process to that of the conventional structure so that data is recorded on a recording medium or the like.

If the level of the flicker signal detected in each adjustment step is higher than a predetermined value, the light source in the photographing place can be determined to be a fluorescent lamp. Therefore, the gain of a green signal system of the picked up image signal processing portion is lowered in accordance with the level of the flicker signal so that color can be reproduced satisfactorily.

The position of the focusing lens is moved to the infinite end (∞ end) in step S113. Thus, the time required for the movement can be shortened because the imaging lens has been moved to the infinite end (∞ end) when the photographing operation starts.

Although the major adjustment of the exposure is performed by reading the picked up signal one time, the adequate exposure quantity may be set by, several times, reading the output from the image pickup device for adjusting the major adjustment of the exposure if the range for measuring light for the image pickup device is too wide for the output from the image pickup device to reach a signal level with which focusing is performed by one reading operation.

As described above, the thirteenth embodiment enables the AE, AF and AWB operations without use of a photoelectric conversion device except the image pickup device. Furthermore, the adjustment in the preparing for the photographing operation can be completed in a short time by combining the methods of operating the image pickup device that is different from the normal reading rate.

By minimizing the shutter period by minimizing the diaphragm at the major adjustment for the photography, the exposure quantity can be minimized. Therefore, the quantity of the accumulated charges of each pixel can be reduced with respect to the dynamic range of the image pickup device. Thus, adaptation to wide light measurement range can be enabled without saturation of the image pickup device.

The ratio of the quantity of noise in the output representing the photographed image can be raised by reducing the quantity of the exposure. The mixture of pixels during the transference in the image pickup device and the integrating process of the output from the image pickup device average the output so that the influence is eliminated to a level which does not raise a practical problem in the major adjustment process. Although both diaphragm and the shutter speed are controlled in the foregoing embodiments, only either of the two factors may be controlled depending upon the width of the light measurement range. As an alternative to use of the maximum shutter speed or the minimum diaphragm, a lower shutter speed and larger diaphragm may be employed.

By reading the pickup image signal at a rate different from the normal reading rate, detection can be enabled even if the flicker component of the light source, such as a fluorescent lamp, is 100 Hz or 120 Hz. As a result, the level of the flicker component enables a discrimination to be made whether or not the light source in the place in which the photography is performed is a flicker light source. Therefore, the color can be corrected to be adaptable to the light source or information of the place in which the photography is performed can be recorded as attribute information together with the image or sound.

If the exposure quantity cannot be limited sufficiently by setting the diaphragm and the shutter speed with respect to the light measurement range and if the signal is brought to a saturated state in the vertical transference portion in the image pickup device, so-called frame reading is performed in which one pixel in the vertical direction is skipped in the reading operation. Thus, the sensitivity of the image pickup device can be lowered and saturation in the vertical transference portion can be prevented. As a result, the major adjustment of the exposure can be performed effectively.

Fourteenth Embodiment

Figure 40:
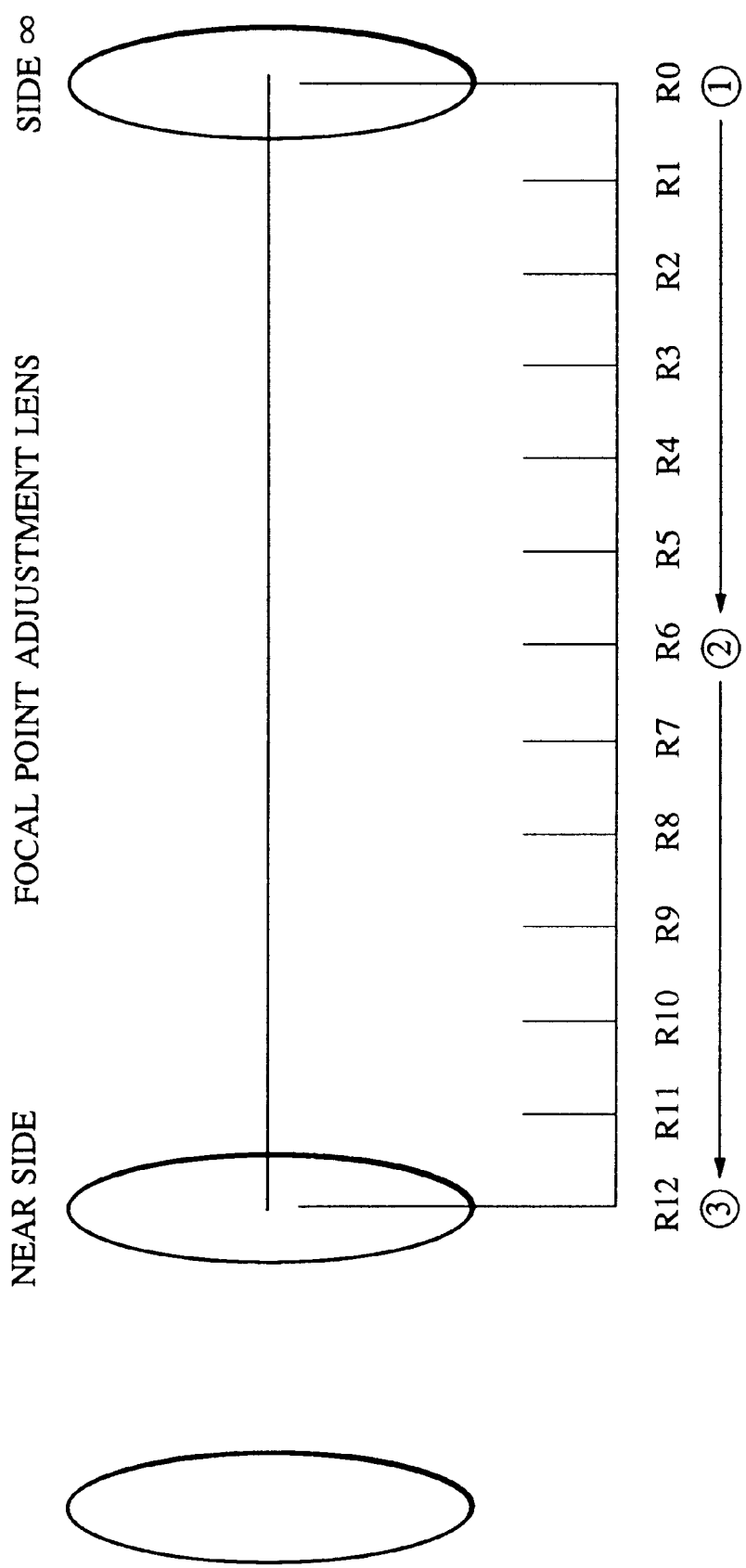
FIG. 40 is a diagram which illustrates the method of controlling the lens according to a fourteenth embodiment of the present invention.
Figure 41:
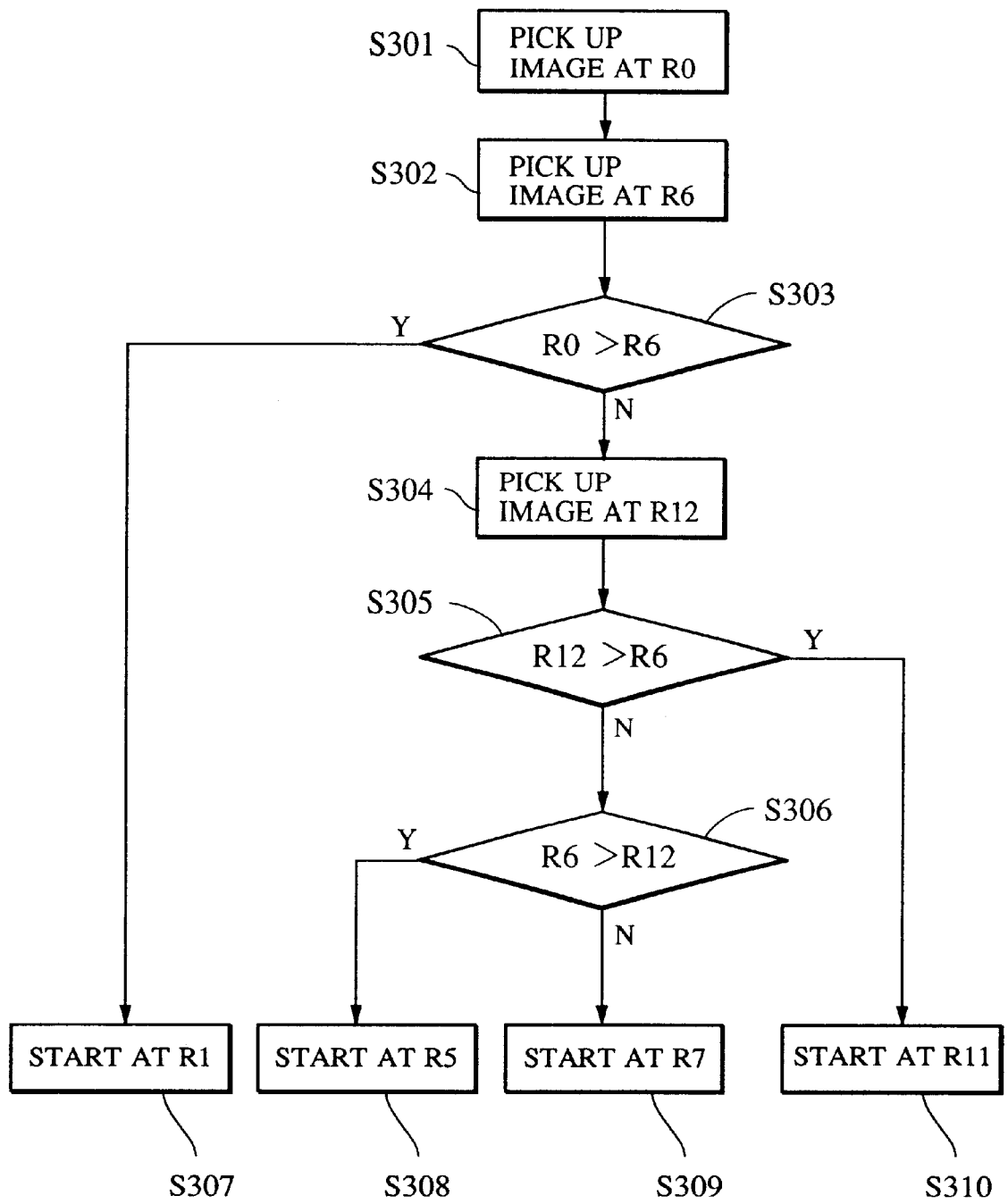
FIG. 41 is a flow chart which illustrates the fourteenth embodiment of the present invention.

FIGS. 40 and 41 illustrate a fourteenth embodiment of the present invention. FIG. 40 shows a method of moving the focusing lens position similarly to FIG. 39. FIG. 41 is a flow chart which illustrates the operation of the focusing operation according to the present invention.

Referring to FIGS. 40 and 41, this embodiment will now be described. As shown in FIG. 40, the pickup signal is read for detecting the distance measurement signal at the lens position R0 (S301). Similarly, the pickup signal is read at R6 in step S302 to detect the distance measurement signal.

Then, a discrimination routine starts in which the distance measurement signal at R0 and the distance measurement signal at R6 are compared in step S52. If the detected level at R0 is higher and if a discrimination is made that the degree of focusing is high, the detection of the next distance measurement signal starts at R1 and detection at R2, R3 and R4 are performed. If the detection level at R0 is lower in step S52, the imaging operation is performed at R12 (S53). Then, the levels at R12 and R6 are compared in step S54. If R12>R6, the operation is shifted to step S59.

In step S59, the distance measurement signal is detected at R11, and then the detection at R10, R9 and R8 are performed. If R12≦R6, the operation is shifted to step S55 in which the levels at R6 and R12 are compared.

If R0>R12, the operation is shifted to S57. If R0≦R12, the operation is shifted to S58 in which detection of the distance measurement signal starts at R5 or R7. In step S57 the detection at R5, R4 and R3 are performed in this order. In step S58 the detection at R7, R8 and R9 are performed in this order. Then, the focusing operation is performed similarly to the foregoing embodiments.

In this embodiment, the focusing lens is moved at a rough pitch and then the ensuing main adjustment start position is determined in accordance with the distance measurement signal level at each point. In this operation, the start position is not made to be the detection point for the rough pitch but an adjacent point is made to be the detection point.

Thus, the focusing lens can be brought to the focal point with a small number of detection points.

Fifteenth Embodiment

Figure 42:
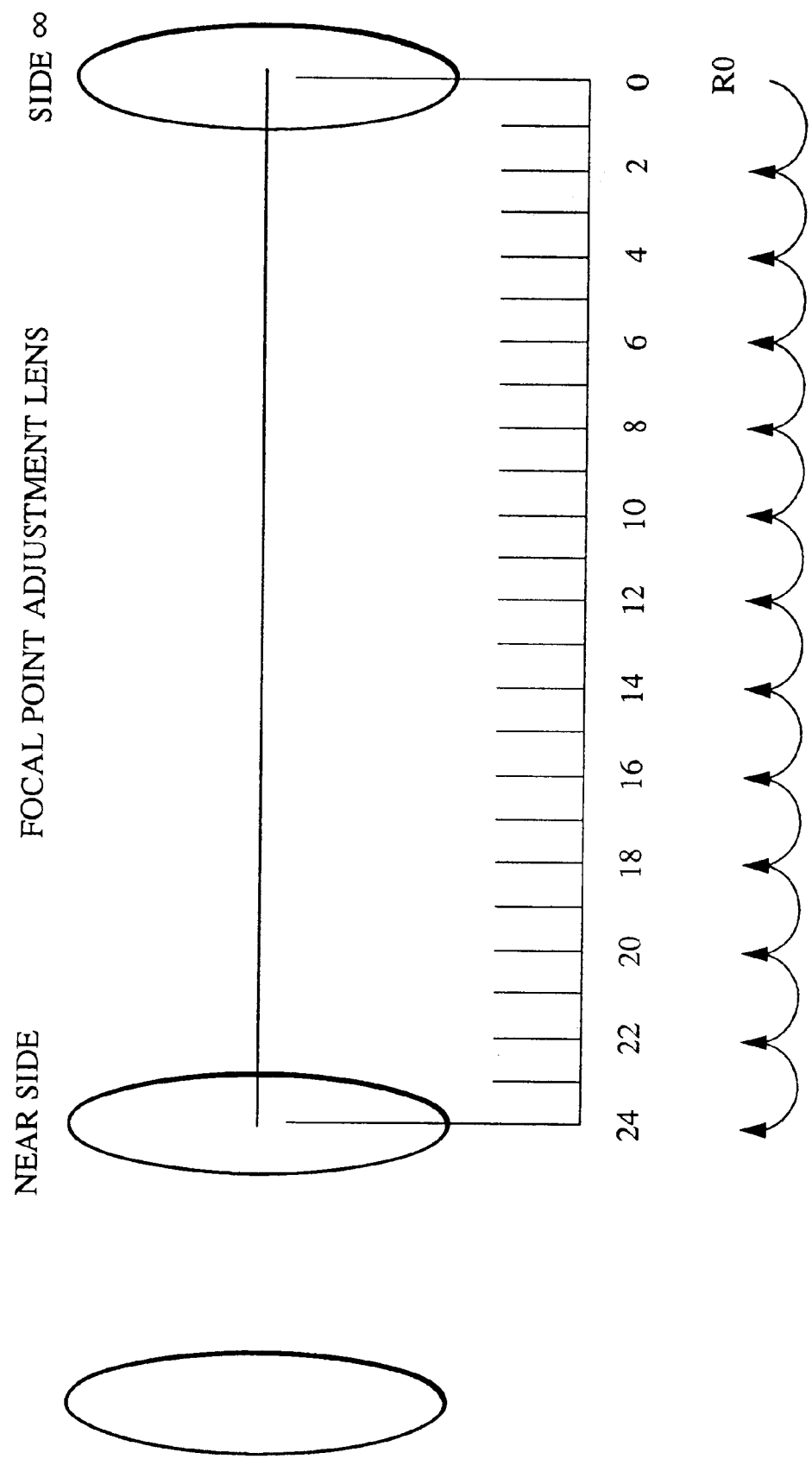
FIG. 42 is a diagram which illustrates a method of controlling the lens according to a fifteenth embodiment of the present invention.

Referring to FIG. 42, the fifteenth embodiment of the present invention will now be described. Although the structure and the operation are the same as those of the image pickup apparatus shown in FIG. 16, a color image pickup device may be employed and a mode for picking up a color natural image and a mode for picking up a white and black high resolution image may be provided. In accordance with the selected mode, the focusing means is operated in different methods.

The image pickup apparatus has the minimum unit for the quantity of movement of the focusing lens in the color natural image mode is made to be 0 to 12 steps shown in FIG. 39. The minimum unit for the focusing lens in the white and black high resolution image mode is made to be 0 to 24 steps shown in FIG. 40.

As a result, the photographing release time lag can be shortened in the color natural image photographing mode because the lens is moved for a long distance. In the white and black high resolution photographing mode, a precise focusing operation can be performed because the lens is not moved for a long distance.

The minimum units for the lens movement quantity in the wo modes may be made to be the same to precisely control the lens stoppage in the focusing operation in the white and black high resolution photographing mode.

That is, the known ascending focusing operation is performed such that the lens is moved to a position at which the focus detection output is enlarged to a peak point. When focusing has been adjusted to a certain degree, the lens position is fixed to prevent the fine movement of the lens.

The threshold level for the focusing discrimination for determining the lens fixing position is made to be different between the white and black mode and the color mode to make severe the focusing discrimination level in the white and black level as compared with the color mode. For example, the focusing operation in the color mode is performed in such a manner that the lens is fixed at 4 when the lens has been moved finely between 2 and 6 (lens is moved by a quantity of 5 steps) shown in FIG. 40 and the photographing operation is performed. On the other hand, the white and black mode photographing operation is performed in such a manner that the lens is not fixed within the 5 steps but the same is fixed to 4 when the lens has been moved within 3 steps from 3 to 5.

As described above, the image pickup apparatus according to this embodiment of the present invention arranged to adjust the focal point in accordance with the picked up image signal transmitted from the image pickup means enables the focusing operation speed to be raised by controlling the reading of the image pickup means so that the processing time is shortened.

Furthermore, the unit drive step for the focusing lens can be switched in each photographing mode so that the focusing operation can be performed precisely in the high resolution photographing mode. In the low resolution photographing mode, the processing time can be shortened to minimize the release time lag. Thus, the focusing operation can be optimized to be adaptable to the selected photographing mode. As a result, an optimum photographing operation can be performed in the selected photographing mode.

In addition, the first focusing mode in which the unit movement quantity for the lens is large and the second focusing mode in which the unit movement quantity for the lens is small are provided so that the second mode is controlled in such a manner that the lens position provided with the evaluated focal point in the first focusing mode is omitted from the operation for deducing the evaluated focal point in the second focusing mode. Thus, the evaluated value can be made to be precise and reliable in accordance with the focusing mode.

Moreover, the focusing characteristics are changed between the white and black high resolution mode and the color natural image mode so that the optimum state is realized in each mode. Therefore, the optimum focusing operation for the selected photographing mode can be performed.

Furthermore, an image pickup apparatus having kinetic photographing mode and a still image photographing mode is enabled to perform the optimum focusing operation for each mode. Thus, great advantage can be obtained regardless of the type of the photographing apparatus.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An image pickup apparatus comprising:
    an image pickup device for converting an optical image into an electric signal, said image pickup device having a plurality of color filters;
    a first photographing mode in which the electric signal transmitted from said image pickup device is used to form a color natural image signal;
    a second photographing mode in which the electric signal transmitted from said image pickup device is used to form a high resolution image signal of a monochromatic image;
    an optical low-pass filter operating in both said first and second photographing modes and comprising a plurality of low-pass filters for trapping a spatial frequency of light from an object made incident on said image pickup device, said plurality of low-pass filters being movable and changeable so that characteristics of said optical low-pass filter are changed by inserting or retracting into an optical passage of an optical lens a combination of low-pass filters of said plurality of low-pass filters;
    an optical system which images light from the object on said image pickup device and which changes the characteristics of said optical low-pass filter in said second photographing mode by moving and changing said plurality of low-pass filters thereby increasing the trapping frequency of said filter; and correction means for correcting a length of the optical passage of the optical lens to counteract a change in the length of the optical passage when the characteristics of said optical filter are changed.

2. An image pickup apparatus according to claim 1 further comprising:

detection means for detecting, in said second photographing mode, a pixel output level for each color filter of said image pickup device corresponding to the color of the object;

integration means for determining (i) a first integrated signal corresponding to the pixel output levels of a first subset of said color filters and (ii) a second integrated signal corresponding to the pixel output levels of a second subset of said color filters different from the first subset of color filters; and color correction means for (i) correcting the level of each pixel of said image pickup device for each of the first subset of said color filters in accordance with the first integrated signal and (ii) correcting the level of each pixel of said image pickup device for each of the second subset of said color filters in accordance with the second integrated signal.

3. An image pickup apparatus according to claim 2, further comprising a frequency trapping circuit for, in said second photographing mode, removing a modulated color signal overlapped on the output from said image pickup device from a signal processing system or for making frequency characteristics of said frequency trapping circuit to be different from those in said first mode.

4. An image pickup apparatus according to claim 1, further comprising electrical filter means for filtering a predetermined frequency component of the electrical signal; and control means for changing frequency characteristics of said electrical filter means depending on whether said image pickup apparatus is in said first photographing mode or said second photographing mode.

5. An image pickup apparatus comprising:

image pickup means for converting an optical image into an electric signal, said image pickup means having a plurality of color filters, each corresponding to one of magenta, green, cyan and yellow color components;

user-activated switching means capable of switching between (i) a first photographing mode in which an electric signal transmitted from said image pickup means is used to form a color natural image and (ii) a second photographing mode in which said electric signal transmitted from said image pickup means is used to form a white and black high resolution image signal;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of the optical image;

integration means for determining (i) a first integrated signal corresponding to the pixel output levels of said magenta and green color filters and (ii) a second integrated signal corresponding to the pixel output levels of said yellow and cyan color filters; and color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal;

lens position changing means for changing the position of a focusing lens with respect to said image pickup means; and focal point evaluating value detecting means for deducing a focal point evaluating value, which is made to be a maximum value in a focused state, in accordance with an output from said image pickup means, wherein two or more lens movement quantities by said lens position changing means can be set.

6. An image pickup apparatus according to claim 5, further comprising:

first detection control means that considerably changes a relative position of said focusing lens to detect a focal point evaluating value at said change; and second detection control means that reduces a degree of change in the relative position made by said first detection control means to detect a focal point evaluating value, wherein focal point adjustment is performed by combining said first and second detection control means, and said second control means is controlled to detect said focal point evaluating value at a lens position which is different from said lens position controlled by said first control means.

7. An image pickup apparatus comprising:

image pickup means for processing an optical image, said image pickup means having a plurality of color filters, each corresponding to one of magenta, green, cyan and yellow color components;

switching means capable of switching between a first photographing mode in which an electric signal transmitted from said image pickup means is used to form a color natural image and a second photographing mode in which said electric signal transmitted from said image pickup means is used to form a white and black high resolution image signal;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of the optical image;

integration means for determining (i) a first integrated signal corresponding to the pixel output levels of said magenta and green color filters and (ii) a second integrated signal corresponding to the pixel output levels of said yellow and cyan color filters; and color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal; and focusing control means for precisely performing focal point adjustment in said second photographing mode as compared with said first photographing mode in accordance with the photographing mode switching operation performed by said switching means.

8. An image pickup apparatus comprising:

image pickup means for converting an optical image, said image pickup means having a plurality of color filters, each corresponding to one of magenta, green, cyan and yellow color components;

switching means capable of switching between a first photographing mode in which an electric signal transmitted from said image pickup means is used to form a color natural image signal and a second photographing mode in which said electric signal transmitted from said image pickup means is used to form a white and black high resolution image signal;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of the optical image;

integration means for determining (i) a first integrated signal corresponding to the pixel output levels of said magenta and green color filters and (ii) a second integrated signal corresponding to the pixel output levels of said yellow and cyan color filters; and color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal;

focal point detection means for detecting a state of focusing in accordance with said electric signal transmitted from said image pickup means; and focal point control means for controlling a focal point adjustment lens in accordance with an output from said focal point detection means and for controlling said focal point adjustment lens in accordance with an output from said switching means to reduce a quantity of movement of said focal point adjustment lens in said second photographing mode as compared with a quantity of movement of said focal point adjustment lens in said first photographing mode.

9. An image pickup apparatus comprising:

mode switching means capable of switching between a first photographing mode in which an electrical signal transmitted from image pickup means is used to form a color natural image signal and a second photographing mode in which said electric signal transmitted from said image pickup means is used to form a white and black high resolution image signal, said image pickup means having a plurality of color filters, each corresponding to one of magenta, green, cyan and yellow color components;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of an optical image processed by said image pickup means;

integration means for determining (i) a first integrated signal corresponding to the pixel output levels of said magenta and green color filters and (ii) a second integrated signal corresponding to the pixel output levels of said yellow and cyan color filters;

color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal;

focal point detection means for detecting whether or not focal point adjustment has been completed in accordance with a quantity of movement of a focal point adjustment lens in a predetermined time;

lens control means for fixing said focal point adjustment lens in accordance with a result of detection performed by said focal point detection means; and control means for controlling said focal point detection means in accordance with an operation of said mode switching means in such a manner that a lens movement quantity in a predetermined time in said second photographing mode is smaller than a lens movement quantity in a predetermined time in said first photographing mode.

10. An image pickup apparatus comprising:

photographing optical means;

image pickup means for converting an optical image into an electric signal, said image pickup means having a plurality of color filters, each corresponding to one of magenta, green, cyan and yellow color components;

user-activated switching means capable of switching between (i) a first photographing mode in which an electric signal transmitted from said image pickup means is used to form a color natural image and (ii) a second photographing mode in which said electric signal transmitted from said image pickup means is used to form a white and black high resolution image signal;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of the optical image;

integration means for determining (i) a first integrated signal corresponding to the pixel output levels of said magenta and green color filters and (ii) a second integrated signal corresponding to the pixel output levels of said yellow and cyan color filters;

color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal;

lens position changing means for changing an optical axial directional position of a focal point adjustment lens with respect to said image pickup means;

focal point evaluating value detection means for deducing, from an output from said image pickup means, a focal point evaluating value which is made to be a maximum value in a focused state;

focal point control means which is capable of switching a lens movement quantity by said lens position changing means;

photographing preparation processing means that operates at least said focal point evaluating value detection means to prepare a photographing operation during a photographing preparation period; and photographing control means for performing main exposure under a condition set by said photographing preparation processing means to cause said image pickup means to photograph an object and for making conditions for said image pickup means and said photographing optical means in said photographing preparation period caused by said photographing preparation processing means to be different from conditions set in said main exposure.

11. An image pickup apparatus comprising:

mode switching means capable of switching between a first photographing mode in which an electric signal transmitted from image pickup means is used to form an image signal and a second photographing mode in which said electric signal transmitted from said image pickup means is used to form an image signal having a resolution higher than that of said image signal formed in said first photographing mode, said image pickup means having a plurality of color filters, each corresponding to one of magenta, green, cyan and yellow color components;

an optical low-pass filter operating in both said first and second photographing modes and comprising a plurality of low-pass filters, for trapping a spatial frequency of light from an object made incident on said image pickup means, said plurality of low-pass filters being movable and changeable so that the trapping frequency of said optical low-pass filter is increased in the second photographing mode by inserting or retracting into an optical passage of an optical lens a combination of low-pass filters of said plurality of low-pass filters;

detecting means for detecting, in said second photographing mode, a pixel output level for each color filter of said image pickup means corresponding to the color of an optical image processed by said image pickup means;

integration means for determining (i) a first integrated signal corresponding to the pixel output levels of said magenta and green color filters and (ii) a second integrated signal corresponding to the pixel output levels of said yellow and cyan color filters;

color correction means for (i) correcting the level of each pixel of said image pickup means for each of said magenta and green color filters in accordance with the first integrated signal and (ii) correcting the level of each pixel of said image pickup means for each of said yellow and cyan color filters in accordance with the second integrated signal;

focal point adjustment means that detects a state of focusing from an output from said image pickup means to adjust a focal point; and control means for controlling an operation of said focal point adjustment means in accordance with said mode switching means in such a manner that a unit movement of said focal point adjustment means in said second photographing mode is smaller than a unit movement of said focal point adjustment means in said first photographing mode.

* * * * *

UNITED STATES PATENT AND TRADEMARK OFFICE
CERTIFICATE OF CORRECTION

PATENT NO. : 6,449,013 B1
DATED : September 10, 2002
INVENTOR(S) : Masao Suzuki et al.

It is certified that error appears in the above-identified patent and that said Letters Patent is hereby corrected as shown below:

Title page,
Item [56], References Cited, FOREIGN PATENT DOCUMENTS, "4219061" should read -- 4-219061 --;

Drawings,
Sheet 15, FIG. 15, "TIMTNG" should read -- TIMING --.
Sheet 16, FIG. 16, "TIMTNG" should read -- TIMING --.
Sheet 19, FIG. 19, "FIG. 19(ii)" (upper graph) should read -- FIG. 19(i) --.
Sheet 22, FIG. 22, "TIMTNG" should read -- TIMING --.
Sheet 26, FIG. 26, "CIRCUIR" should read -- CIRCUIT --.
Sheet 41, FIG. 41, "R6 > R12" should read -- R0 > R12 --.

Figure 4:
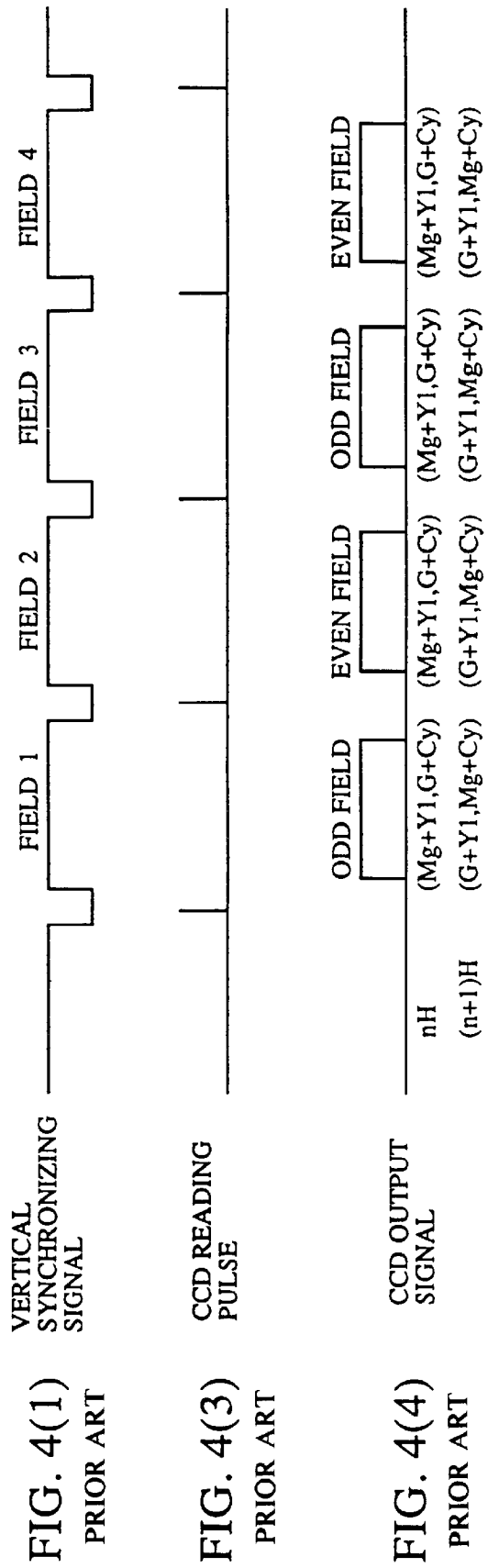
FIG. 4 is a timing chart for showing the operation of the conventional structure.

Column 2,
Line 61, "FIG. 4, (1) shows" should read -- FIG. 4, FIG. 4(1) shows --;
Line 62, "(3)" should read -- FIG. 4(3) --; and
Line 64, "(4)" should read -- FIG. 4(4) --.

Column 6,
Line 13, "FIG. 4 is a timing chart" should read -- FIGS. 4(1), 4(3), and 4(4) are timing charts --;
Line 21, "FIG. 8 is a timing chart" should read -- FIGS. 8(1) - 8(6) are timing charts --;
Line 26, "FIG. 10 is a schematic view which illustrates" should read -- FIGS. 10(1) and 10(2) are schematic views which illustrate --;
Line 31, "FIG. 12 is a graph" should read -- FIGS. 12(i) - 12(iii) are graphs --;
Line 43, "FIG. 18 is a graph" should read -- FIGS. 18(i) and 18(ii) are graphs --;
Line 46, "FIG. 19 is a graph" should read -- FIGS. 19(i) and 19(ii) are graphs --; and
Line 50, "FIG. 21 is a diagram which illustrates" should read -- FIGS. 21(1) and 21(2) are diagrams which illustrate --.

Column 7,
Line 20, "FIG. 37 is a timing chart which illustrates" should read -- FIGS. 37(a) - 37(c) are timing charts which illustrate --;
Lines 24-27, should read -- FIGS. 38(a) and 38(b) are schematic views which illustrate a photoelectric conversion portion of the image pickup device to describe the reading region of the image pickup device according to the thirteenth embodiment of the present invention; --
Line 43, "the" should read -- of the --; and
Line 53, "as" should read -- a --.

Column 8,
Line 18, "memory" should read -- a memory --; and
Line 27, "looking" should read -- looking at --.

UNITED STATES PATENT AND TRADEMARK OFFICE
CERTIFICATE OF CORRECTION

PATENT NO. : 6,449,013 B1
DATED : September 10, 2002
INVENTOR(S) : Masao Suzuki et al.

It is certified that error appears in the above-identified patent and that said Letters Patent is hereby corrected as shown below:

Column 9,
Line 4, "coincide into" should read -- to coincide with --.

Column 14,
Line 24, "portion is appointed by a photographer" should read -- portion --.

Column 15,
Line 55, "having" should read -- has --.

Column 16,
Line 56, "for the correction value" should be deleted.

Column 18,
Line 13, "the all" should read -- all the --; and
Line 34, "after" should read -- after being --.

Column 19,
Line 38, "The" should read -- For the --.

Column 20,
Line 52, "determined" should read -- determine --.

Column 21,
Line 66, "as well as" should be deleted.

Column 22,
Line 60, "operations" should read -- the operation --.

Column 23,
Line 5, "Is" should read -- is --; and
Line 30, "carried" should read -- carried out --.

Column 24,
Lines 58 and 63, "S52" should read -- S303 --;
Line 63, "S53" should read -- S304 --;
Line 64, "S54" should read -- S305 --;
Line 65, "S59" should read -- S310 --; and
Line 66, "S59" should read -- S310--.

Column 25,
Line 1, "S55" should read -- S306 --;
Line 2, "R6" should read -- R0 --;

UNITED STATES PATENT AND TRADEMARK OFFICE
CERTIFICATE OF CORRECTION

PATENT NO.    : 6,449,013 B1
DATED         : September 10, 2002
INVENTOR(S)   : Masao Suzuki et al.

It is certified that error appears in the above-identified patent and that said Letters Patent is hereby corrected as shown below:

Column 25 (cont'd),
Line 3, "If R0 > R12, the operation is shifted to S57. If R0 $\leq$ R12," should read
-- If RO > R12, the operation is shifted to S308. If R0 $\leq$ R12, --;
Line 4, "S58" should read -- S309 --;
Line 5, "R5 or" should be deleted;
Line 5, "S57" should read -- S308 --;
Line 6, "detection" should read -- detections --;
Line 7, "S58 the detection" should read -- S309 the detections --;
Line 30, "mode is made to be 0 to 12 steps" should read -- mode. This minimum unit for the focusing lens in the color natural image mode is made to be 0 to 12 steps as --;
Line 33, "shown" should read -- as shown --; and
Line 41, "wo" should read -- two --.

Column 27,
Line 4, "claim 1" should read -- claim 1, --.

Signed and Sealed this

Twenty-third Day of September, 2003

JAMES E. ROGAN
*Director of the United States Patent and Trademark Office*